United States Patent [19]
Yanaka et al.

[11] Patent Number: 6,149,257
[45] Date of Patent: Nov. 21, 2000

[54] INK-JET PRINTING APPARATUS CAPABLE OF INCREASED IMAGE UNIFORMITY

[75] Inventors: Toshiyuki Yanaka, Tokyo; Toshio Kashino, Chigasaki; Yoshie Asakawa, Nagano, all of Japan

[73] Assignee: Canon Kabushiki Kaisha, Tokyo, Japan

[21] Appl. No.: 08/893,569

[22] Filed: Jul. 11, 1997

[30] Foreign Application Priority Data

Jul. 12, 1996 [JP] Japan ........................ 8-183115
Jul. 9, 1997 [JP] Japan ........................ 9-183614

[51] Int. Cl.[7] .................................................. B41J 2/01
[52] U.S. Cl. ........................ 347/9; 347/65; 347/106; 358/502
[58] Field of Search .................... 347/9, 15, 40, 347/43, 48, 65, 106; 358/1.9, 502

[56] References Cited

U.S. PATENT DOCUMENTS 4,723,129  2/1988  Endo et al. .
5,208,605  5/1993  Drake ............................ 347/15
5,821,962  10/1998  Kudo et al. ..................... 347/65
5,867,197  2/1999  Aoki ............................. 347/106

FOREIGN PATENT DOCUMENTS 60-151061  8/1985  Japan .
3-218848   9/1993  Japan .
5-278221   10/1993  Japan .
6-234217   8/1994  Japan .

*Primary Examiner*—Joan Pendegrass
*Attorney, Agent, or Firm*—Fitzpatrick, Cella, Harper & Scinto

[57] ABSTRACT

A high resolution head having smaller ejection amount and a low resolution head having larger ejection amount are employed. With respect to an image to be printed, an image separating portion separates a portion of a field in an image from a portion other than the field. For the field, printing is performed by the low resolution head through process of an image processing portion and a head control portion. As a result of this, for the field in the image, large dot is formed to reduce gap between the dots. Thus, color of the field can be uniform.

57 Claims, 39 Drawing Sheets

FIELD COLOR
DISCRIMINATION

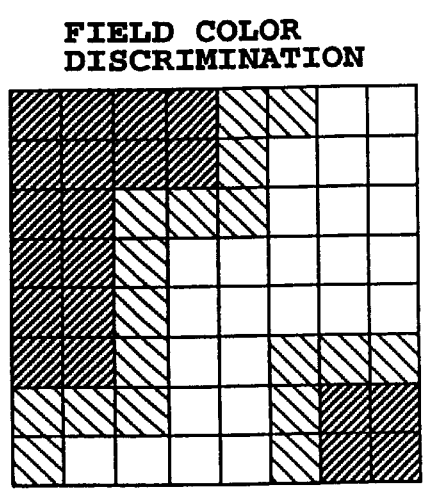

FIG.4A

▨ PALLETE CODE AGREEING WITH FIELD COLOR
☐ PALLETE CODE NOT AGREEING WITH FIELD COLOR
▩ PALLETE CODE AGREEING WITH FIELD COLOR

IMAGE DATA PRINTED BY LOW RESOLUTION HEAD 1001L

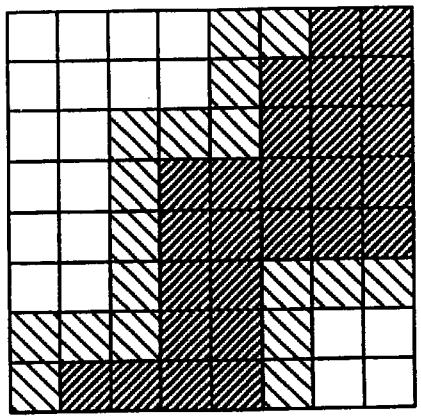

FIG.4B

IMAGE DATA PRINTED BY LOW RESOLUTION HEAD 1001L

FIG.4C

☐ PALLETE CODE OF BLANK
▨ PALLETE CODE OF IMAGE OF PORTION OF CHARACTER "A"
▩ PALLETE CODE OF IMAGE OF THE SAME COLOR AS FIELD COLOR

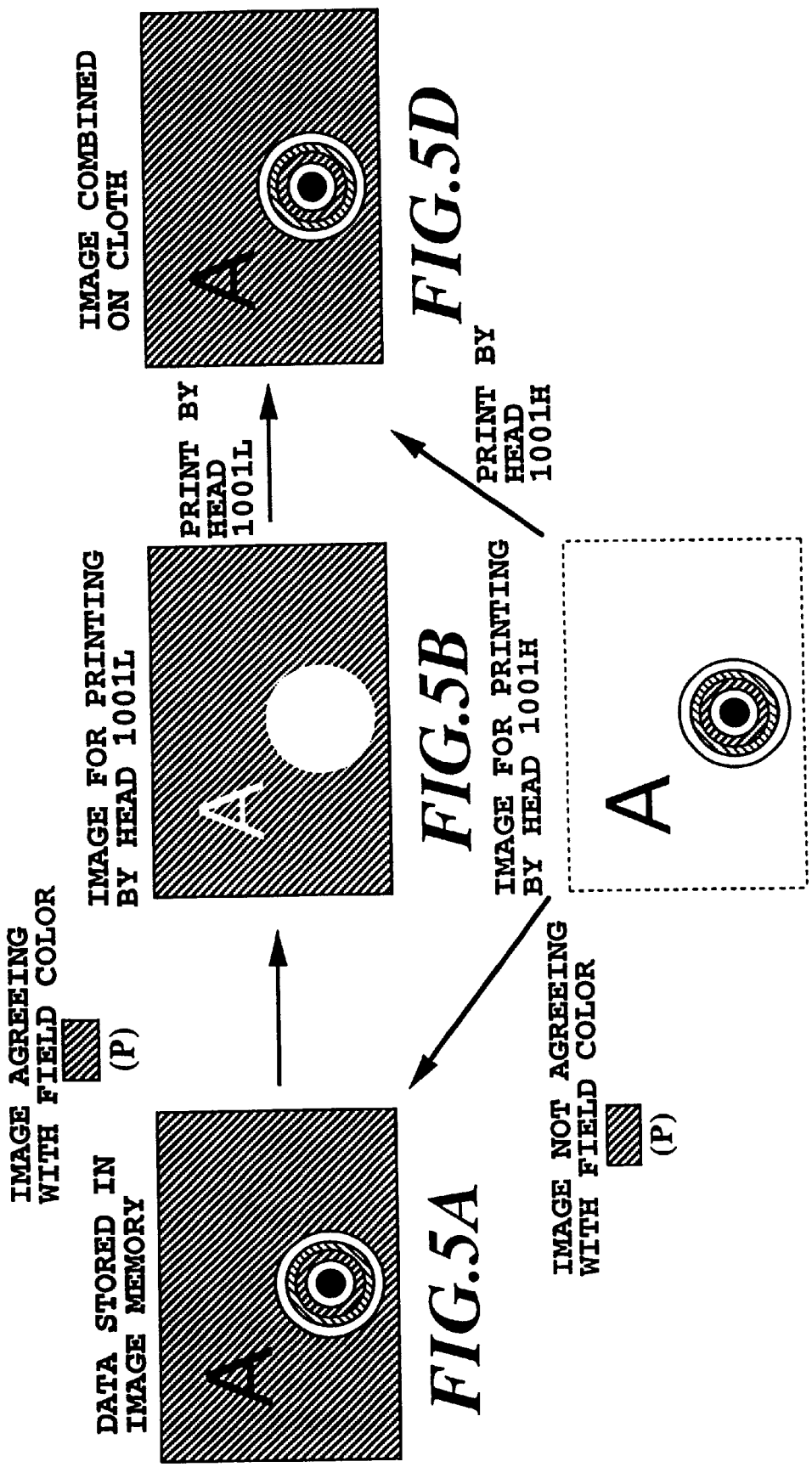

x OBJECTIVE PIXEL

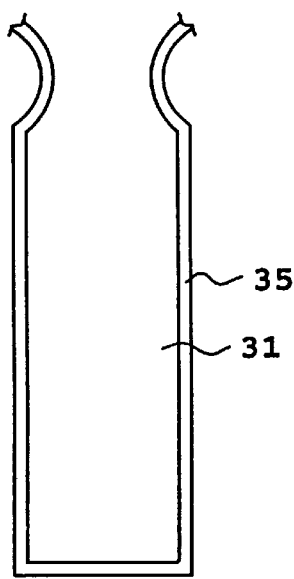
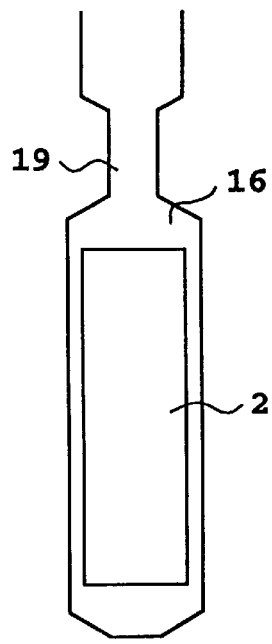
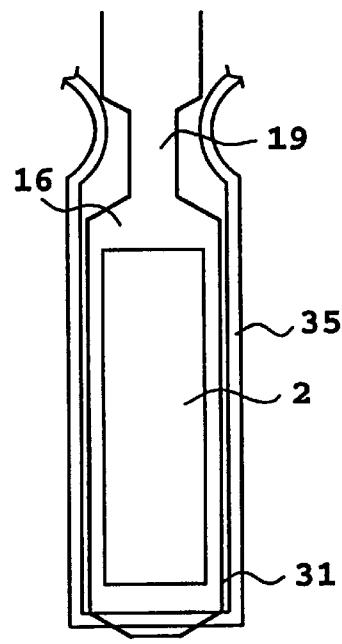
*FIG.22A*  *FIG.22B*  *FIG.22C*

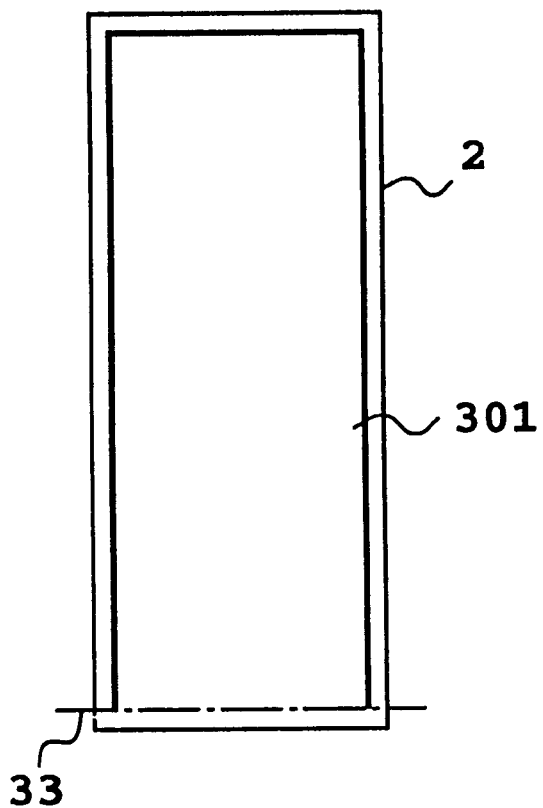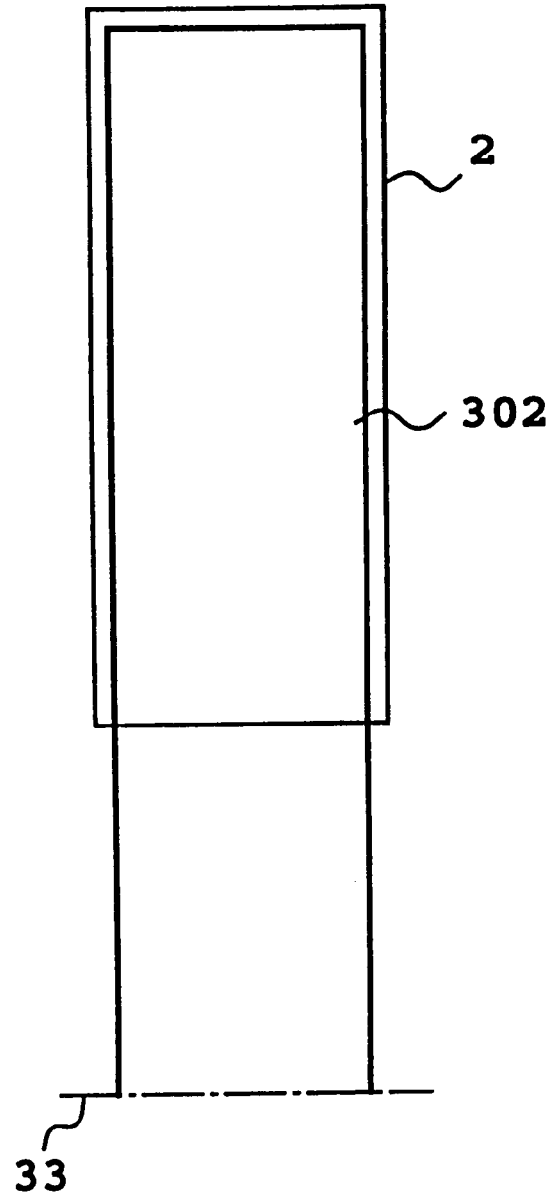
FIG.25A  FIG.25B

INK-JET PRINTING APPARATUS CAPABLE OF INCREASED IMAGE UNIFORMITY

BACKGROUND OF THE INVENTION

1. Field of the Invention

The present invention relates generally to an ink-jet printing apparatus. More specifically, the invention relates to a textile printing apparatus for performing printing by ejecting an ink toward a fabric, such as cloth or the like.

2. Description of the Related Art

Various means have been proposed and practiced by ink-jet printing systems performing printing with liquid ink.

Among generally known printing systems, an ink-jet printing method is a non-impact printing system which generates little noise and has various advantages such as capability of high speed printing, capability of printing on a plain paper without requiring a special fixing process, and has achieved significant evolution in recent years. Above all, accompanied by significant development of information processing technology in recent years, an apparatus employing the ink-jet printing system has been widely available as output devices for computer, facsimile, wordprocessor and the like.

In order to make the advantages of the ink-jet printing system useful, in addition to printing for plain paper as conventionally used, there has been proposed an application for printing on various printing media other than the plain paper, for example, development in textile printing for cloth is attracting attention.

The ink-jet textile printing system has advantages which does not require a complicated process, such as preparation of a screen printing plate, indexing of the plate or the like, as required in a conventional screen textile printing system, and is easy in handling the production of an image to be printed or correction of the image, or the like.

On the other hand, a composite textile printing system utilizing both the ink-jet textile printing system and the screen textile printing system for utilizing the advantages of the ink-jet textile printing system set forth above and advantages of the screen textile printing system, is one possible system to be considered. More specifically, by using the screen textile printing system, in comparison with the ink-jet textile printing system, color of a portion in the image to be printed, such as background portion, can be printed uniformly. Also, the screen textile printing system can print an image with lesser granulation even in an image portion having a lower density spatial frequency, that is, smaller density variation. Furthermore, the screen textile printing system can easily realize high density printing of background color and the like.

A composite textile printing system appropriately utilizing the advantages of the ink-jet textile printing system and the screen textile printing system is considered to be an effective textile printing system. The foregoing advantages of the screen printing system are particularly important for the case where the printed cloth or the like becomes merchandise having high additional value, such as clothes or the like. However, while the screen textile printing system achieved various advantages as set forth above, it basically requires various complicated process steps as set forth above. It is quite desirable to neglect such process steps in the textile printing.

SUMMARY OF THE INVENTION

It is an object of the present invention to provide an ink-jet printing apparatus, which allows an ink-jet textile printing method to be used even for a portion where a screen textile printing system is to be applied in a composite textile printing system, and which does not spoil the advantages of the screen textile printing.

More particularly, it is an object of the present invention to provide an ink-jet printing apparatus which can satisfactorily realize printing characteristics, such as printing of a base color, such as a background or the like with high uniformity, suppressing granulation even for a portion having small spatial frequency, realizing high image quality of the base color, high density portion or the like, and highlighting of a line image.

It is a further object of the present invention to provide an ink-jet printing apparatus, in which when a region to be printed at uniform color and uniform density is present, printing is performed for such region with an ink-jet head having a large ejection amount so that an ink dot formed on the printing medium is naturally large, and the ink dot may be further enlarge by bleeding to minimize a color of a printing medium per se between the ink dots so that the background color is made uniform and density of the background is increased, and especially uniform color of printing can be obtained even when the printing medium is fabric, such as cloth or the like.

In a first aspect of the present invention, there is provided an ink-jet printing apparatus for performing printing on a printing medium by employing an ink-jet head ejecting ink, including image separating means for discriminating between a predetermined region and a region other than the predetermined region in an image to be printed, and for separating image data corresponding to the predetermined region from image data corresponding to the region other than the predetermined region, and control means for driving the ink jet head on a basis of image data corresponding to respective regions separated by the image separating means to perform printing, the control means making an ink ejection amount per a pixel in the predetermined region greater than that in the region other than the predetermined region.

In a second aspect of the present invention, there is provided an ink-jet printing apparatus for performing printing on a printing medium by employing an ink-jet head ejecting an ink, a first ink-jet head and a second ink-jet head having different ink ejection characteristics being employed as the ink-jet head, the apparatus including image separating means for discriminating between a region to be printed by using the first ink-jet head and a region to be printed by using the second ink-jet head in an image to be printed, and separating the image data respectively corresponding to respective regions from each other on a basis of a result of discrimination, and control means for performing printing using the respective first and second ink-jet heads on a basis of the image data corresponding to respective regions.

The above and other objects, effects, features and advantages of the present invention will become more apparent from the following description of embodiments thereof taken in conjunction with the accompanying drawings.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to be present invention, but are for explanation and understanding only.

In the drawings:

FIGS. 4A to 4C are illustrations for explaining processes of image separation and resolution conversion in the construction shown in FIG. 3;

FIGS. 5A to 5D are illustrations for explaining printing on a basis of image separation by the construction shown in FIGS. 3 and 4A to 4C;

FIGS. 22A to 22C are views for explaining structures of the movable member and liquid flow passage;

FIGS. 25A and 25B are views showing relationship of positions of the movable member and the heater;

DETAILED DESCRIPTION OF THE PREFERRED EMBODIMENTS

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscuring the present invention.

Figure 1:
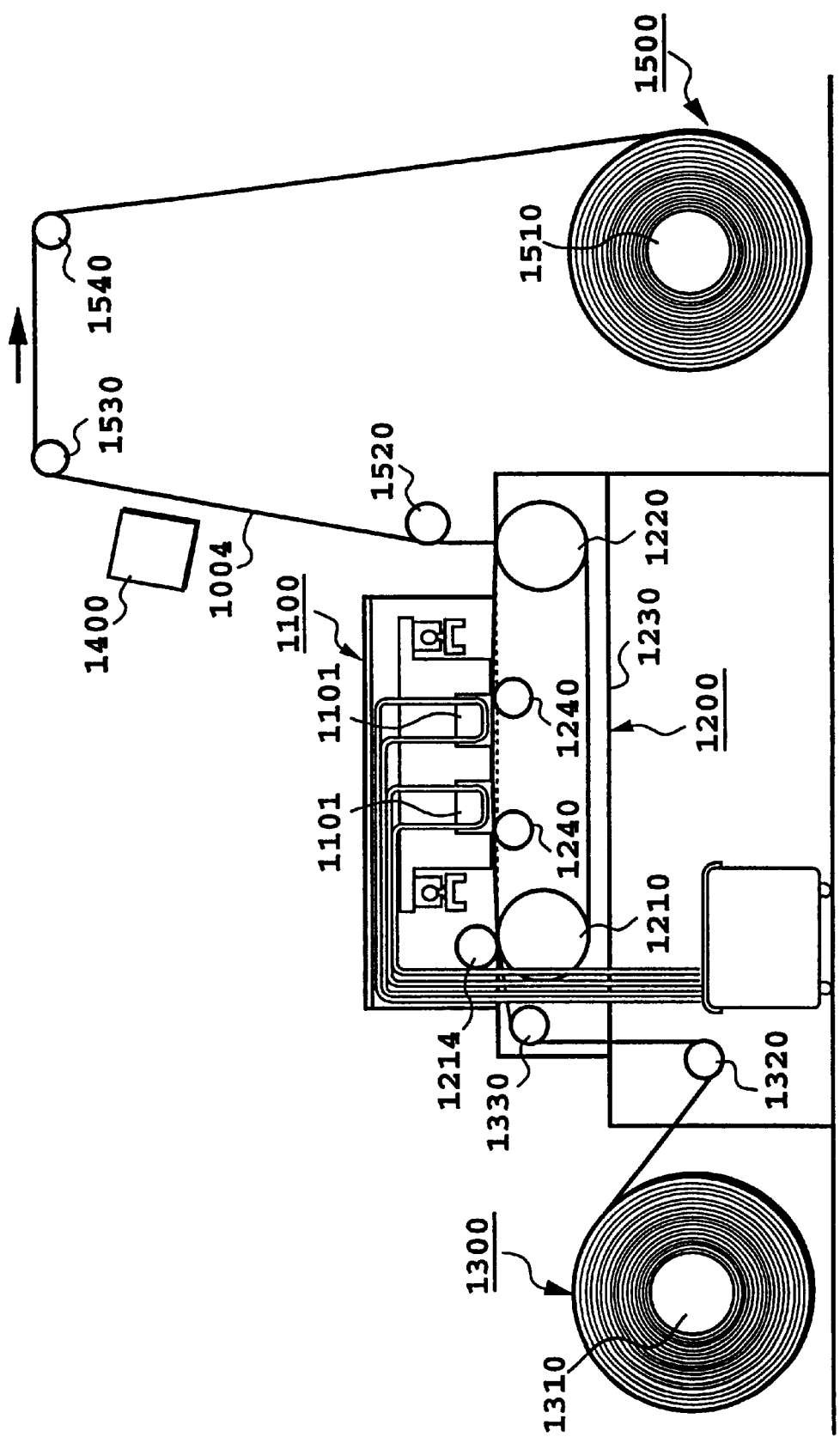
FIG. 1 is a side elevation showing general construction of one embodiment of an ink-jet textile printing apparatus according to the present invention.
Figure 2:
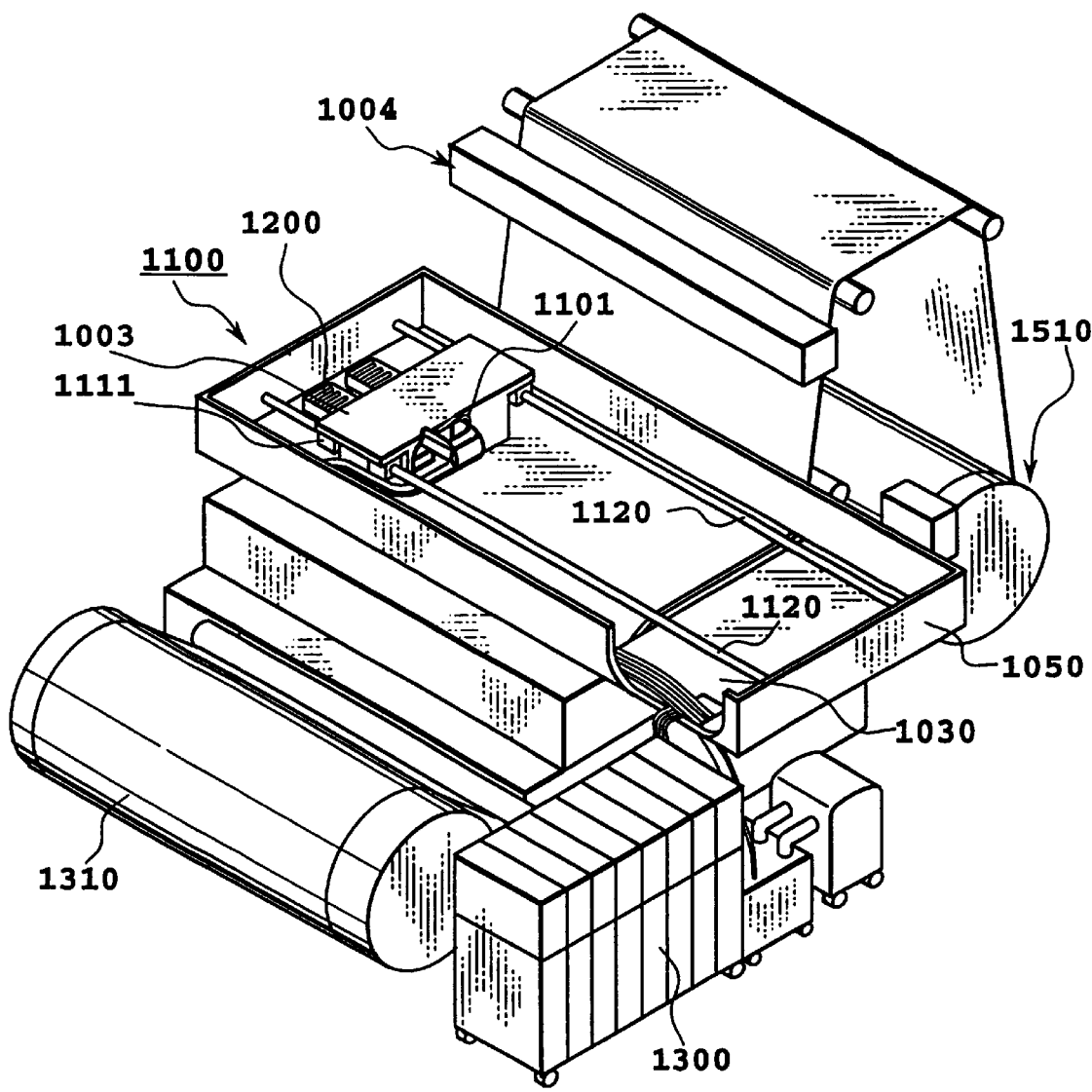
FIG. 2 is a perspective view of the ink-jet textile printing apparatus shown in FIG. 1.

FIGS. 1 and 2 are side elevation and perspective views, respectively, showing general construction of one embodiment of the ink-jet textile printing apparatus according to the present invention, respectively.

In FIGS. 1 and 2, the reference numeral 1004 denotes a cloth as a printing medium which is rolled out according to rotation of a feeding roller 1310 driven by a motor (not shown) and reaches a transporting means 1200 via intermediate rollers 1320 and 1330. The feeding means 1200 is provided at a portion opposing to a printing portion 1100. The cloth 1004 is horizontally transported by the feeding means 1200, and then taken up by a take-up roller 1500 via a feeding roller 1214 and intermediate rollers 1520, 1530 and 1540.

Within the frame body 1050, a pair of parallel guide rails 1020 are arranged in a direction perpendicular to the feeding direction of the cloth 1004. On these guide rails 1120, a head carriage 1003 is mounted via ball bearings 1111. By this, the head carriage 1003 can reciprocally move in the primary scanning direction along a pair of guide rails. It should be noted that the head carriage 1003 is driven by a driving belt (not shown) by a driving motor (not shown) fixed on one side wall of the frame body 1050. On the lower surface of the inside of the head carriage 1003, a head unit 1101 for forming the image for the cloth 1004.

On the head unit 1101, a plurality of ink-jet heads, in which a plurality of ink ejection openings are arranged in the same direction to the transporting direction of the cloth 1004, are provided in the same direction to the primary scanning direction per respective ink color. Furthermore, as will be discussed later, concerning each ink color, two heads having mutually different printing resolutions are provided. Such head units 1101 are provided in two sets in the transporting direction of the cloth 1004. These two sets of head units 1101 are constructed to scan the same scanning directions associating with transportation of the cloth 1004. Dot arrangement respectively formed by ink ejection during scan can be complementary to each other, such as for checker pattern.

For the ink-jet head of each head unit, various ink is supplied via respective relay tubes 1030 as the ink supply passage from the ink storage tank unit 1300 if necessary. Since these ink supply passages move similarly to the head carriage 1003, they are arranged within a caterpillar (not shown) for facilitating motion and preventing from being damaging.

A capping unit 1200 is provided at a lower portion of the home position in the motion in the primary direction of the head unit 1101. The capping unit 1200 is contacted with the ejection opening forming surface of each head upon non-printing. Upon non-printing, each head moves to the home position opposing to the capping unit 1200. By this capping is performed.

(First Embodiment)

The first embodiment of the present invention implemented in the above-mentioned ink-jet textile printing apparatus will be described hereinafter.

Figure 3:
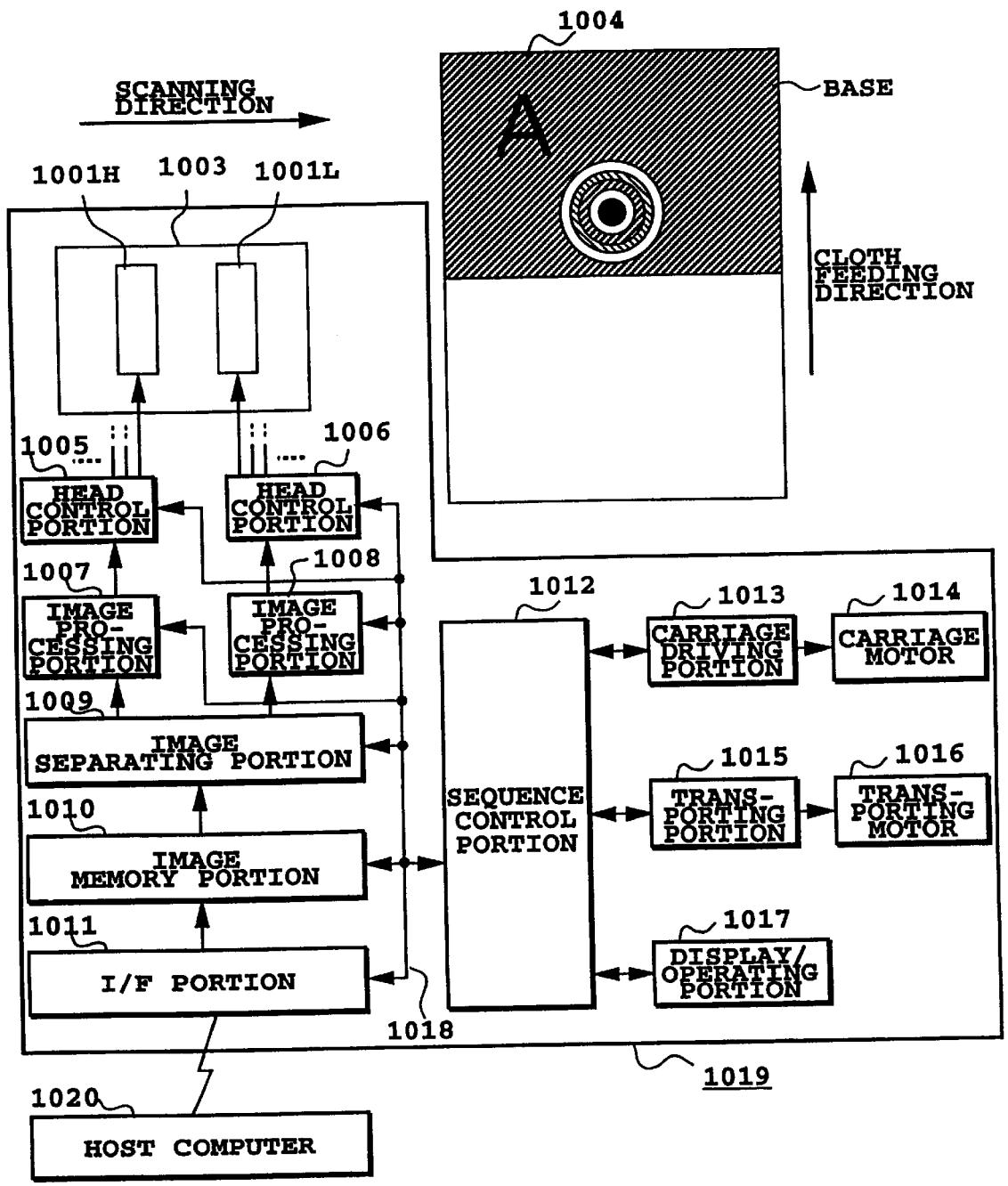
FIG. 3 is a block diagram mainly showing a construction of a control system of the first embodiment of the ink-jet printing apparatus according to the present invention.

FIG. 3 is an illustration for mainly explaining image signal processing in the first embodiment of the ink-jet textile printing apparatus. In FIG. 3, a reference sign 1001H denotes a high resolution ink-jet head, in which ink ejection openings are arranged in a density of 360 dpi, for example, and a reference sign 1001L similarly denotes a low resolution ink-jet head, in which ink ejection openings are respectively arranged in a density of 180 dpi, for example. The two ink-jet heads are provided in each of two head units 1101 provided along transporting direction of a cloth 1004 (see FIGS. 1 and 2), as set forth above, and are provided for each ink color. However, for simplicity of explanation and illustration, FIG. 3 shows the two ink-jet heads of only one head unit and only one ink color. The head 1001H ejects ink droplet having relatively small volume and thus forms relatively small dot on the printing medium. On the other hand, the head 1001L ejects ink droplet having relatively large volume and thus forms relatively large dot on the printing medium.

In the shown embodiment, a density of the ejection openings and an ejection amount (volume of the ejected ink droplet) are determined so that the dot formed by the low resolution head 1001L satisfies the following condition. When printing is performed with the head 1001L at 100% duty, such as upon printing of a background (hereinafter also referred to as a field), the ejection amount is determined to such extent that gaps between the dots are filled with ink bled from the dots. More specifically, in the shown embodiment, the head 1001L having an array of ejection openings at a relatively low resolution of 180 dpi, is designed to satisfy the foregoing condition when dots are formed at the resolution (density) of 180 dpi. In the case that the head used in a conventionally known ink-jet system is designed to eject the large amount of ink, the density of the ejection openings normally becomes low (low resolution). In the description of this specification, therefore, the head having large ejection amount is referred to as a low resolution head, and, on the other hand, the head ejecting relatively small ejection amount, which cannot satisfy the foregoing condition, will be referred to as a high resolution head.

In the shown embodiment, as will be explained later, upon printing the field in an image, the head 1001L is employed. By this, dots filling gaps therebetween are formed as set forth above so that the printing medium per se will not appear. As a result, similarly to the screen system, it becomes possible to print a field color uniformly.

Again, reference is made to FIG. 3. Two heads 1001H and 1001L having mutually different resolutions perform ink ejection as driven by respective head control portions 1005 and 1006 on a basis of ejection data generated by respective image processing portions 1007 and 1008. Data to be processed by respective image processing portions 1007 and 1008 are supplied per respective separated images by an image separating portion 1009, as explained later.

A sequence control portion 1012 is constructed with a CPU, a ROM, a RAM, an I/O and so on. According to a program stored in the ROM, various signal processing and operation of respective portions in the shown embodiment of an ink-jet textile printing apparatus 1019 are controlled. More specifically, an image data supplied from a host computer 1020 is stored in an image memory portion 1010 via an interface portion (I/F portion) 1011. A carriage motor 1014 performed for moving a carriage 1003 is controlled via a carriage driving portion 1013, and a transporting motor 1016 driving the transporting belt 1230 is controlled via a transporting portion 1015. A reference numeral 1017 denotes a display/operating portion having a display portion of a liquid crystal or the like and an operating portion, such as a key switch or the like.

Detail of operation of the ink-jet textile printing apparatus 1019 having the construction set forth above will be explained hereinafter.

At first, from the host computer 1020 connected through the general purpose interface 1011, the image data to be printed is supplied to the ink-jet textile printing apparatus 1019. Here, the supplied image data includes palette data and a palette table. The palette data is a data expressing a color in a code. The palette table is a conversion table showing correspondence between the palette data and density data of respective ink colors (here, assumed as K, C, M, Y). For example, black is expressed by the palette data "01", and this palette data is converted to density data of respective colors (K, C, M, Y) expressed as (255, 0, 0, 0). The sequence control portion 1012 stores the palette data in the image data in an image memory portion 1010 and stores the palette table in the image processing portions 1007 and 1008, via the I/F portion 1011. Further, the host computer 1020 supplies the palette data of a field color. This palette data is stored in the image separating portion 1009 to be used for image separation processing which will be explained later. Furthermore, a printing format (printing width, printing tone, enlargement ratio and so on) and the like can be designated by the host computer 1020. However, description therefor will be neglected here.

The ink-jet textile printing apparatus 1019 enters an enabled state upon completion of the data transfer/setting described above, with respect to the image data. The operator feeds a printing demand to the sequence control portion 1012 by operating a print start key through the display/operation portion 1017. The sequence control portion 1012 executes a printing sequence in response to the printing demand in the case of the print enabled state. As a print sequence, there is a sequence shown by a flow of the image signal from the image memory 1010 to the heads 1001H and 1001L via the image separating portion 1009, the image processing portions 1007 and 1008 and the head control portions 1005 and 1006, a scanning sequence in which the carriage 1003 is driven by the carriage motor 1014 via a carriage driving portion 1013, a transporting sequence in which the cloth 1004 is driven by the transporting motor 1016 via the transporting portion, and an operation sequence of respective accessory actuators (not shown). Timing control of these sequence is performed by the sequence control portion 1012.

Hereinafter, a sequence of image signal processing of the shown embodiment will be explained.

Figure 37:
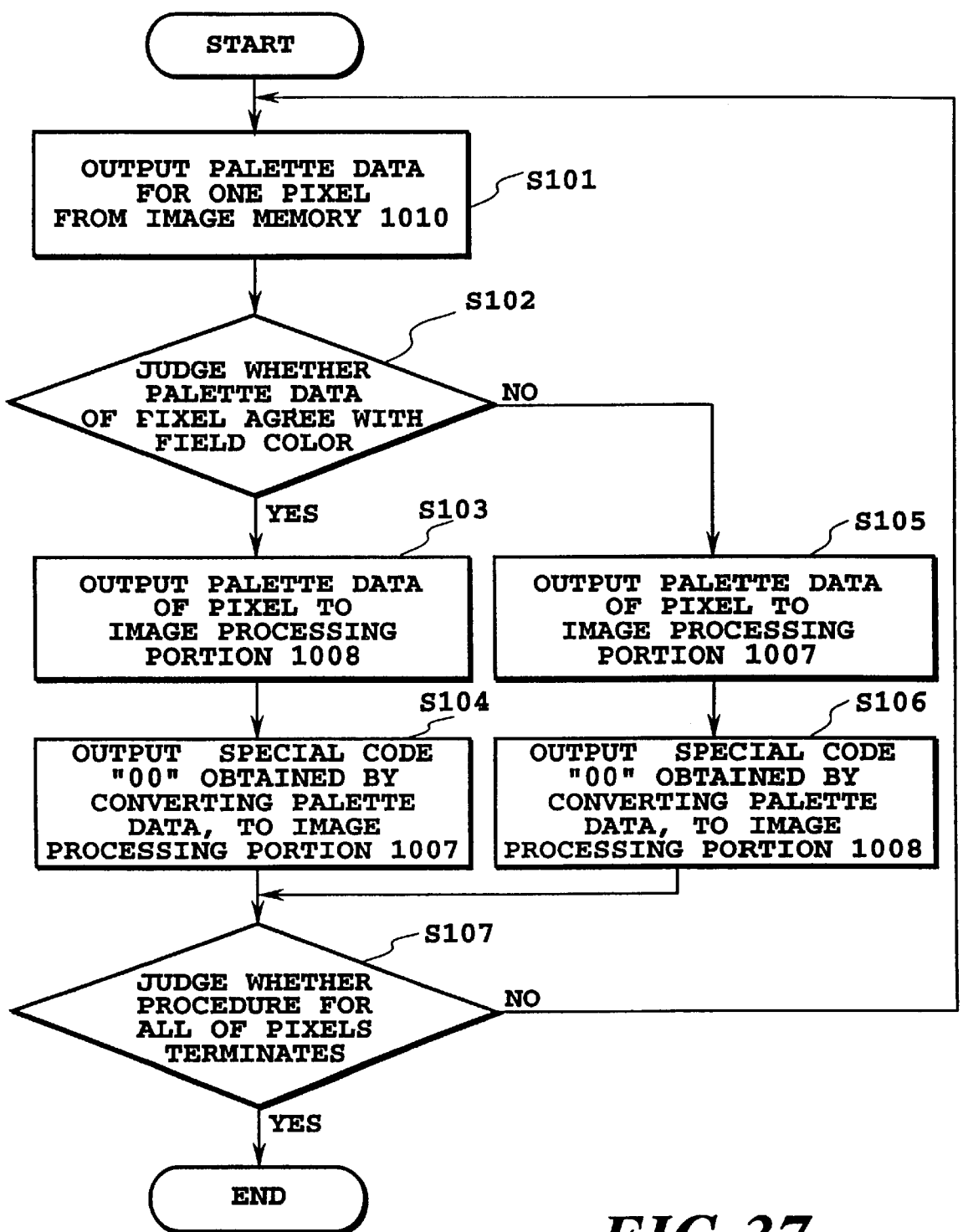
FIG. 37 is a flowchart showing image processing according to the first embodiment.

At first, referring to FIG. 37, processing relating to image separating will be explained as follows. The palette data for one pixel is output from the image memory 1010 depending upon the printing format (Step 101). The image separating portion 1009 makes judgment whether the sequentially input palette data and the palette data of a predetermined field color preliminarily set agree with each other or not for each pixel (Step 102). Here, when the palette data agree with each other, palette data input to the image separating portion is output to the image processing portion 1008 as it is (Step 103). Also, to the image processing portion 1007, the palette data converted into "00" as preliminarily determined special code is output (Step 104). On the other hand, when it is judged in Step 102 that the compared palette data do not agree with each other, conversely to the above, the palette data input to the image separating portion is output to the image processing portion 1007 as it is (Step 105), and to the image processing portion 1008, the data converted into "00" similarly to the above is output (Step 106). Judgement is made whether processing described above is performed with respect to all of the pixels (Step 107). When it is judged that the processing for all of the pixels is completed, the shown image separating process is terminated.

The image processing portions 1007 and 1008 respectively convert the sequentially fed palette data into density data of respective ink colors (K, C, M, Y) using the palette table (this conversion is hereinafter also called palette conversion). Then, respective image processing, such as gamma correction, head shading, binarization process and the like, are performed to feed binary data to the head control portions 1005 and 1006, respectively. The palette conversion is performed using a look-up table (hereinafter occasionally referred to as LUT). In such palette conversion, with respect to the foregoing predetermined special code "00", the density data of respective ink colors become (0, 0, 0, 0) and thus becomes a blank data. The head control portions 1005 and 1006 converts the binary data sequentially obtained through the image processing into head drive signals (ejection data) to drive respective heads 1001H and 1001L based thereon to print respective of separated images on the cloth.

The image processing portion 1008 finally generates the binary data for low resolution, as described above. In the shown embodiment, since the data supplied from the image separating portion 1009 is data of 360 dpi for high resolution, it becomes necessary to convert the supplied data into data of 180 dpi. FIGS. 4A, 4B and 4C are illustration showing such conversion of resolution of the data.

FIG. 4A is a diagrammatic illustration showing the image data of 360 dpi supplied from the image memory portion 1010 for each pixel. In FIG. 4A, data of the field color, data of an image other than field color, and data of a boundary between the field color and other image are illustrated, respectively.

When the image data shown in FIG. 4A is input to the image separating portion 1009 in a form of palette data, check is performed whether the color designated by image data matches the field color or not, for each pixel. Then, the pixels having the color matching with the field color, and among such pixels, the pixels located at the boundary are identified. Then, with respect to the pixels having the color matching with the field color, data is fed to the image processing portion 1008 as it is. On the other hand, with respect to other pixels including the pixel at the boundary, data is fed to the image processing portion 1008 after conversion into the predetermined palette data "00". In the image processing portion 1008, as shown in FIG. 4B, thinning is performed per every four pixels of palette data to convert into the palette data for one pixel having the same content as the original four pixel data. For the pixels other than the pixel having the field color, thinning per every four pixels is similarly performed to convert into the palette data for one pixel. By this, from the original image adapted to resolution of 360 dpi, the low resolution image data adapted to resolution of 180 dpi can be obtained. Then, with respect to the palette data thus obtained, foregoing respective image processing is performed to finally generate binary drive data.

On the other hand, in the image data shown in FIG. 4A, for the pixels judged as having color other than the field color or as located at the boundary, data is fed to the image processing portion 1007 as it is. The image data for other pixels, namely those judged as having the field color is fed to the image processing portion 1007 after conversion into the predetermined data "00". As shown in FIG. 4C, based on the finally obtained drive data, the field color is printed at the resolution of 360 dpi for the pixels at the boundary portion. Also, as exemplified in FIG. 4C, a portion of character "A" is printed at the resolution of 360 dpi in the color of the original image, similarly.

As set forth above, by performing printing employing the head 1001L for low resolution, a size of the dot thus formed can be set so that the gap between the dots is filled as much as possible. Thus, similarly to the screen system, the uniform field color can be printed. Also, by making the dot size to be formed greater, granulation of the field color, particularly of low density field color can be reduced. In addition, high density well reflecting the original image can be realized.

It should be noted that it is possible that, at certain density indicated by data of the field color, since the data is finally binarized, the dot is not formed in 100% duty to leave relatively large gap between the dots. However, even in such case, by using a relatively large ejected ink droplet by the low resolution head, a greater dot can be formed to make the color of the field in the image more uniform in comparison with the case where the field is printed by the high resolution head.

Further, in the shown embodiment as set forth above, for the portion of the field color of the boundary between the field and the image other than the field, the high resolution head 1001H is used instead of the low resolution head 1001L. Reason for this is as follows. The ink amount is large in printing with the low resolution head, and such large amount of ink may achieve the effect for making the color uniform. However, it is possible to cause bleeding to degrade sharpness of an edge portion of the image.

It should be noted that while the shown embodiment performs conversion to low resolution in the state of the palette data, stage to perform conversion of resolution is not limited to the shown stage. For instance, the conversion of resolution may also be performed after conversion of the palette data into the density data of respective ink colors. Similarly, conversion of resolution can also be performed by a simple thinning process in two-dimensional space, interpolation of density in two-dimensional space and other methods. It may also perform conversion of resolution of the binarized data.

In addition, in the foregoing image separation, the boundary is discriminated in conjunction with discrimination of the field color. The discrimination of the boundary in the shown embodiment is performed by automatically setting pixels around the pixels judged as having the field color, as the boundary. However, the manner of discrimination of the boundary is not limited to the shown manner. It is possible to supply a boundary designating information from the host computer, or, in the alternative, to preliminarily extract the boundary image by the host computer to supply separately from other image.

An image forming procedure as set forth above, which is performed by the image separating portion 1009, the image processing portions 1007 and 1008, the head control portions 1005 and 1006 and the heads 1001H and 1001L, is illustrated in FIG. 5.

The palette data (A) stored in the image memory 1010 is compared with the palette data (p) of the field color. A portion of the image where the palette data (A) and the palette data (p) are the same to each other, becomes the image (B) to be printed by the head 1001L, and a portion of the image where the palette data (A) and the palette data (p) are different from each other, becomes the image (C) to be printed by the head 1001H. Here, in the images (B) and (C), regions indicated by a blank represent portions where the palette data is converted into the predetermined data "00".

It should be noted that the palette data of the field color is not always one as stated in the foregoing embodiment, but can be set in plural. In the case of setting two or more field colors, Step 102 and succeeding steps in a procedure shown in FIG. 37 are adapted to be performed for each field color to allow the image separating processing to be performed with respect to the two or more field colors. Also, by designating the image not so extended to a wide area such as the background, as the image of the field color by the palette data, such image can be printed by the low resolution head.

Further, the shown embodiment makes discrimination of the field color in the image separating portion 1009 by comparison with respect to the palette data. The manner of discriminating the field color is not limited to the shown manner. It may be possible to integrate the palette tables for the high resolution and low resolution and to perform discrimination of the field color and distribution of data for high resolution and low resolution by using the palette table. Also, it may be possible that the palette data of high resolution and low resolution are simultaneously stored in the image memory with separating upper four bits and lower four bits, and the upper four bits and the lower four bits are separated by the image separating portion. Furthermore, by providing two image memories 1010 respectively for the high resolution and low resolution, the image data for high resolution and low resolution are transferred and stored separately.

Also, similar process described above can be performed for multi-value data of R,G,B, binary data of K, C, M, Y instead of the palette data.

Furthermore, the low resolution head 1001L is explained to eject the inks of Y, M, C, K as in the shown embodiment. Alternatively, the head 1001L may eject only K ink in monochrome printing. Also, blended ink of a special color (blue, orange or the like), light color ink and deep color ink may also be used. Here, "light" and "deep" represents difference of color density differentiated depending upon ratio of coloring agent.

Also, in the shown embodiment, the discrimination and the separation are performed with respect to the palette data of the field color as fixed value in the image separating portion, alternatively, the discrimination or the separation may be performed with respect to a certain range of the palette data. For example, the low resolution head 1001L is used for light color ink and is set to continues range (e.g. "01" to "06") show the region where the color density is lower than or equal to a certain density to perform the discrimination and the separation.

Also, the discrimination of the field in the image data from other image is performed by comparison of respective image data with the predetermined field color data in the shown embodiment, manner of discrimination should not be restricted to the shown manner but the following system may be employed. More specifically, an image region separation information may be preliminarily prepared by the host computer and such information may be fed to the textile printing apparatus together with the image data. Also, as other system, the image data, in which the image regions are preliminarily separated may be prepared in the host computer, and such separated image data may be transferred to the textile printing apparatus.

Also, in the shown embodiment, the high resolution head (ejection amount being small) and the low resolution head (ejection amount being large) are employed for the same ink color, combination of the heads and the inks are not limited to the shown one. For instance, when an image having small area of the back ground (the field), a head for higher resolution than that of the high resolution head may be employed in place of the low resolution head for printing the character and/or the boundary portion described above. By this, sharpness of the character and the like can be enhanced.
(Modification of the First Embodiment)

In the shown modification, the image separating portion 1009 separates a region to be printed by the low resolution head 1001L, such as the field color, a high density portion and the like, from other region to be printed by the high resolution head 1001H on a basis of a spatial frequency of the density data of respective colors.

Figure 6:
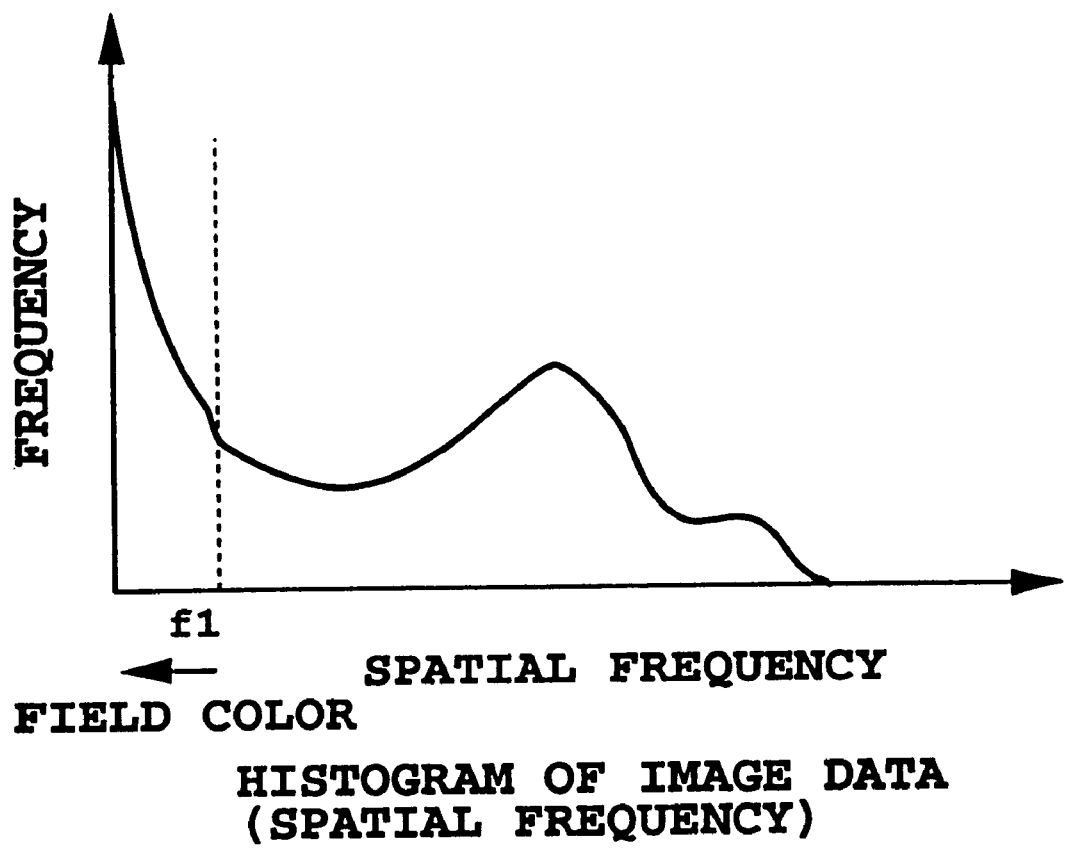
FIG. 6 is an illustration showing a histogram of a spatial frequency of an image data in an image separation of a modification of the first embodiment.

In this case, as shown in FIG. 6, a range of spatial frequency in an image to be printed by the low resolution head is preliminarily set as the range of 0 to f1. Then, the pixels having the spatial frequency within this range is printed by the low resolution head 1001L, and other pixels are printed by the high resolution head 1001H.

Figure 7:
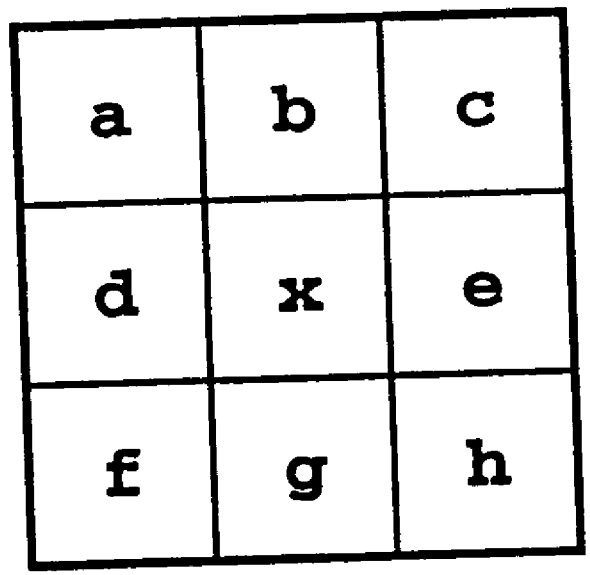
FIG. 7 is an illustration for explaining a spatial frequency of the foregoing modification.

In order to derive the spatial frequency, various filter or arithmetic processes may be employed. In the shown modification, as shown in FIG. 7, on a basis of variance of density data of an object pixel X and peripheral eight pixels a to h, the spatial frequency of the object pixel X is derived. Large variance (spatial frequency being high) represents that the density data of the nine pixels is not uniform and thus means not a color having uniformity. On the other hand, if the variance is small, the density data of the nine pixels are uniform and thus the pixel is judged as that of the field color.

Figure 38:
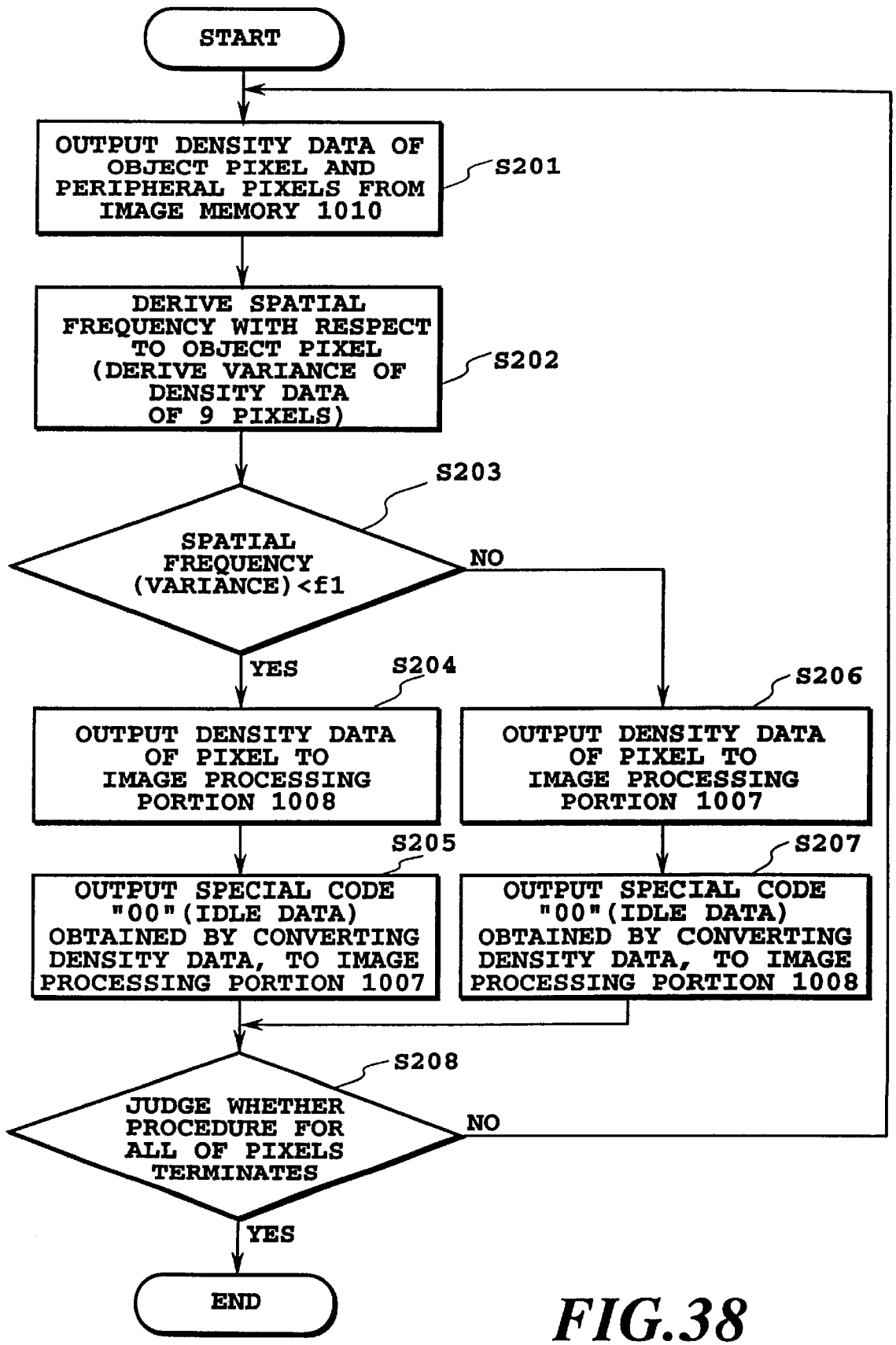
FIG. 38 is a flowchart showing image processing according to a modification to the first embodiment.

FIG. 38 is a flowchart showing an image separating procedure according to the shown modification. The image separating procedure of the shown modification will be explained referring to FIG. 38, as follows.

The density data of the object pixel and the peripheral pixels is read from the image memory 1010 (Step 201). Next, as described referring to FIG. 7, the spatial frequency of the object pixel is derived (Step 202). In succeeding Step 203, judgement is made whether the object pixel has data of the predetermined field color or not based on the spatial frequency derived at Step 202. As described above, when the frequency is lower than a predetermined value, the pixel showing the frequency lower than the predetermined value can be recognized as the pixel of the field color. Therefore, the judgement whether the object pixel is the pixel of the field color or not can be made by setting the predetermined value f1. In the case that the judgement is made in Step 203 that the object pixel is the pixel of the field color, the density data of the object pixel is output to the image processing portion 1008 as it is (Step 204). Further, to the image processing portion 1007, the special code "00" (an idle data) which is obtained by converting the density data is output (Step 205). On the other hand, in the case that the judgement is made in Step 203 that the object pixel is not the pixel of the field color, the density data of the object pixel is output to the image processing portion 1007 as it is (Step 206). Also, to the image processing portion 1008, the special code "00" similar to the code stated above is output (Step 207). Then, when a procedure relating to the judgement set forth above is completed with respect to all of pixels to be processed, the image separating procedure is terminated (Step 208).

It should be noted that the manner of supplying of data to the image processing portions 1007 and 1008 is the same as that in the case of discrimination with respect to the palette data as set forth above. That is, the data of region not corresponding to the field color or to other image are set at the predetermined data "00" and supplied so as not to print on the region as described in relation to FIG. 38, respectively.

The modification described above can eliminate a procedure for converting the palette data to the density data performed by the image processing portions 1007, 1008 in the first embodiment.

(Second Modification of the First Embodiment)

In the shown modification, the image separating portion 1009 separates the region to be printed by the low resolution head 1001L, such as the field color, high density portion and the like from the region to be printed by the high resolution head 1001H on a basis of the density data of respective ink colors.

Figure 8:
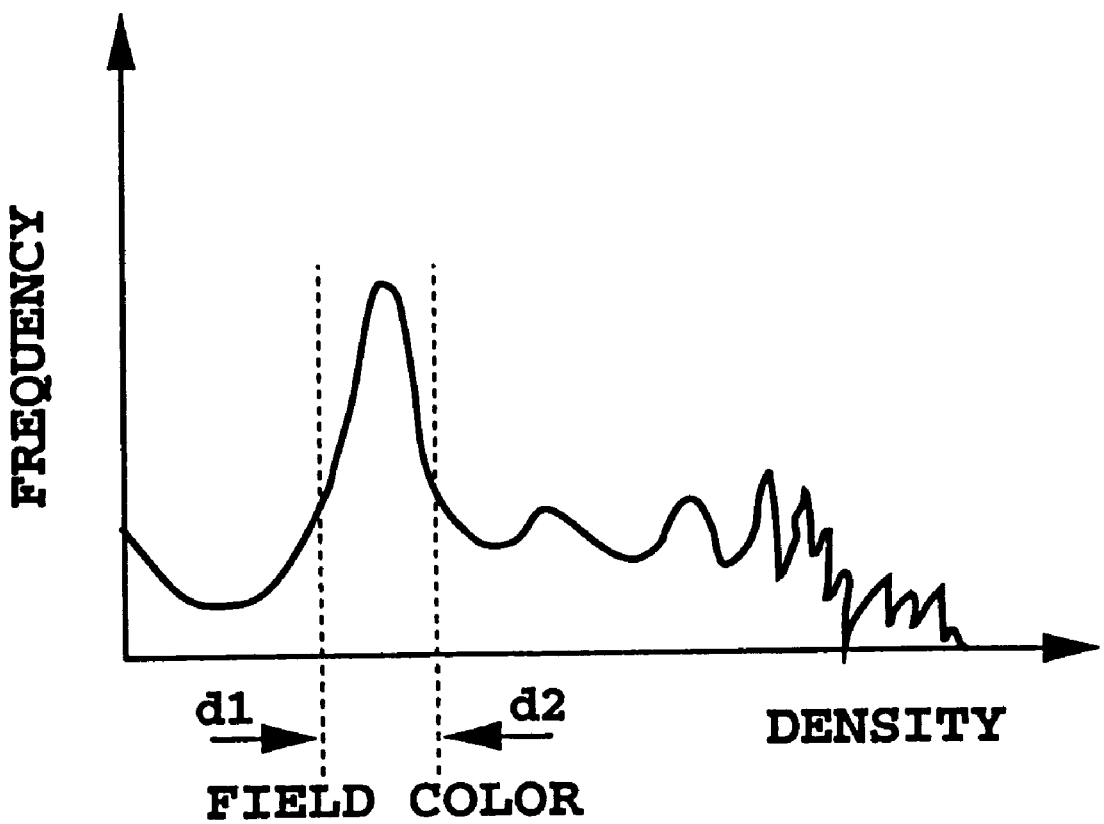
FIG. 8 is an illustration showing a frequency histogram of an image density relating to another modification of the first embodiment.

Here, with respect to a density range, a histogram as shown in FIG. 8 is obtained. In this range, a region between d1 and d2 having high appearance frequency is set as the range to be printed by the low resolution head 1001L. Then, the pixels fall within this region are judged as pixels to be printed by the low resolution head 1001L, and the pixels out of the region are judged as pixels to be printed by the high resolution head 1001H.

Figure 39:
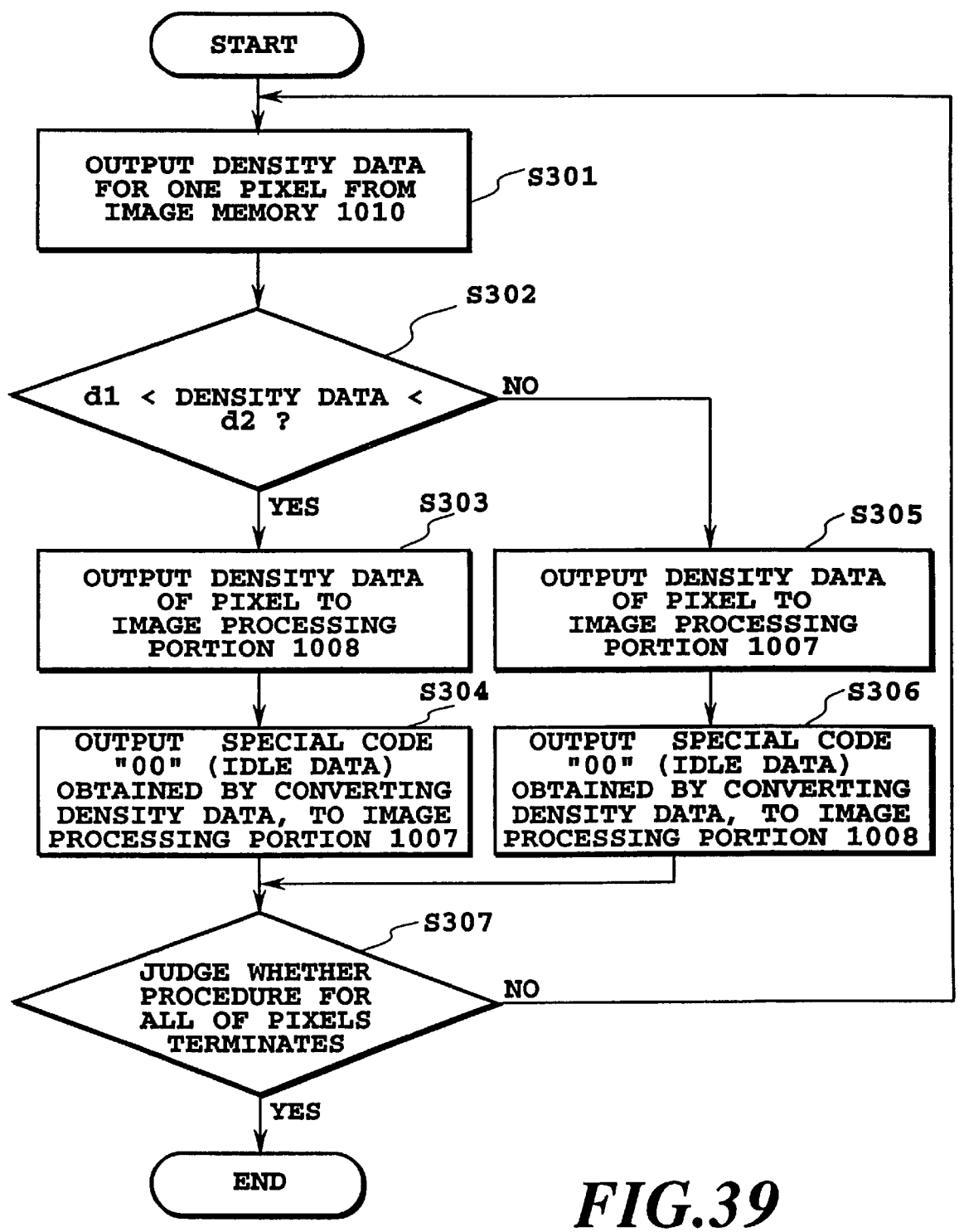
FIG. 39 is a flowchart showing image processing according to another modification to the first embodiment.

FIG. 39 is a flowchart showing an image separating procedure according to the shown modification. The image separating procedure of the shown modification will be explained referring to FIG. 39, as follows.

The density data for a pixel is read from the image memory 1010 (Step 301). In succeeding Step 302, judgement is made whether the pixel is a pixel of the field color or not based on image density designated by the density data. A standard used for discriminating the pixel of the field color from other pixels is preliminarily determined as a density range to be printed by using the low resolution head 1001L, based on image data to be printed, as described referring to FIG. 8. More specifically, the judgement is made whether the pixel being processed is the pixel of the field color or not by judging whether the density of the pixel being processed belongs within the density range or not. In the case that it is judged that the pixel is the pixel of the field color, the density data of the pixel is output to the image processing portion 1008 as it is (Step 303), and, to the image processing portion 1007, the special code "00" (the idle data) which is obtained by converting the density data is output (Step 304). On the other hand, in the case of judging that the pixel is not the pixel of the field color, the density data of the pixel being processed is output to the image processing portion 1007 as it is (Step 305), and in Step 306, the density data of the pixel is converted to the special code "00" and the special code is output to the image processing portion 1008. Then, when the procedure relating to judgement whether the pixel is the pixel of the field color or not is performed with respect to all of the pixels to be processed, the image separating procedure of the shown modification is terminated (Step 307).

Also in the shown modification, it can be eliminated similarly to the first modification that the palette data is converted to the density data in the image processing portions 1007 and 1008.

It should be appreciated that the density region to be set is not necessarily one but can be set two or more with respect to the field color, high density portion and the like. The discrimination based on the palette data described above corresponds to one which pays attention to only predetermined color having the density range of d1 to d2 being d1=d2. The manner of feeding of the data to the image processing portions 7 and 8 is similar to that in discrimination with respect to the palette data.

(Second Embodiment)

In the foregoing embodiments, large dot is formed by constructing the head per se to be able to large ejection amount. In contrast to this, the shown embodiment increases ink ejection amount by selective multiple ejection for forming the large dot without employing the head having different resolution.

For example, normal image is stored in one block of the frame memory and the image to be overlappingly printed is stored in another block. The normal image is printed in the first scan and the image of the overlapping portion is printed in the second scan without feeding the cloth to realize formation of the large dot. Similarly, large dot can be formed by printing plurality of dots in one scan by driving the head at high frequency.

(Third Embodiment)

In the shown embodiment, by employing an ink-jet head having novel ejection system proposed by the assignee, printing similar to the former embodiments can be performed. The ink-jet head employing the novel ejection system is featured by capability of ejection of relatively high viscous ink, of driving at high frequency, and easily realizing small droplet ejection (small ejection amount).

More specifically, the ink-jet head of the novel ejection system has a first liquid passage communicated with ejection opening and a second liquid passage separated by a partitioning wall. A bubbling pressure of a bubble generated by a heater disposed in the second liquid passage is transmitted to the first liquid passage through a movable value provided in the separation wall to eject the liquid within the first liquid passage.

By this system, ejection efficiency is improved. In conjunction therewith, by filling the high viscous ink or the like in the first liquid passage, in which bubble is not generated, high viscous ink can be satisfactorily ejected at high ejection efficiency. Thus, one of the features stated above is realized. Also, by making an area of the heater in the second liquid passage smaller, the ejection amount can be reduced correspondingly. In the case of making the heater smaller in the conventional type head, loss of ejection energy becomes relatively large to cause ejection failure. In contrast to this, with the head in the novel system, for high efficiency, energy loss becomes relatively small. As a result of this, small droplet can be ejected satisfactorily. Furthermore, in the first liquid passage filled with the ejected liquid, since bubble is not generated, re-fill can be performed efficiently to enable high frequency driving.

Figure 9A:
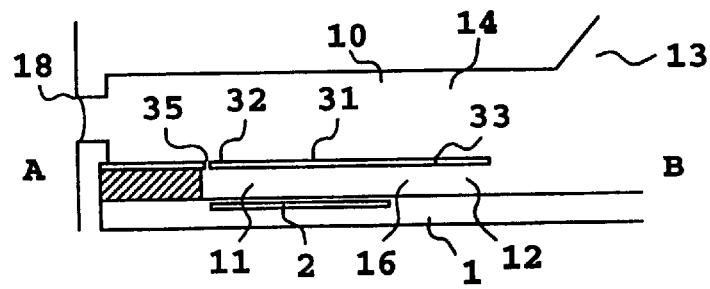
FIGS. 9A to 9D are diagrammatic sections showing one embodiment of a liquid ejection head according to a third embodiment of the present invention.
Figure 9B:
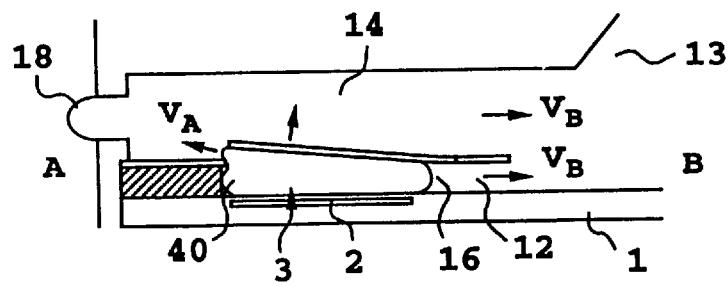
Figure 9C:
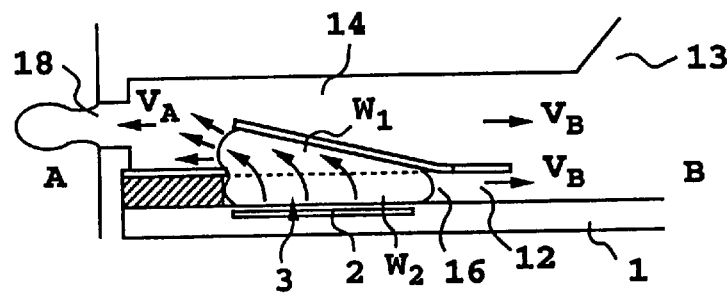
Figure 9D:
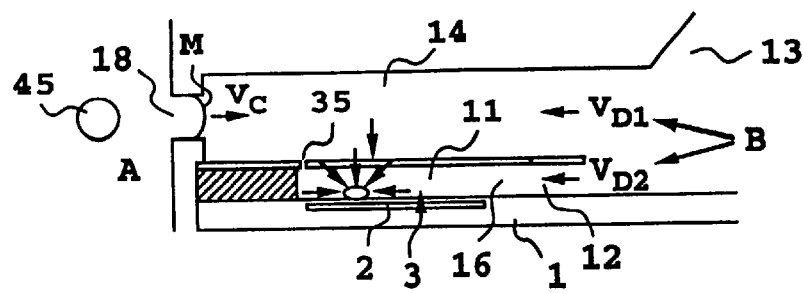
Figure 10:
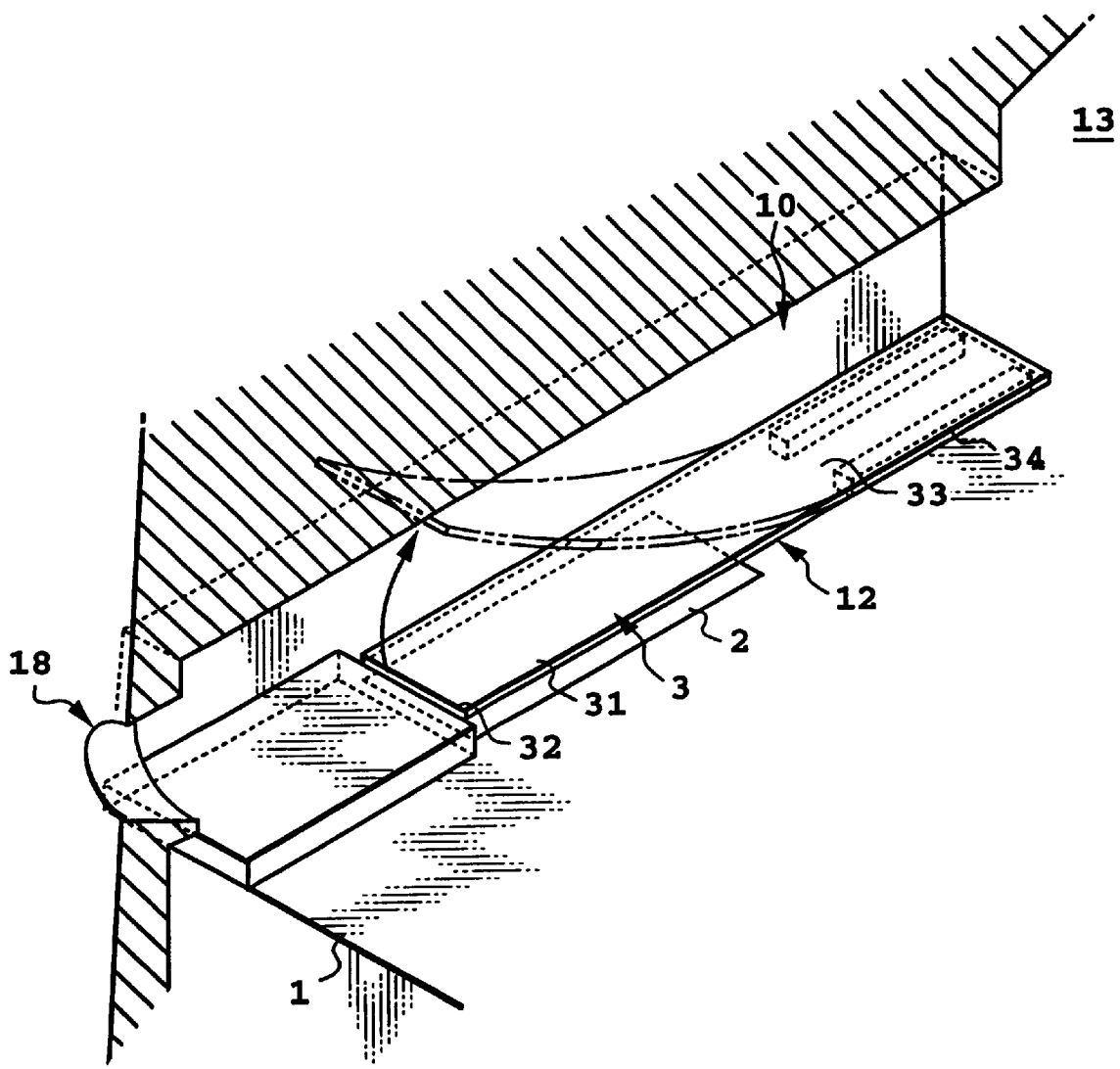
FIG. 10 is a partially cut-out perspective view of the liquid ejection head according to the third embodiment.

FIGS. 9A to 9D are diagrammatic sections showing a liquid ejection head according to the shown embodiment, and FIG. 10 is a partially cut-out perspective view of the liquid ejection head.

A liquid ejection head of the present embodiment is provided with a heater 2 (in the present embodiment, a heating resistor of the shape of 40 $\mu$m×105 $\mu$m) acting a thermal energy on a liquid, as an ejection energy generating element for ejecting the liquid, on an element substrate 1. On the element substrate, a liquid flow passage 10 is arranged corresponding to the heater 2. The liquid flow passage 10 is communicated with an ejection port 18, and also communicated with a common liquid chamber 1 for supplying a liquid to a plurality of the liquid flow passages 10 for receiving the liquid in an amount corresponding to the amount of liquid ejected from the ejection port from the common liquid chamber 13.

On the element substrate of the liquid flow passage 10, a plate form movable member 31 is provided opposing the heater 2, in cantilever fashion. The movable member 31 is formed with a material having resiliency, such as metal or the like and has a flat surface portion. One end of the movable member is fixed to a base (support member) 34 formed by patterning of a photosensitive resin on the wall of the liquid flow passage 10 or the element substrate. By this, the movable member is held and a fulcrum (fulcrum portion) 33 is constructed.

The movable member 31 is arranged in such a manner that it has a fulcrum (fulcrum portion: fixed end) 33 at the upstream side of a flow flowing from the common liquid chamber 13 to the ejection port 18 via the movable member 31, and a free end (free end portion) 32 at the downstream side with respect to the fulcrum 33, and that it is located at a position opposing to the heater 2 in a condition covering the heater 2 with a distance about 15 $\mu$m from the heater 2. A gap between the heater and movable member becomes a bubble generating region. It should be noted that kind, shape and arrangement of the movable member are not limited to the shown kind, shape and arrangement, and can be of any shape and arrangement which can control growth of bubble and transmission of pressure as will be discussed later. It should be noted that the foregoing liquid flow passage 10 will be explained separately dividing into a portion directly communicated with the ejection port 18 as a first liquid flow passage 14, and a portion having the bubble generating region 11 and the liquid supply passage 12 as a second liquid flow passage 16.

By applying a heat for the liquid of the bubble generating region 11 between the movable member 31 and the heater 2 by heating the heater 2, bubble is generated in the liquid by film boiling as disclosed in U.S. Pat. No. 4,723,129. The pressure by generation of bubble and bubble per se are preferentially act on the movable member, and then, the movable member 31 is displaced to toward the ejection port to open widely about the fulcrum 33 as shown in FIGS. 9A, 9B or 2. By displacement or displaced condition of the movable member 31, transmission of the pressure generated by bubble generation and growth of the bubble are directed toward the ejection port.

Here, the basic principle of ejection regarding the present invention will be explained. In the present invention, one of the most important principle is that by the movable member arranged opposing bubble is displaced from the first position in the steady state to the second position after displacement by the pressure of the bubble or the bubble per se, to feed the pressure associating with generation of bubble or the bubble per se toward the downstream side where the ejection port 18 is arranged, by displacement of the movable member 31.

Figure 11:
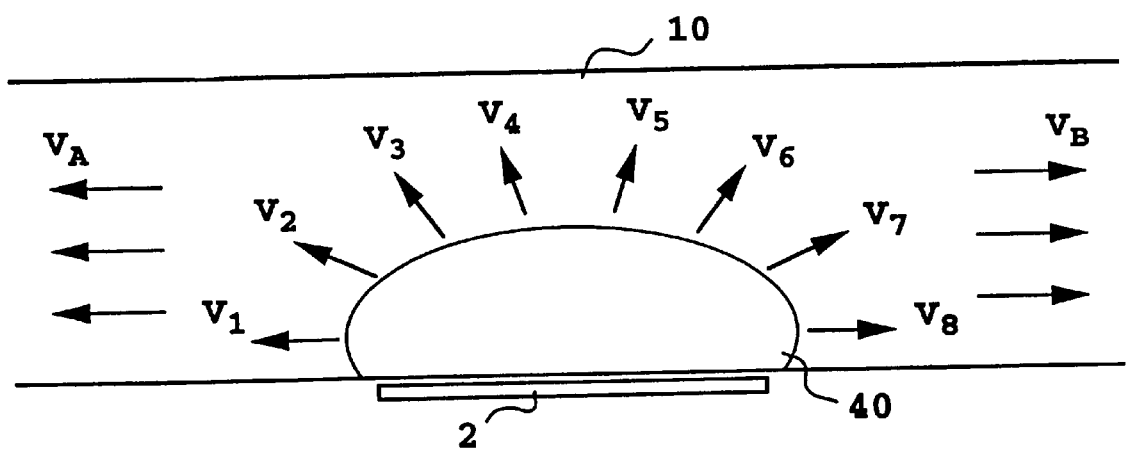
FIG. 11 is a diagrammatic view showing pressure transmission from a bubble in a conventional head.
Figure 12:
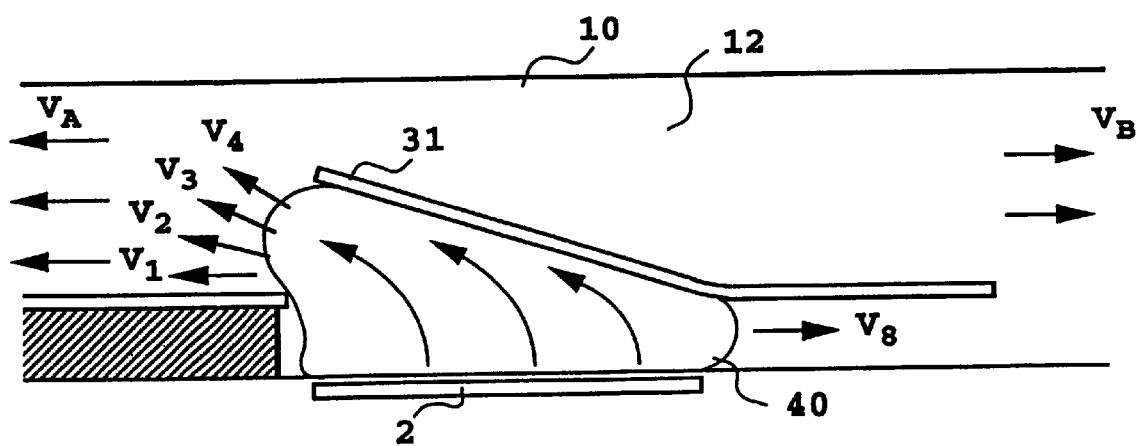
FIG. 12 is a diagrammatic view showing pressure transmission from a bubble in the third embodiment.

This principle will be further explained with comparing FIG. 11 diagrammatically showing the conventional liquid flow passage structure without employing the movable member and FIG. 12 diagrammatically showing the liquid flow passage structure with employing the movable member according to the present invention. It should be noted that here, a transmitting direction of the pressure toward the ejection port is designated by VA and the transmitting direction of the pressure toward the upstream side is designated by VB.

In the conventional head shown in FIG. 11, there is no construction to restrict transmitting direction of the pressure generated by the generated bubble 40. Therefore, pressure transmitting direction of the bubble 40 becomes perpendicular line directions of the surface of bubble as shown by arrows V1 to V8 and thus is directed in various directions. Amongst, one having a component having largest influence in liquid ejection and having pressure transmitting direction in VA direction, is the direction component of the pressure transmission at the portion of the ejection port side with respect to the substantially half position of the bubble. This portion is important portion directly contributing for liquid ejection efficiency, liquid ejection force, ejection speed and so on. Furthermore, V1 is closest to the direction of ejection VA, and thus act efficiently. Conversely, V4 has relatively small component directed toward VA.

In contrast to this, in case of the present invention as illustrated in FIG. 12, the movable member 31 directs the transmitting direction of the pressure in various direction in the conventional head as illustrated in FIG. 11 to the direction of V1 to V4 to lead the pressure toward the downstream side to convert into the pressure transmitting direction of VA. By this, the pressure of the bubble 40 can directly and efficiently contribute for ejection. Furthermore, since the growth direction of the bubble per se is also led toward the downstream side similarly to the pressure transmitting direction V1 to V4 to grow to be greater at the downstream side than the upstream side. As set forth, by controlling the growth direction per se of the bubble and transmitting direction of the pressure of the bubble, ultimate improvement of the ejection efficiency, ejection force, ejection speed and so on can be achieved.

Next, returning to FIGS. 9A to 9D, the ejecting operation of the present embodiment of the liquid ejection head will be described in detail.

FIG. 9A shows a condition before application of an energy, such as an electrical energy or the like to the heater 2 and thus shows the condition before the heater generates heat. The important thing at this condition is that the movable member 31 is provided at a position at least opposing to the downstream side portion of the bubble in relation to the bubble to be generated by the heater. Namely, so that the downstream side portion of the bubble may act on the movable member, the movable member 31 is arranged at least to the downstream position (downstream of a line extending through the center 3 of the area of the heater in a direction perpendicular to the longitudinal direction of the liquid flow passage) of the center 3 of the area of the heater in the liquid flow passage structure.

FIG. 9B shows a condition, in which the electrical energy or the like is applied to the heater 2, the heater 2 is thus heated, a part of the liquid filling the bubble generating region 11 is headed by the generated heat, and thus bubble is generated by film boiling.

At this time, the movable member 31 is displaced from the first position to the second position by the pressure generated by generation of bubble 40 so that the transmitting direction of the pressure of the bubble 40 may be directed toward the ejection port. The important matter herein is that the movable member 31 is arranged to place the free end 32 of the movable member 31 at the downstream side (ejection port side) and to place the fulcrum 33 at the upstream side (common liquid chamber side) to make at least a part of the movable member to opposite the downstream side portion of the heater, i.e., the downstream side portion of the bubble.

FIG. 9C shows the case where the bubble 40 is further grown. According to increasing of pressure due to generation of the bubble, the movable member 31 is further displaced. The generated bubble grows to be greater at the downstream side than that in the upstream position, and in conjunction therewith, the bubble is grown to be greater beyond the first position (position shown by broken line). Thus, by gradually displacing the movable member 31 according to growth of the bubble, the ejection efficiency of the head can be elevated by uniformly directing the transmitting direction of the pressure of the bubble 40 and the direction of easily shifting of volume, namely the grown direction toward the free end 32 of the movable member 31, toward the ejection port. This also contribute for enhancing the ejection efficiency. Upon guiding the bubble, the bubble pressure toward the ejection port, the movable member will never cause interference, and can control transmitting direction of the pressure or the growth direction of bubble depending upon magnitude of the pressure to be transmitted.

FIG. 9D shows a condition where the internal pressure of the bubble 40 is lowered to cause shrinking of the bubble 40 to extinct, after film boiling.

The movable member 31 displaced to the second position then returns to the initial position (first position) of FIG. 9A by vacuum pressure due to shrinking of the bubble and by restitutive force due to the resiliency of the movable member 31 per se. On the other hand, during shrinking of bubble to extinct, in order to compensate the shrinking volume and thus to compensate the ejected amount of the liquid, the liquid flows from the upstream side, i.e. the common liquid chamber side as flows VD1 and VD2 and from the ejection port side as flow Vc.

Referring to FIGS. 9A to 9D, re-filling of liquid in the liquid ejection head according to the invention will be described in greater detail.

A liquid supply mechanism in the present invention will be described in greater detail with reference to FIGS. 9A to 9D.

After a condition shown in FIG. 9C, when the bubble 40 enters into extinction stage after the state of the maximum volume, the liquid in the volume compensating the extinction volume of the bubble flows into the bubble generating region from the ejection port 18 side of the first liquid flow passage 14 and from the common liquid chamber 13 side of the second liquid flow passage 16. In the conventional liquid flow passage structure having no movable member 31, the amount of liquid flowing into the bubble extinction position from the ejection port side and the amount of liquid from the common liquid chamber depend on flow resistance at the portion located at the ejection port side with respect to the bubble generating region and the portion located at the common liquid chamber side with respect to the bubble generating region (depending upon flow resistance of the passage and the inertia of the liquid).

Therefore, when the flow resistance at a portion near the ejection port is smaller, greater amount of liquid flows into the bubble extinction position to increase retracting magnitude of the meniscus. Particularly, when the flow resistance at the portion near the ejection port is made smaller for enhancing ejection efficiency, retraction magnitude of the meniscus M upon extinction of bubble becomes greater to take longer re-fill period to obstruct high speed printing.

In contrast to this, since the present embodiment is provided the movable member 31, assuming that the volume of bubble W is W1 at upper side and W2 at the bubble generating region 11 side across the first position of the movable member 31, retraction of meniscus is stopped at a timing where the movable member returned to the initial (first) position, and remaining volume of W2 is mainly supplied by the flow VD2 of the second liquid flow passage 16. By this, the retraction amount of meniscus which corresponds to approximately half of the volume W of the bubble in the prior art, can be retracted to be about half of W1 which is smaller than half of W.

Furthermore, liquid supply for the column of W2 is performed along the heater side surface of the movable member 31 utilizing the negative pressure upon extinction of bubble, forcedly mainly from the upstream side (VD2) of the second liquid flow passage, quicker re-fill can be achieved.

The feature is that, if the re-filling utilizing the pressure upon extinction of bubble in the conventional head, vibration of meniscus becomes large to cause degradation of printed image quality, whereas, in the high speed re-fill in the present embodiment, liquid communication between the first liquid flow passage at the ejection port side and the bubble generating region is restricted by the movable member, vibration of the meniscus can be restricted to be quite small.

As set forth, according to the present invention, by forced re-fill into the bubble generating region via the liquid supply passage of the second liquid flow passage 16 and high speed re-fill with restricting retraction and vibration of meniscus, stability of ejection, high speed repeated ejection can be achieved. Furthermore, when the present invention is applied for image printing, improvement of printed image quality and high speed printing can be realized.

In the present invention, the following effective function can be achieved: Transmission of the pressure generated by the bubble toward the upstream side (back wave) can be restricted. Among bubbles generated on the heater 2, the most pressure generated by the bubble within the common liquid chamber 13 side (upstream side) serves as a force to push back the liquid toward the upstream side (back wave). This back wave caused increasing of pressure at the upstream side, the liquid movement, and inertia force due to motion of the liquid to lower performance of re-filling the liquid flow passage to obstruct high speed driving. In the present invention, these effect toward the upstream side can be restricted by the movable member 31 to improve re-fill performance.

Next, further particular structure and effect to be achieved by the present embodiment will be explained.

The second liquid flow passage 16 of the present embodiment has a liquid supply passage 12 having internal wall jointed with the heater in substantially flush surface. In such case, supply of the liquid to the bubble generating region 11 and the surface of the heater 2 is performed along the surface at closer side to the bubble generating region 11 of the movable member 31. Therefore, stagnation of the liquid on the surface of the heater 2 can be prevented to promote separating out of the gas dissolved in the liquid and removal of residual bubble remained without extinction. Furthermore, excessive accumulation of the heat can also be prevented. Accordingly, stable bubble generation can be repeated at high speed. It should be noted that while the present embodiment has been described in terms of the head having the liquid supply passage 12 with substantially flat inner wall, it is only required to be smoothly jointed with the surface of the heater and to have smooth inner wall in the liquid supply passage so as not to cause stagnation of the liquid on the heater and significant disturbance in supply of the liquid.

Also, supply of the liquid to the bubble generating region is also performed from VD1 through the side portion (slit 35) of the movable member. However, in that case, in order to guide the pressure on generation of bubble more effectively to the ejection port, a large movable member to cover entire bubble generating region (covering the heater surface) as shown in FIG. 9, and the flow resistance of the liquid in the bubble generating region 11, the region of the first liquid flow passage in the vicinity of the ejection port, are increased by returning the movable member 31 to the first position, and the liquid flow from VD1 to the bubble generating region 11 is blocked. However, in the head structure according to the present invention, because of presence of flow VD1 for supplying the liquid to the bubble generating portion, liquid supply performance becomes quite high so as not to cause lowering of the liquid supply performance even with the construction seeking for improvement of ejection efficiency, such as the movable member 31 entirely covering the bubble generating region 11.

Figure 13:
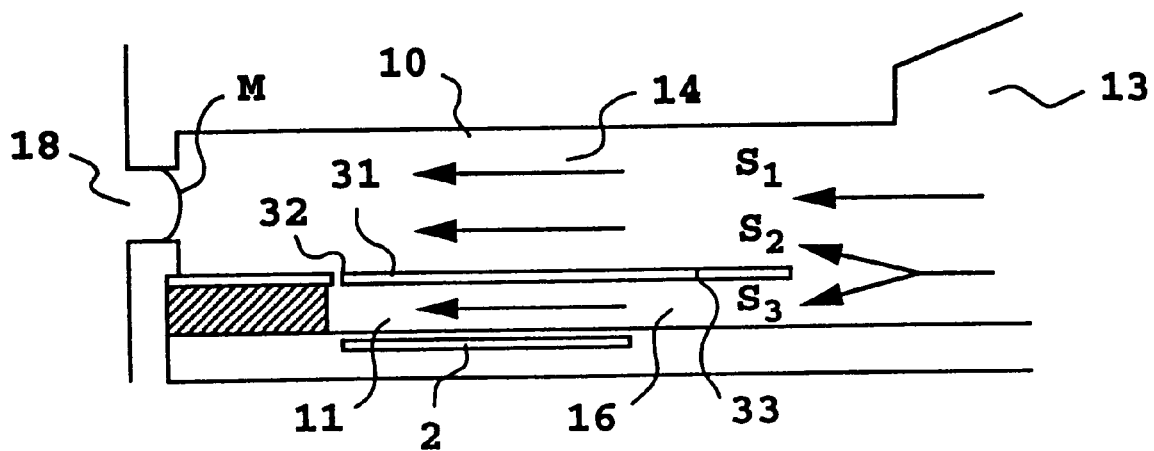
FIG. 13 is a diagrammatic view for explaining flow of the liquid in the third embodiment.

On the other hand, the positional relationship of the free end 32 of the movable member 31 and the fulcrum 33 is that the free end 32 is located at downstream side relative to the fulcrum 33. For such construction, the function and effect to direct the transmission direction of the bubble and the growth direction of the bubble toward the ejection port side upon generation of bubble as set forth above can be efficiently realized. Furthermore, this positional relationship achieves not only the function and effect for ejection as set forth above but also the effect to permit high speed re-fill with reduced flow resistance for the liquid flowing through the liquid flow passage 10 during supplying of the liquid. As shown in FIG. 13, this is because when the meniscus retracted by ejection is returned to the ejection port 18 by capillary effect, or when the liquid is supplied in response to extinction of bubble, the free end of the fulcrum 33 are arranged so as not to resist against the flows S1, S2 and S3 flowing in the liquid flow passage 10 (including first liquid flow passage 14 and the second liquid flow passage 16).

Additionally, in the present embodiment of FIG. 9, the free end 32 of the foregoing movable member 31 is extended with respect to the heater 2 so as to be placed at the downstream side position than the center 3 of the area (line extending across the center of the area of the heater in perpendicular to the longitudinal direction of the liquid flow passage) dividing the heater into the upstream side region and the downstream side region. By this, the pressure or bubble significantly contribute for ejection of the liquid generated at the downstream side of the center position of the area of the heater is received by the movable member 31 to guide the pressure and bubble toward the ejection port side to significantly improve the ejection efficiency and ejection force.

Furthermore, in addition, many effect is achieved by utilizing the upstream side of the bubble.

On the other hand, in the construction of the present embodiment, momentary mechanical displacement of the free end of the movable member 31 also effectively contributes for ejection of the liquid.

Figure 14:
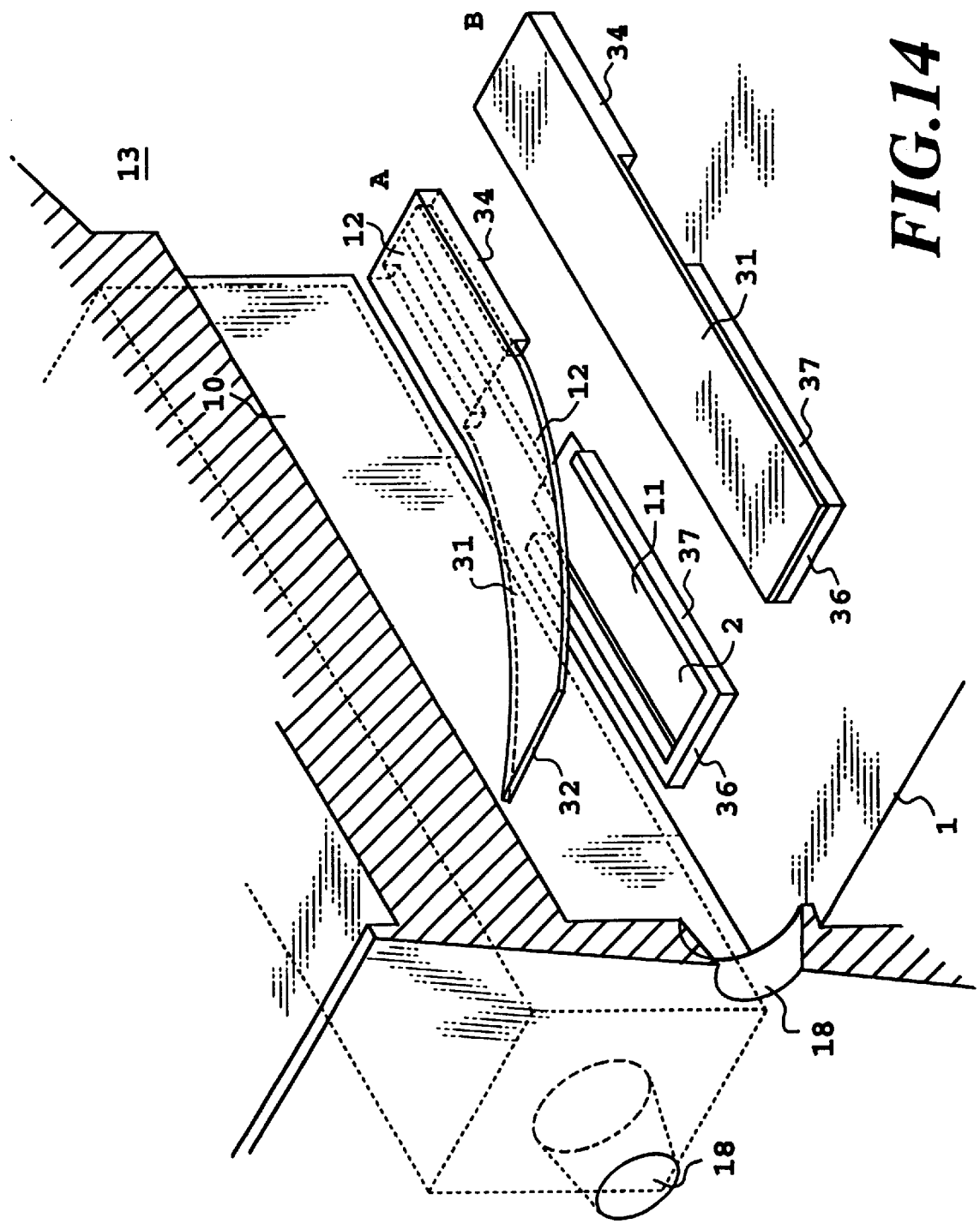
FIG. 14 is a partially cut-out perspective view of an another example of a liquid ejection head according to the third embodiment.

FIG. 14 shows a second embodiment according to the present invention. In FIG. 14, A shows the condition where the movable member is displaced (bubble is not shown), and B shows the movable member in the initial position (first position). At the condition of B, the movable member substantially enclosed the bubble generating region 11 with respect to the ejection port 18. (Here, while not shown, the wall of the liquid flow passage is arranged between A and B to separate the flow passages.)

In FIG. 14, the movable member 31 is provided two bases 34 which are separated from each other, and which are arranged along a direction perpendicular to the longitudinal direction of the liquid flow passage. Between the bases 34, the liquid supply passage 12 is defined. By this, along the heater side surface of the movable member 31, or, in the alternative, from the liquid supply passage having the surface of the movable member 31 is placed in substantially flush with the surface of the heater, or the smoothly joining surface, the liquid can be supplied.

Here, in the initial position (first position) of the movable member 31, the movable member 31 is placed in proximity or in tight contact with the downstream side wall of the heater and the side wall 37 of the heater arranged at the downstream side and the lateral direction of the heater 2 to substantially enclose the ejection port 18 side of the bubble generating region 11. Therefore, the pressure of the bubble, particularly the pressure of the downstream side of the bubble upon bubbling can be concentrically act on the free end side of the movable member without causing escape.

On the other hand, upon extinction of bubble, the movable member is returned to the first position. Then, since the ejection port 18 side in the bubble generating region 11 is substantially enclosed, the liquid supply to the heater upon extinction of bubble can obtain various effect explained in the former embodiment such as retraction of meniscus or the like. Concerning effect in re-fill, similar function and effect to the former embodiment can be obtained.

On the other hand, in the present embodiment, as shown in FIGS. 10 and 14, by providing the base 34 for supporting and fixing the movable member 31 at the upstream side distance from the heater 2, and in conjunction therewith, by providing smaller width for the base 34 than the liquid flow passage 10, liquid supply to the liquid supply passage 12 is performed. On the other hand, the shape of the base 34 is not limited to the shown shape, it can be of any shape which permit smooth re-fill.

It should be noted that, while the distance between the movable member 31 and the heater 2 is in the extent of 15 $\mu$m in the present embodiment, it can be within a range to sufficiently transmit the pressure generated by the growth of bubbles.

Figure 15:
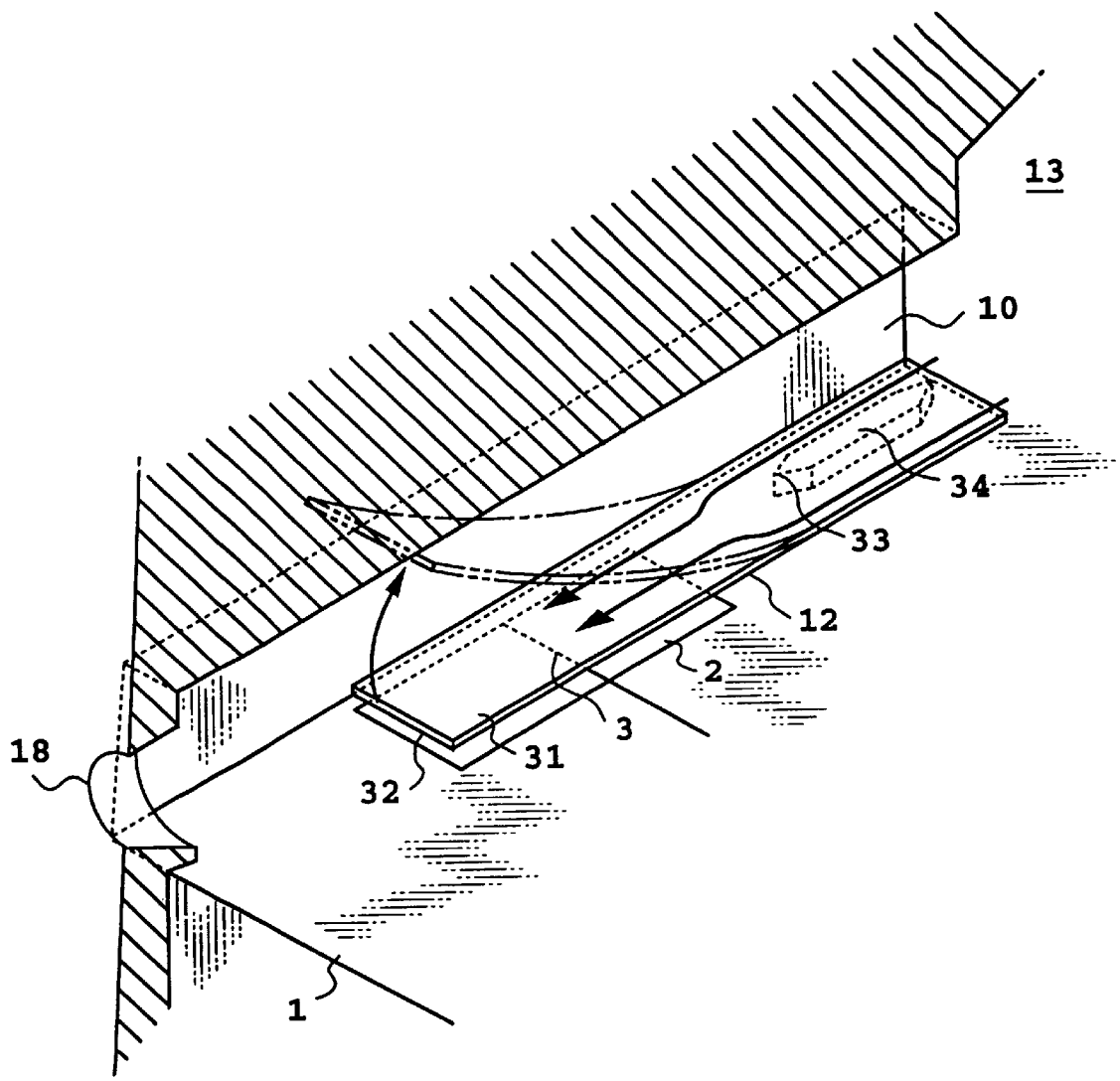
FIG. 15 is a partially cut-out perspective view of a further example of a liquid ejection head according to the third embodiment.

FIG. 15 shows one of basic concept of the present invention, and forms a third embodiment of the present invention. FIG. 15 shows a positional relationship between the bubble generating region in one liquid flow passage and the bubble generated therein and the movable member, and also facilitates a liquid ejection method and re-fill method according to the present invention.

Most of the former embodiments achieve concentration of movement of bubble toward the ejection port in conjunction with abrupt movement of the movable member by concentrating the pressure of the bubble to be generated. In contrast to this, in the present embodiment, with providing freedom for the bubble to be generated, the downstream side portion of the bubble which is the ejection port side portion of the bubble directly acting for ejection of droplet, is restricted at the free end side of the movable member.

Explaining on the construction, in FIG. 15, in comparison with the foregoing FIG. 10 (first embodiment), a projecting portion (hatched portion in the drawing) provided on the element substrate 1 of FIG. 9 and located downstream of the bubble generating region as a barrier, is neglected in the present embodiment. Namely, the free end region and the both side edge regions does not substantially enclose the bubble generating region with respect to the ejection port region but keep it open. This construction is the present embodiment.

In the present embodiment, among the downstream side portion of the bubble which directly act for ejection of the liquid droplet, growth of the bubble in the tip end portion of the downstream side is permitted, the pressure component can be used effectively for ejection. In addition, the pressure at least directed upward acted in the downstream side portion (component forces of VB., VB., VB. of FIG. 11) is added to growth of the bubble at the down stream side by the free end side portion of the movable member to improve the ejection efficiency similarly to the foregoing embodiment. In comparison with the former embodiment, the present embodiment is superior in response characteristics with respect to driving of the heating body.

On the other hand, the present embodiment achieves advantage in fabrication for simple structure.

The fulcrum of the movable member 31 in the present embodiment, is fixed to the single base 34 which has small width respect to the surface portion of the movable member. Accordingly, the liquid supply for the bubble generating region 11 upon extinction of bubble is supplied through both sides of the base (see arrows in the drawing). The base may be of any configuration as long as liquid supply ability can be certainly maintained.

In the present embodiment, since inflow of the liquid to the bubble generating region from upper side in response to extinction of the bubble is controlled, the re-fill becomes superior in comparison with the bubble generating structure. By this, retraction amount of the meniscus can of course be reduced.

As a modification of the present embodiment, a construction, in which only both side edges (can be one side) with respect to the free end of the movable member 31 is substantially enclosed, can be nominated as a preferred modification. With this constriction, the pressure directed toward the side edge of the movable member can also be used by converting into the growth of the bubble at the end portion of the ejection port side as set forth above to further improve the ejection efficiency.

Figure 16:
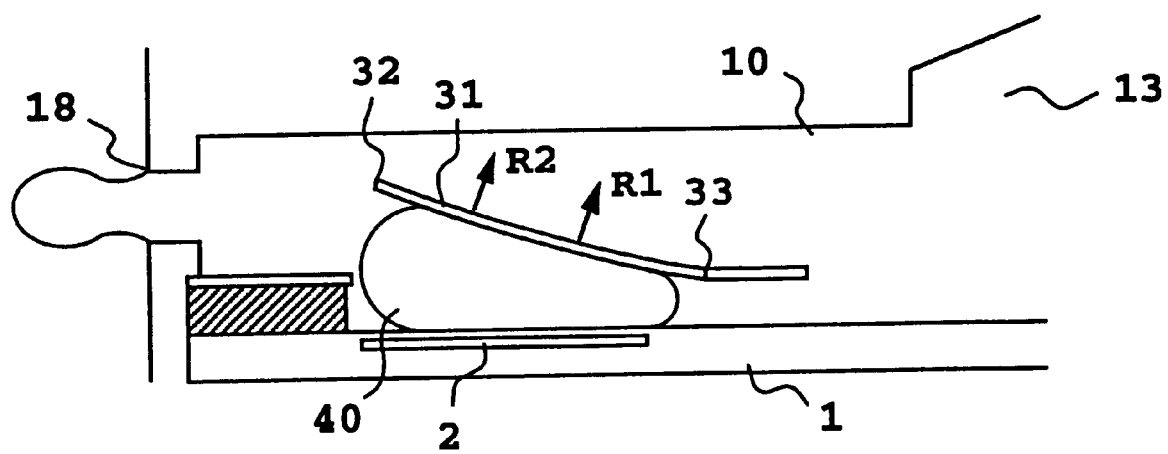
FIG. 16 is a section of a further example of the liquid ejection head according to the third embodiment.

An embodiment further improving the ejection force of the liquid by mechanical displacement set forth above will be explained in the present embodiment. FIG. 16 is a cross section of such head structure. In FIG. 16, there is shown the embodiment, in which the movable member is extended so that the position of the free end of the movable member 31 is located downstream of the heater. By this, displacement speed of the movable member at the free end position can be made higher to further improve generation of the ejection pressure by displacement of the movable member.

On the other hand, in comparison with the former embodiment, the tip end of the movable member is located at a position closer to the ejection port so that growth of the bubble can be concentration to the more stable direction component to achieve superior ejection.

On the other hand, depending upon the bubble growth speed at the center portion of the pressure of the bubble, the movable member 31 displaces at a displacement speed R1. The free end 32 at the distal position farther with respect to the fulcrum 33 that the former position, displaces at higher speed R2. By this, the free end 32 is mechanically active on the liquid at high speed to cause motion of the liquid.

Furthermore, the shape of the free end may contribute for efficient ejection by the pressure of the bubble and the mechanical action of the movable plate by forming the shape of the free end which is perpendicular to the liquid flow, similarly to FIG. 15.

Figure 17A:
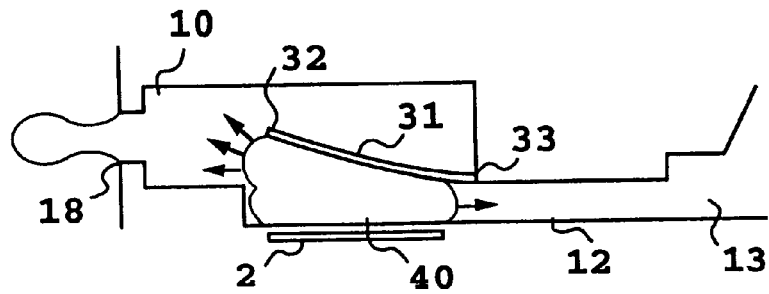
FIGS. 17A to 17C are diagrammatic sections of a further example of the liquid ejection head according to the third embodiment.
Figure 17B:
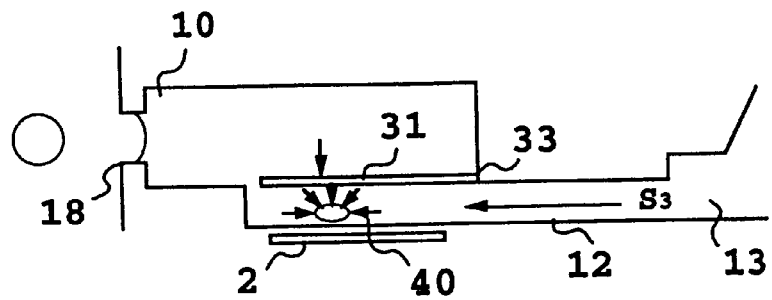
Figure 17C:
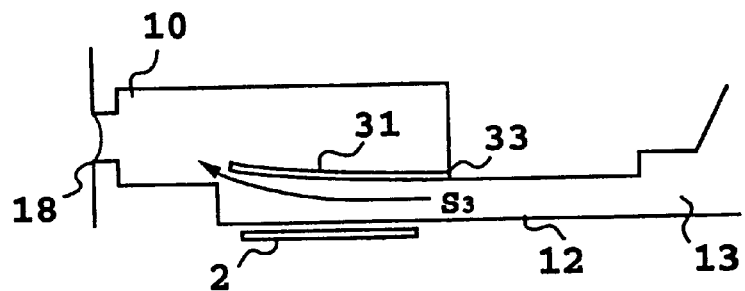

FIGS. 17A, 17B and 17C show the fifth embodiment according to the present invention.

The structure of the present embodiment is different from the former embodiment, in which the region to directly communication is not in a form of the liquid flow passage communicated with the liquid chamber. Thus, structure can be simplified.

All of liquid supply is performed only through the liquid supply passage 12 along the surface of the bubble generating region. The positional relationship of the free end 32 of the movable member and the fulcrum 33 relative to the ejection port, and the construction opposing to the heater 2 are the same as those of the former embodiment.

The present embodiment realizes the foregoing effect, such as ejection efficiency, liquid supply ability and so forth. Particularly, restricting retraction of meniscus and utilizing the pressure upon extinction of bubble, almost all of the liquid supply is performed by utilizing the pressure upon extinction by forced re-fill.

FIG. 17A shows the condition where a bubble in the liquid is generated by the heater 2, and FIG. 17B shows the condition where the bubble is shrinking. At this time, returning of the movable member 31 to the initial position and liquid supply by S3 is performed.

In FIG. 17C, slight retraction of meniscus M upon returning of the movable member to the initial position is re-filled by capillary effect in the vicinity of the ejection port 18 after extinction of the bubble.

Hereinafter, the another embodiment of the present invention will be explained with reference to the drawings.

Even in the present embodiment, primary principle of ejection of the liquid is the same as the former embodiment. However, in the present embodiment, with a mullet-passage construction of the liquid flow passage, and the liquid (bubbling liquid to be bubbled by application of the heat, and the liquid (ejection liquid) to be mainly ejected can be separated.

Figure 18:
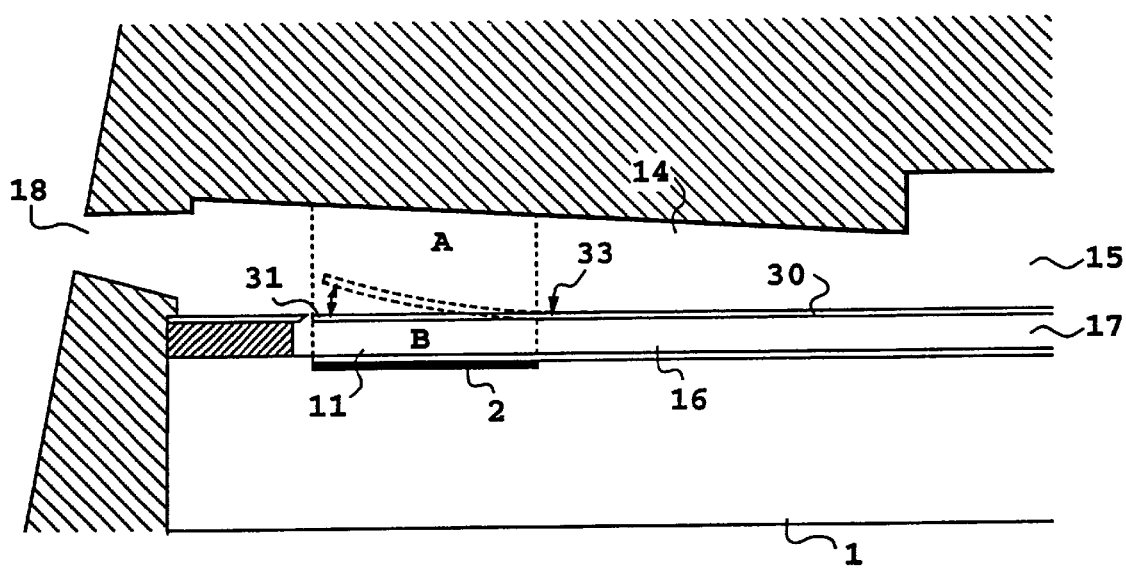
FIG. 18 is a section of a further example of the liquid ejection head (two liquid flow passages) according to the third embodiment.
Figure 19:
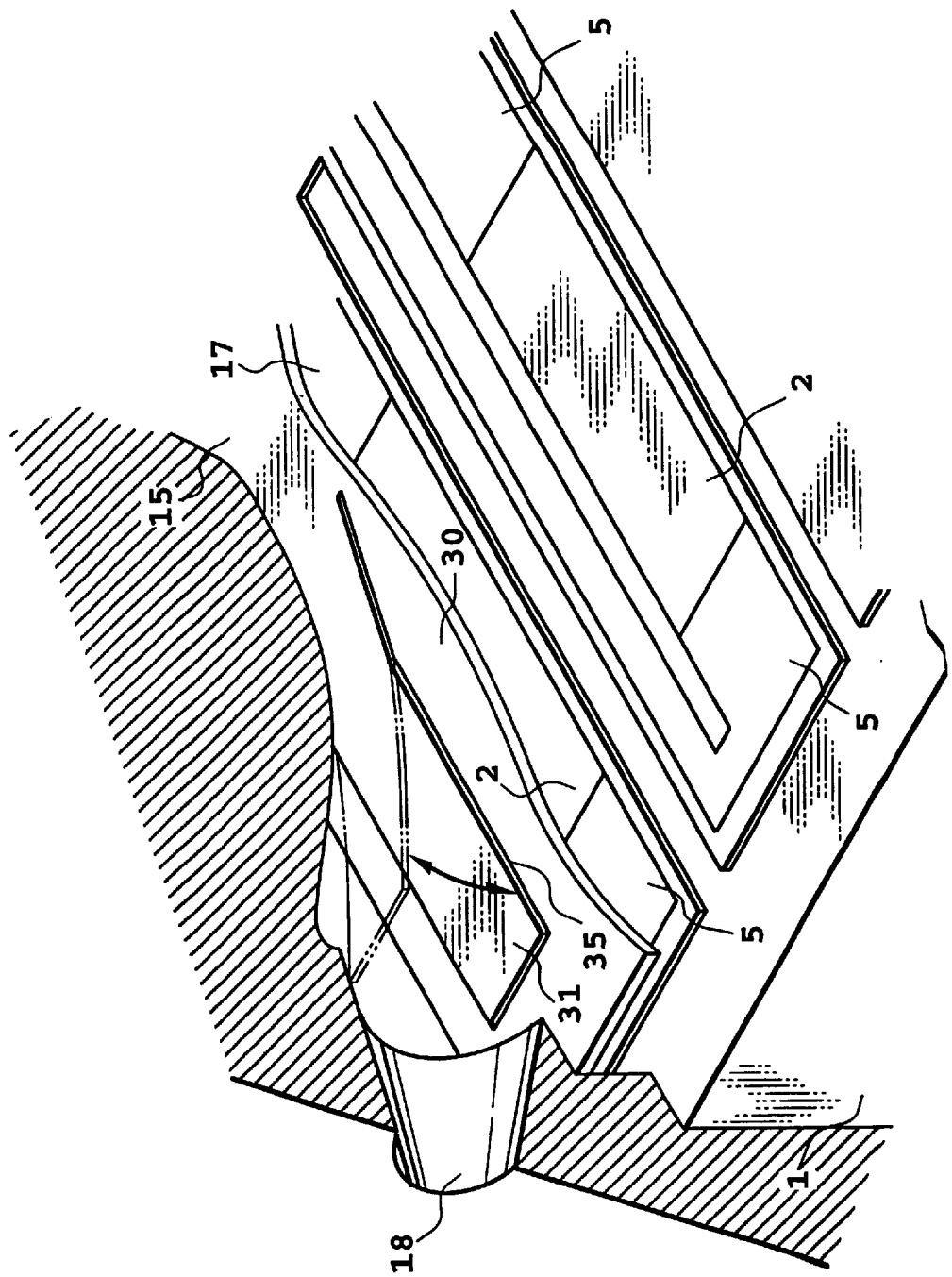
FIG. 19 is a partially cut-out perspective view of a further example of the liquid ejection head according to the third embodiment.

FIG. 18 is a sectional diagram of the liquid flow direction of the liquid ejection head of the present embodiment, and FIG. 19 is a partially cut-out perspective view of the liquid ejection head.

The present embodiment of the liquid ejection head is constructed with the second liquid flow passage 16 for bubbling is arranged on the element substrate 1, in which the heater 2 for providing thermal energy for generating bubble in the liquid, the first liquid flow passage 14 for ejection in direct communication with the ejection port 18 is arranged above the second liquid flow passage 16.

The upstream side of the first liquid flow passage 14 is communicated with the first common liquid chamber 15 for supply the ejection liquid to a plurality of the first liquid flow passage 14, and the side of the second liquid flow passage 16 at the upstream, is communicated with a second common liquid chamber 17.

It should be appreciated that when the bubbling liquid and the ejection liquid are the same, it is possible to unite the common liquid chambers to be a single common liquid chamber.

Between the first and second liquid flow passages 14 and 16, a separation wall 30 formed of a material having elasticity, such as metal to separate the first and second liquid flow passages 14 and 16. It should be noted that when the bubbling liquid and the ejection liquid are the liquids to be not admixed as much as possible, it should be better to separate the liquids in the first and second liquid flow chambers 14 and 16 as much as possible. When no problem will be arisen even if the bubbling liquid and the ejection liquid are admixed, it may not be necessary to provide a function for complete separation.

The portion of the separation wall located in a space above the heater, to which the surface of the heater may be projected (hereinafter referred to as ejection pressure generating region, the region including both region A and the bubble generating region 11 designated by symbol B in FIG. 18), is the movable member 31 in cantilever configuration, which has the free end on the ejection port side (downstream side of the flow of the liquid) and the fulcrum 33 on the common liquid chambers (15, 17) side. Since the movable member 31 is arranged in opposition to the bubble generating region 11 or B, it opens toward the ejection port side of the first liquid flow passage (in the direction of arrow in the drawing) in response to bubbling of the bubbling liquid. Even in FIG. 19, on the element substrate 1, on which the heating resistor portion as the heater 2 and the wiring electrode 5 for applying the electric signal to the heating resistor portion, the separation wall 30 is arranged via a space defining the second liquid flow passage.

The relationship between arrangement of the fulcrum 33 and the free end 32 of the movable member 31 and arrangement of the heater is the same as the former embodiment.

On the other hand, while the relationship of the liquid supply passage 12 and the heater in construction has been explained with respect to the former embodiment, even in the present embodiment, the relationship of constriction of the first liquid flow passage 16 and the heater 2 is the same.

Next, the operation of the present embodiment of the liquid ejection head will be explained with reference to FIGS. 20A and 20B.

Upon driving of the head, as the ejection liquid to be supplied to the liquid flow passage 12 and the bubbling liquid supplied to the second liquid flow passage 16, the same water base ink is employed for operation.

The heat generated by the heater 2 acts on the bubbling liquid within the bubble generating region of the second liquid flow passage, bubble 40 is generated in the bubbling ink through film boiling as disclosed in U.S. Pat. No. 4,723,129, similarly to that described in the former embodiment.

In the present embodiment, bubbling pressure may never escape through three directions except for the upstream side of the bubble generating region. Therefore, the pressure associated with generation of the bubble is concentrically transmitted on the side of the movable member 31 arranged in the ejection pressure generating portion to cause displacement of the movable member 31 from the condition of FIG. 20A toward the first liquid flow passage 14 side as shown in FIG. 20B. By this action of the movable member 31, the first and second liquid flow passages 14 and 16 are communicated with wide path area so that the pressure generated by bubbling is mainly transmitted in the direction toward the ejection port (direction A) of the first liquid flow passage 14. By this pressure transmission and mechanical displacement of the movable member as set forth above, the liquid is ejected through the ejection port.

Figure 20A:
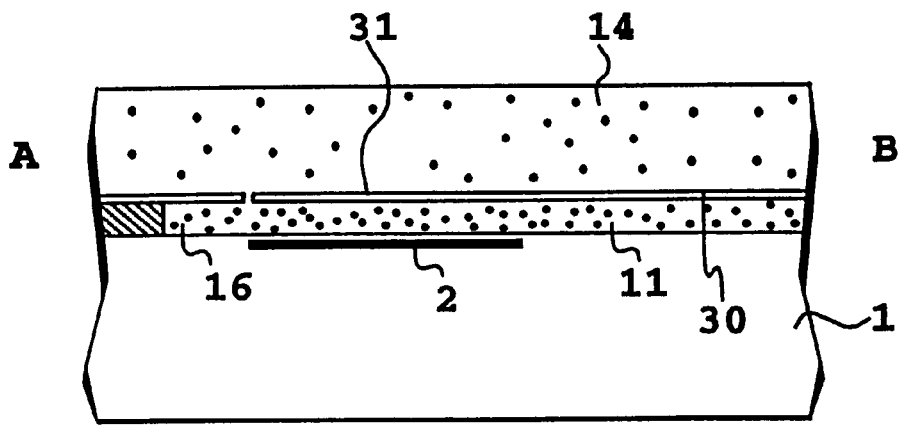
FIGS. 20A and 20B are views for explaining operation of a movable member.

Next, according to shrinking of the bubble, the movable member 31 returned to the position of FIG. 20A. In conjunction therewith, the ejection liquid in amount corresponding to the amount of the ejected liquid is supplied from the upstream side in the first liquid flow passage 14. Even in the present embodiment, supply of the ejection liquid is performed in the direction of closing the movable member similarly to the former embodiment, re-fill of the ejection liquid may not be obstructed by the movable member.

While the present embodiment is the same as the first embodiment and so on in terms of operation and effect of the major part with respect to transmission of the bubbling pressure by displacement of the movable member, growth direction of the bubble, prevention of back wave and the like, following further advantages can be achieved with the two flow passage construction as in the present embodiment.

Namely, with the construction of the foregoing embodiment, the ejection liquid and the bubbling liquid can be mutually different liquid so that the ejection liquid may be ejected by the pressure generated by bubbling of the bubbling liquid. Therefore, even with high viscous liquid, such as polyethylene glycol or the like which is difficult to generate sufficient bubble and can generate insufficient ejection force in the prior art, it becomes possible to obtain satisfactory ejection by supplying the liquid having good bubbling characteristics (a mixture of ethanol: water=4:6 about 1 to 2 cP or the like) or a liquid having low boiling point to the second liquid flow passage.

On the other hand, by selecting a liquid which does not cause deposit, such as torrid or the like on the surface of the heater even in subjecting a heat, as the bubbling liquid, bubbling becomes stable to obtain satisfactory ejection.

Furthermore, in the head structure according to the present invention as set forth above, the effect explained in the former embodiment can be achieved. Thus, the liquid such as the high viscous liquid or the like can be ejected with high ejection efficiency and high ejection force.

On the other hand, even in the case of the liquid weak in the heat, high efficiency and high ejection force of such liquid can be done by supplying such liquid to the first liquid flow passage as the ejection liquid, and by supplying a liquid which is difficult to cause alternation of property due to heat and can easily generate bubble, to the second liquid flow passage, without causing adverse effect.

<Other Embodiments>

The embodiments of the major portion of the liquid ejection head and the liquid ejection method according to the present invention, has been explained. In the description given hereinafter, both embodiments of the embodiment employing the single liquid flow passage and the embodiment employing the dual liquid flow passages, any one of the passages may be taken in the description. However, as long as not specifically mentioned, the embodiment is applicable for both embodiment.

<Ceiling Configuration of Liquid Flow Passage>

Figure 21:
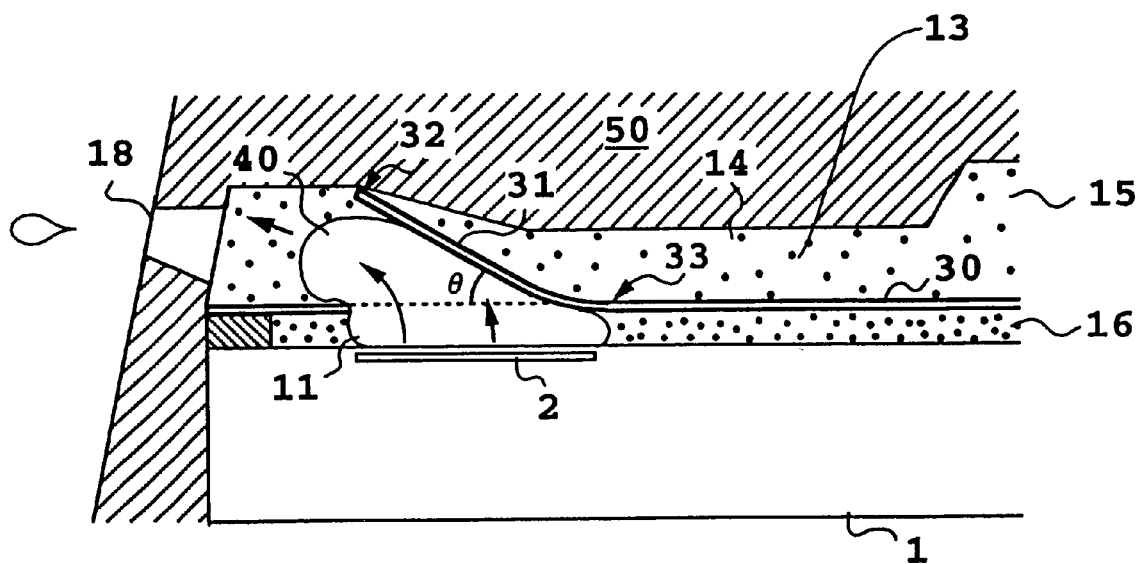
FIG. 21 is a view for explaining a structure of the movable member and a first liquid flow passage.

FIG. 21 is a sectional view in the liquid flow passage direction of the liquid ejection head of the present invention. A grooved member 50 having a groove defining the first liquid current passage 13 (or the liquid flow passage 10 in FIG. 9), is arranged above the separation wall 30. In the present embodiment, the height of the ceiling or an upper plate of the liquid flow passage in the vicinity of the position of the free end of the movable member is high to provide greater operation angle θ of the movable member. The operation range of the movable member may be determined with taking the structure of the liquid flow passage, durability of the movable member, bubbling force and so on. It is desirable that the operation range of the movable member permits operation up to the angle including the axial direction of the ejection port.

On the other hand, as shown in this figure, by proving greater high of the displacement of the free end of the movable member than the diameter of the ejection port, further sufficient ejection force can be transmitted. Also, as shown in this figure, since the height of the upper plate of the liquid flow passage at the position of the fulcrum 33 of the movable member is lower than the height of the upper plate of the liquid flow passage at the position of the free end of the movable member, surge of the pressure wave toward the upstream side can be further effectively prevented.

<Positional Relationship between Second Liquid Flow Passage and Movable Member>

FIGS. 22A, 22B and 22C are illustration for explaining positional relationship between the movable member 31 and the second liquid flow passage 16. FIG. 22A is an illustration of the portion in the vicinity of the separation wall 30 and the movable member 31 as viewed from the above, FIG. 22B is an illustration showing the second liquid flow passage 16 with removing the separation wall 30, as viewed from the above, and FIG. 22C is an illustration showing positional relationship of the movable member 31 and the second liquid flow passage 16 as illustrated diagrammatically by overlapping respective elements. It should be noted that in all figures, lower side in the drawings are the front face side where the ejection port arranged.

The second liquid flow passage 16 of the present embodiment has a narrowed portion 19 at the upstream side of the heater 2 (here, upstream side means the upstream side in the flow from the second common liquid chamber to the ejection port via the heater position, the movable member and the first liquid flow passage) to define a chamber structure (bubbling chamber) which successfully prevent the pressure generated by bubbling from easily escaping toward the upstream side of the second liquid flow passage 16.

In conventional case of the head where the liquid passage of bubbling and the liquid passage for ejecting the liquid are common and the narrowed portion is provided to prevent the pressure generated at the liquid chamber side of the heater from escaping, it was necessary to take a constriction, in which the liquid flow sectional area in the narrowed position is not too small in view of re-fill of the liquid.

However, in the present embodiment, large proportion of the liquid to be ejected is the ejection liquid in the first liquid flow passage, and the bubbling liquid in the second liquid flow passage where the heater is provided, is not consumed in significant amount. Therefore, re-fill amount of the bubbling liquid to the bubble generating region 11 of the second liquid flow passage can be small. Accordingly, the distance in the narrow portion 19 can be quite small in the extent of several μm to several ten-odd ten μm. Therefore, the pressure generating in the second liquid flow passage during bubbling can be restricted from escape to the circumference to concentrically direct to the movable member. Since this pressure can be used as ejection force via the movable member 31, higher ejection efficiency and higher ejection force can be achieved. It should be appreciated that the configuration of the first liquid flow passage 16 is not limited to the foregoing construction, and can be of any shape, through which the pressure generated by bubbling can be effectively transmitted to the movable member side.

As shown in FIG. 22C, the side portion of the movable member 31 covers a part of the wall forming the second liquid flow passage. By this, dropping down of the movable member into the second liquid flow passage is successfully prevented. This enhances separation between the ejection liquid and the bubbling liquid to improve the ejection pressure and the ejection efficiency. Also, it becomes possible to perform re-fill from the upstream side by utilizing the negative pressure upon extinction of bubble.

Figure 20B:
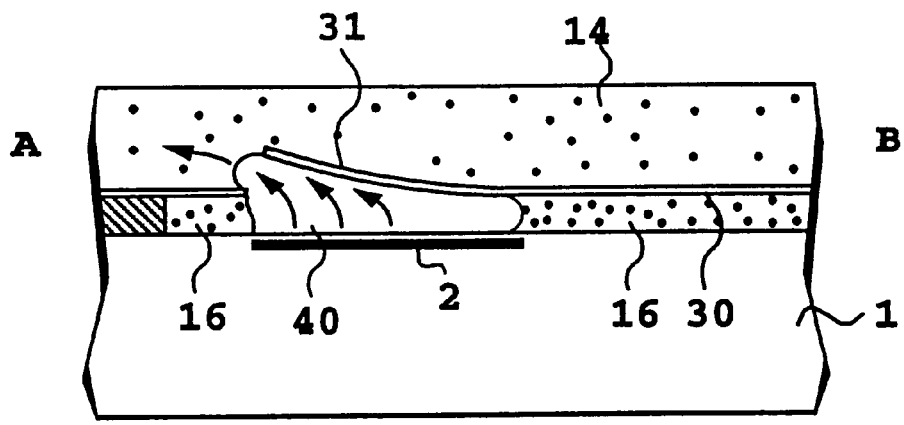

In FIGS. 20B and 21, associating with displacement of the movable member 31 toward the first liquid flow passage 14 side, a part of the bubble generated in the bubble generating region of the second liquid flow passage 16 extends into the first liquid flow passage 14, by selecting height of the second liquid flow passage so that the bubble extends into the first liquid flow passage 14, the ejection force can be improved in comparison with the case where the bubble may not extend into the first liquid flow passage. As set forth, in order to extend the bubble into the first liquid flow passage 14, it is desirable to set the height of the second liquid flow passage smaller than the maximum diameter of the bubble. Preferably, the height may be set within a range of several μm to 30 μm. It should be noted that, in the present embodiment, this height is set at 15 μm.

<Movable Member and Separation Wall>

Figures 23A, 23B, 23C:
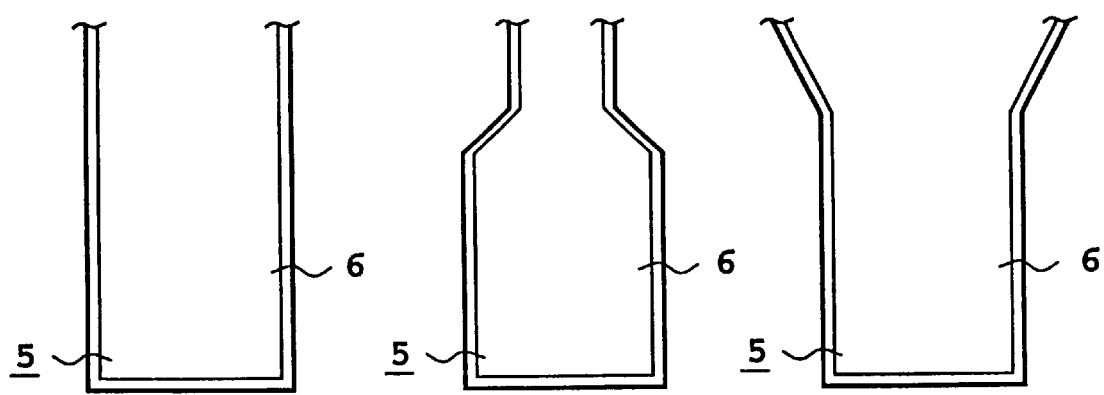
FIGS. 23A to 23C are views for explaining another shapes of the movable member.

FIGS. 23A, 23B and 23C show another configurations of the movable members, in which the reference numeral 35 denotes a slit provided in the separation wall, and by this slit, the movable member 31 is formed. In these figures, FIG. 23A shows a rectangular shaped configuration, FIG. 23B shows the configuration, in which the fulcrum side is formed narrower to facilitate operation of the movable member, and FIG. 23C shows the configuration, in which the fulcrum side is wider for improving durability of the movable member. As the configuration achieving easiness of operation and reasonable durability, the configuration having a narrowed portion with semicircular cut-outs at the fulcrum side as illustrated in FIG. 22A is desirable. However, the configuration of the movable member is only required not to enter into the second liquid flow passage side, easily operated and achieves high durability.

In the former embodiment, the plate form movable member 31 and the separation wall 30 having the movable member is formed with a nickel of 5 μm thick. However, as the material of the movable member and the separation wall, any material which has sufficient resistance to solvent against the bubbling liquid and the ejection liquid, sufficient resiliency for satisfactory operation, and sufficient workability for permitting formation of fine slit.

As material usable for the movable member, it is desired to be selected from the materials having high durability, consisting of metal, such as silver, nickel, gold, iron, titanium, aluminum, platinum, tantalum, stainless steel, phosphor bronze or the like, alloy metals thereof, resin containing nitrile group, such as acrylonitrile, butadiene, styrene or the like, resin containing amide group, such as polyamide or the like, alloy metals thereof, resin containing carboxyl group, such as polycarbonate or the like, resin having aldehyde group, such as polyacetal or the like, resin containing sulfone group, such as polysulfone, other resin, such as liquid crystal polymer or the like, and compounds thereof having high ink resistance, consisting of metal, such as gold, tungsten, tantalum, nickel, stainless steel, titanium or the like, alloy thereof, one coated on the surface with respect to the ink resistance, resin having amide group, such as polyamide or the like, resin having aldehyde group, such as polyacetal or the like, resin containing ketone group, such as polyether ether ketone or the like, resin containing imide group, such as polyimide or the like, resin containing hydroxyl group, such as phenol or the like, resin containing ethyl group, such as polyethylene or the like, resin having alkyl group, such as polypropylene, resin having epoxy group, such as epoxy resin or the like, resin containing amino group, such as melamine formaldehyde resin, methylol group, such as xylene resin or the like, and their compound, and ceramic, such as silicon dioxide and compounds thereof.

As a material usable for the separation wall, resin having high heat resistance, solvent resistance, molding ability typically represented by recent engineering plastic, such as polyethylene, polypropylene, polyamide, polyethylene terephthalate, melamine resin, phenol resin, epoxy resin, polybutadiene, polyurethane, polyether ether ketone, polyether sulfone, polyarylate, polyimide, polysulfone, liquid crystal polymer (LCP) or so forth or their compound, silicon dioxide, silicon nitride, metal, such as nickel, gold, stainless steel or the like and alloy metals thereof, or one provided coating of titanium or gold.

On the other hand, the thickness of the separation wall may be determined in consideration of the material and shape or so forth in viewpoint of strength as the separation wall or good operation as the movable member, and is desirably 0.5 $\mu$m to 10 $\mu$m.

The width of the slit 35 for forming the movable member is set at 2 $\mu$m in the present embodiment. However, when the bubbling liquid and the ejection liquid are different liquids and it is desired to avoid admixing of the liquids, the width of the slit is determined in the extent that meniscus between both the two kinds of liquids to restrict communication between the liquids. For example, when a liquid having about 2 cP of bubbling liquid, and a liquid of greater than or equal to 100 cP as the ejection liquid, admixing of the liquids can be prevented even with the slit in the extent of 5 $\mu$m. However, it is preferred to have the width of slit less than or equal to 3 $\mu$m.

In the present invention, as the movable member, the thickness in the order of $\mu$m (t $\mu$m) is intended and not the thickness in the order of cm. For the movable member of the thickness in the order of $\mu$m, it is desirable to consider certain extent of fluctuation in fluctuation in the case of slit width in the order of $\mu$m is concerned.

When the free end of the movable member to form the slit and/or when the thickness of the member opposite to the side edge is comparable with the thickness of the movable member (FIGS. 20A, 20B, 21 or so on), by setting relationship of the slit width and thickness within the following range in consideration of tolerance in fabrication, admixing the bubbling liquid and the ejecting liquid can be stably restricted. While this is the limited condition, in viewpoint of design, when high viscosity ink (5 cP, 10 cP or so forth) with respect to the bubbling liquid of the viscosity of less than or equal to 3 cP, admixing of two liquid can be restricted for long period by satisfying W/t≦1.

As the slit providing "substantially enclosed condition" in the present invention, the substantially enclosed condition can be certainly established in the order to several $\mu$m.

As set forth above, when the liquids are functionally separated for the bubbling liquid and the ejection liquid, the movable member will substantially be a partitioning member thereof. Upon moving the movable member in response to generation of bubble, the bubbling liquid may be slightly admixed with respect to the ejection liquid. In consideration of the fact that it is typical to contain 3% to 5% of coloring material to be contained in the ejection liquid to form the image, in case of the ink-jet printing, no significant variation of concentration will be caused even when the ejection liquid droplet is contained the second textile ink in the extent less than or equal to 20%. Accordingly, as such mixture, with respect to the droplet of the ejection liquid, mixture of the bubbling liquid and the ejection liquid to be less than or equal to 20% can be contained in the present invention.

It should be noted that, in the implementation of the foregoing embodiment, even by varying viscosity, admixing of the bubbling liquid is 15% at most. In case of the bubbling liquid less than or equal to 5 cP, the mixture ratio is in the extent of 10%, while it is variable detecting upon the driving frequency.

Particularly, by setting the viscosity of the ejection liquid to be less than or equal to 20 cP, admixing can be reduced (to be less than or equal to 5%, for example).

Next, positional relationship between the heater and the movable member in the head will be explained with reference to the drawings. It should be noted that the shape, dimension and number of the movable member and the heater are not restricted to those specified. By optimal arrangement of the heater and the movable member, the pressure upon bubbling by the heater, can be effectively used as the ejection pressure.

Figure 24:
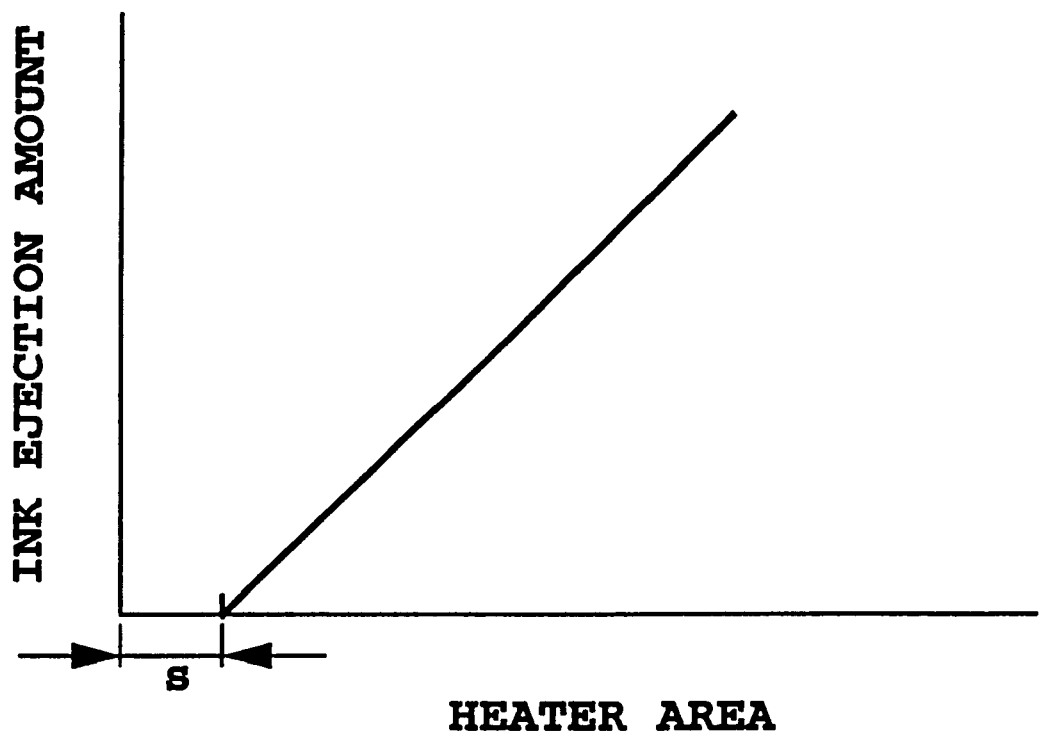
FIG. 24 is a graph illustrating a relationship between an area of a heater and an ink ejection amount.

In the conventional ink-jet printing method, so-called bubble-jet printing method, in which by applying the energy, such as heat, to the ink, abrupt state variation associating with volume variation (generation of bubble) of the ink is caused to eject the ink through the ejection port by the ejection force caused by the state variation to deposit on the printing medium to form the image, it should be appreciated that there is non-effective bubbling region S which does not contribute for ejection of the ink, is present, as shown in FIG. 24. Also, from torrid on the surface of the heater, it should be appreciated that the non-effective bubbling region S extends around the heater. From this result, about 4 $\mu$m width around the heater is considered not contributing for bubbling.

Accordingly, in order to effectively use the bubbling pressure, it can be said to be effective to arrange the movable member so that the effective bubbling region inner side distanced from the circumferential edge of the heater in the extent greater than or equal to about 4 $\mu$m can be covered with the movable region of the movable member. While the effective bubbling region is set to be inside distanced from the circumferential edge of the heater in the extent greater than or equal to about 4 $\mu$m, this region is not specific and is variable depending upon kind and fabrication method of the heater.

FIGS. 25A and 25B are diagrammatic illustrations for the case where a movable member 301 (FIG. 25A) and a movable member 302 (FIG. 25B) having mutually different total area of the movable regions are arranged above the heater 2 of 58×150 ($\mu$m).

The dimension of the movable member 301 is 53×145 ($\mu$m) which is smaller than the area of the heater 2 but is the equivalent dimension and is arranged to cover the effective bubbling region. On the other hand, the dimension of the movable member 302 is 53×220 ($\mu$m) which is greater than the area of the heater 2 (when the width is made equal, the distance between the fulcrum and the movable tip end is longer than that of the heater) and covers the effective bubbling region similarly to the movable member 301. With respect to these two kinds of the movable members 301 and 302, durability of ejection efficiency were measured. The measurement conditions are as follow:

| | |
|---|---|
| Bubbling liquid | ethanol 40% aqueous solution |
| Ejection ink | dye ink |
| Voltage | 20.2 V |
| Frequency | 3 kHz |

As a result performing experiments under the foregoing measurement condition, with respect to durability of the movable member, the movable member 301 of FIG. 25A caused damage at the support portion after $1 \times 10^7$ pulses are applied. On the other hand, the movable member 302 of FIG. 25B did not cause damage even after application of $1 \times 10^8$ pulses. Also, it has been confirmed kinetic energy derived from the ejection amount and the ejection speed with respect to the applied energy has been improved in the extent of about 1.5 to 2.5 times.

From the result set forth above, in view of both of the durability and ejection efficiency, it has been appreciated that it is superior to provide the movable member to cover the right above the effective bubbling region, and the area of the movable member is greater than the area of the heater.

Figure 26:
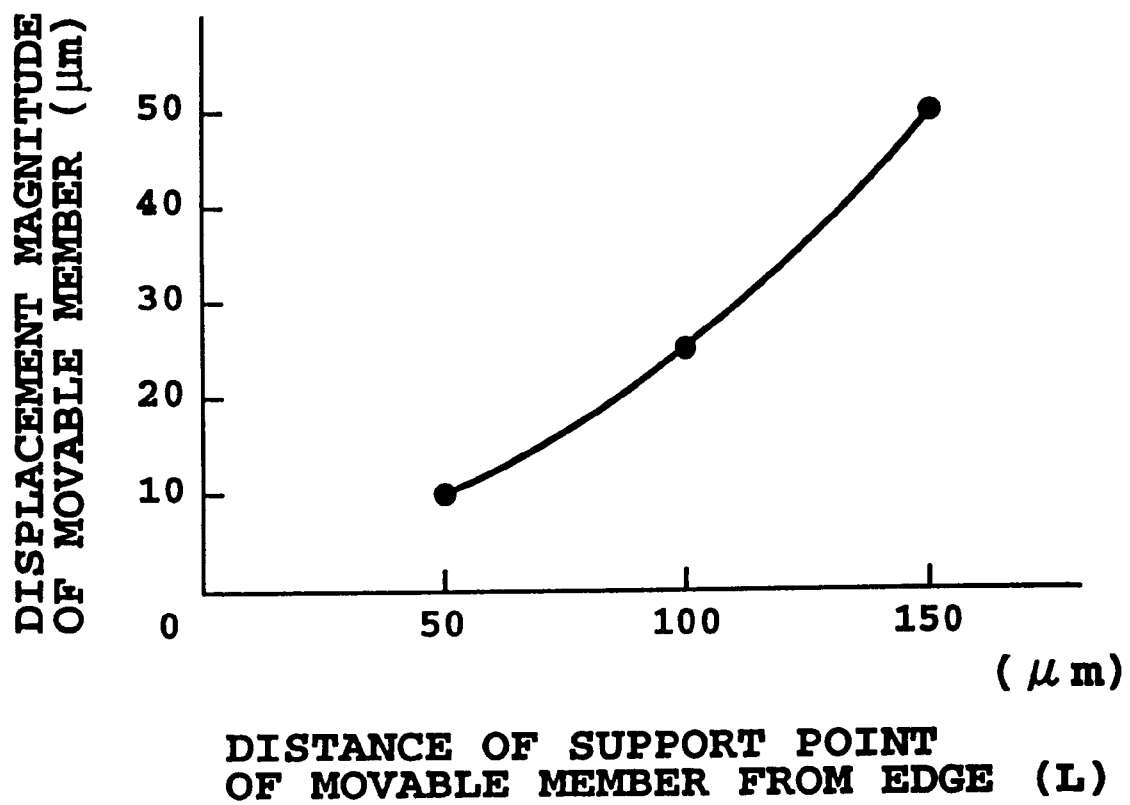
FIG. 26 is a graph illustrating a relationship between a distance between the edge of the heater to a fulcrum and a displacement magnitude of the movable member.
Figure 27:
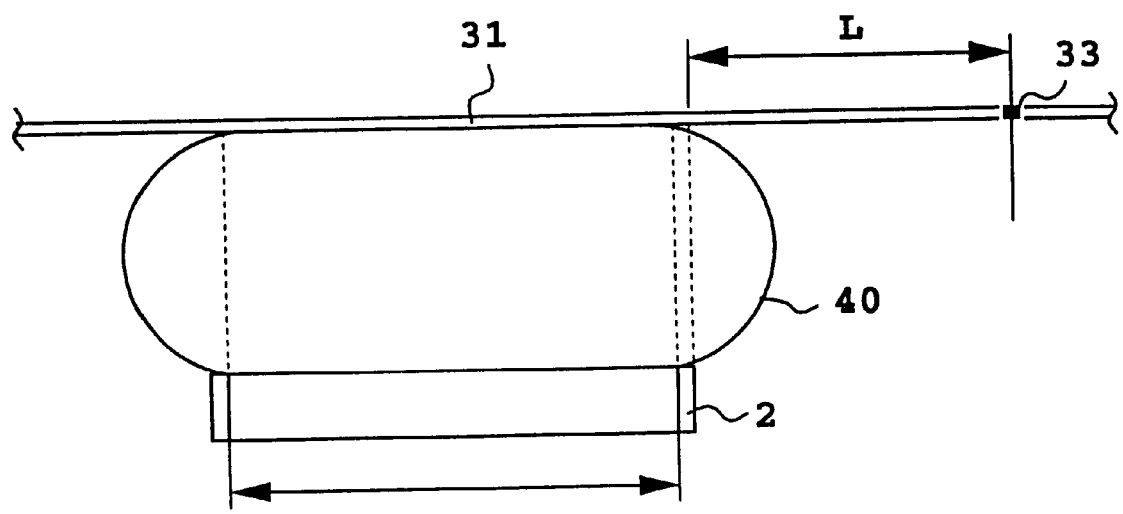
FIG. 27 is a view for explaining relationship of position between the heater and the movable member.

FIG. 26 shows a relationship between the distance from the edge of the heater to the fulcrum of the movable member, and the displacement amount of the movable member. On the other hand, in FIG. 27 sectional illustration of the positional relationship between the heater 2 and the movable member 31 as viewed from the side surface direction. The heater 2 of 40×105 (μm) was employed. It should be appreciated that the magnitude of displacement becomes greater at greater distance 1 from the edge of the heater 2 to the fulcrum 33 of the movable member 31. Accordingly, depending upon the demanded ink ejection amount, liquid flow passage structure for the first textile ink and configuration of the heater, an optimal magnitude of displacement is derived to determine the position of the fulcrum of the movable member based thereon.

On the other hand, when the fulcrum of the movable member is located right above the effective bubbling region of the heater, a bubbling stress may be directly exerted on the fulcrum in addition to the stress due to displacement of the movable member to lower durability of the movable member. According to the experiments performed by the inventor, when the fulcrum is provided right above the effective bubbling region, damage was caused in the movable member in the extent of $1 \times 10^6$ pulses. This confirms lowering of the durability. Accordingly, by arranging the fulcrum of the movable member out of the region right above the effective bubbling region, the durability of the movable member can be improved in the extent adapted to the practical use even when the configuration and material of the movable member does not achieve high durability. It should be appreciated that even when the fulcrum is present right above the effective bubbling region, the movable member may be used satisfactorily by selecting the configuration and material appropriately. In such construction, the liquid ejection head achieving high ejection efficiency and superior durability can be obtained.

<Element Substrate>

Hereinafter, the construction of the element substrate, on which the heater is provided for applying heat to the liquid will be explained.

Figure 28A:
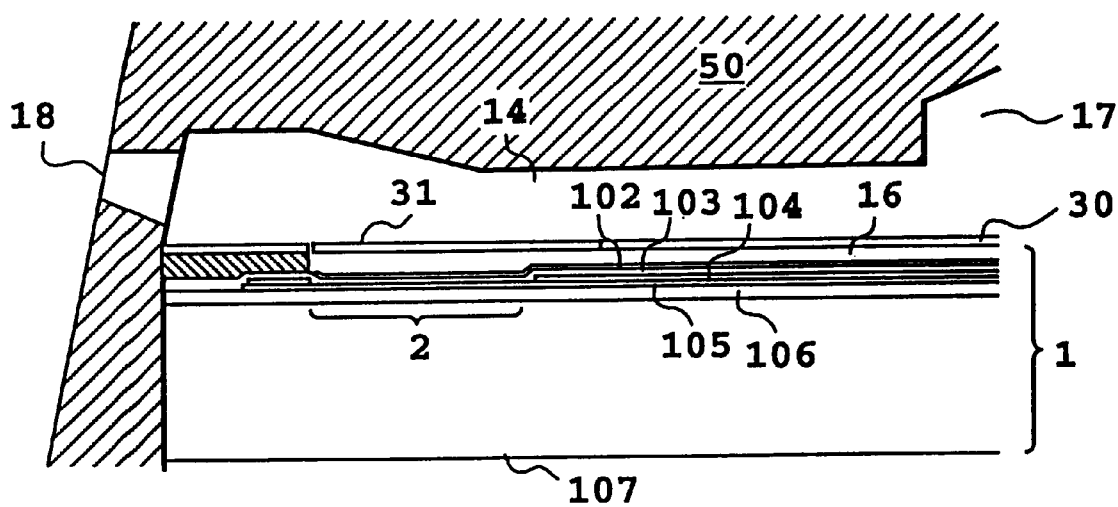
FIGS. 28A and 28B are longitudinal sections of the liquid ejection head according to the third embodiment.
Figure 28B:
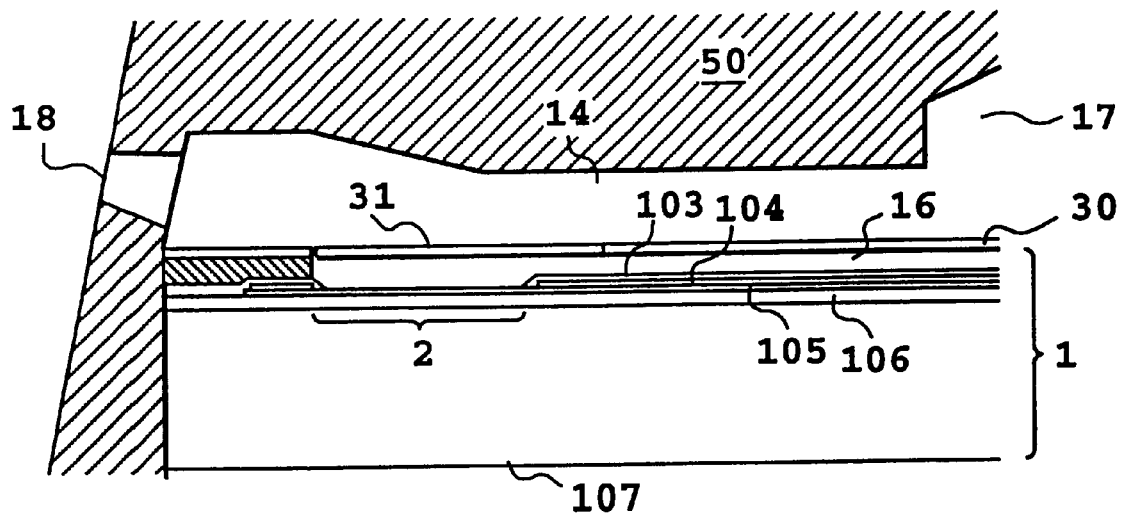

FIGS. 28A and 28B are longitudinal sections of the liquid ejection head according to the present invention, wherein FIG. 28A shows the head with a protective layer set out later, and FIG. 28B is the head having no protective layer.

On the element substrate 1, the second liquid flow passage 16, the separation wall 30, the first liquid flow passage 14 and the grooved member 50 formed with the groove for defining the first liquid flow passage are arranged.

In the element substrate 1, silicon oxide layer or silicon nitride layer 106 for insulation and heat accumulation is deposited on a substrate 107 of silicon or the like. On the silicon oxide layer or silicon nitride layer 106, an electric resistor layer 105 (0.01 to 0.2 μm thick), such as hafnium diboride ($HfB_2$), tantalum nitride (TaN), tantalum aluminum (TaAl) or the like, and a wiring electrodes 104 (0.2 to 1.0 μm thick) of aluminum or the like are patterned as shown in FIG. 19. Applying a voltage from the two wiring electrodes to the resistor layer 105 to flow a current to generate a heat. On the resistor layer between the wiring electrodes, a protective layer of 0.1 to 2.0 μm thick is formed with silicon oxide or silicon nitride. Furthermore, over the protective layer, an anti-cavitation layer (0.1 to 0.6 μm thick) of tantalum or the like is deposited for protecting the resistor later 105 from various liquid, such as an ink.

Particularly, the pressure to be generated upon extinction of bubble or impulsive wave is quite strong to significantly lower durability of stiff and brittle oxide layer. Therefore, the metal, such as tantalum (Ta) or the like is used as the anti-cavitation layer.

On the other hand, by combining the liquid, the liquid flow passage construction, resistor material, it can be establish a structure which does not require the protective layer, as shown in FIG. 28B. As a material for the resistor layer which does not require the protective layer, iridium-tantalum-aluminum alloy or the like may be employed.

As set forth above, as the construction of the heater in the foregoing respective embodiment, it may be only the resistor layer (heating portion), or in the alternative, the protective layer may be formed for protecting the resistor layer.

In the present embodiment, the heating portion constructed with the resistor layer which generates a heat in response to the electric signal, is employed as the heater. However, the heater is not specified to the shown construction but can be of any construction as long as sufficient bubble can be generated in the so as to eject. For example, an optical-thermal transducer heated by receiving a light, such as a laser beam or the like or a heating body to be heated in response to a high frequency, may be employed as the heater.

It should be noted that on the foregoing element substrate 1, in addition to the resistor layer 105 forming the heating portion and the electrothermal transducer constructed with the wiring electrodes 104 for supplying the electric signal to the resistor layer, functional device, such as transistors, diodes, latch, shift register and so on are integrally formed through a semiconductor fabrication process.

Figure 29:
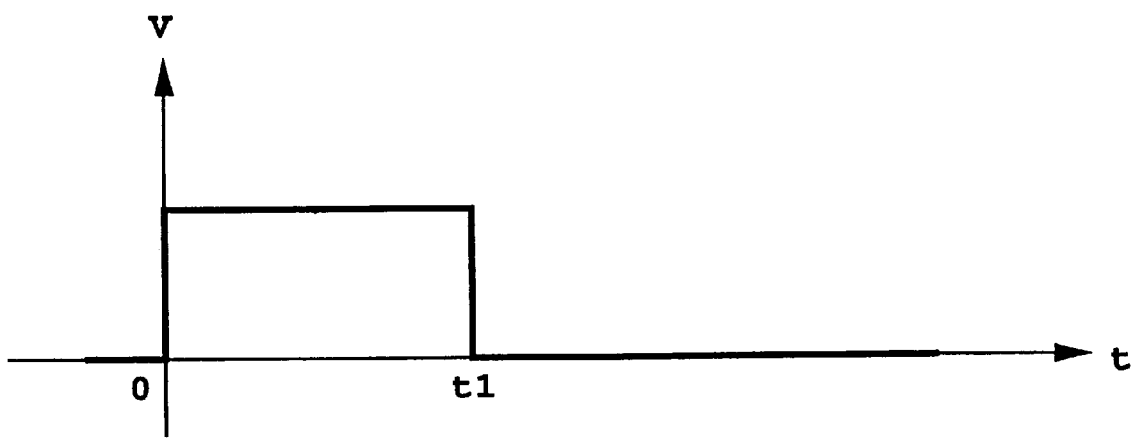
FIG. 29 is a diagrammatic view showing shape of a driving pulse.

On the other hand, in order to drive the heating portion of the electrothermal transducer provided on the element substrate for ejecting the liquid, a rectangular pulse as shown in FIG. 29 is applied to the resistor layer 105 via the wiring electrodes 104 to abruptly heat the resistor layer between the wiring electrodes. In the head of respective of the foregoing head, a voltage 24V, a pulse width 7 μsec, a current 150 mA are applied as the electric signal at a frequency of 6 kHz to drive the heater. By the foregoing operation, the liquid is ejection from the ejection ports. However, the condition of the driving signal is not limited to the above, but can be of any driving signal which can appropriately cause bubbling of the bubbling liquid.

<Head Structure with Dual Liquid Flow Passage Construction>

Hereinafter, an embodiment of the liquid ejection head which can satisfactorily introduce mutually different liquid in the first and second common liquid chamber to contribute for reduction of number of parts and thus to enable lowering of the cost.

Figure 30:
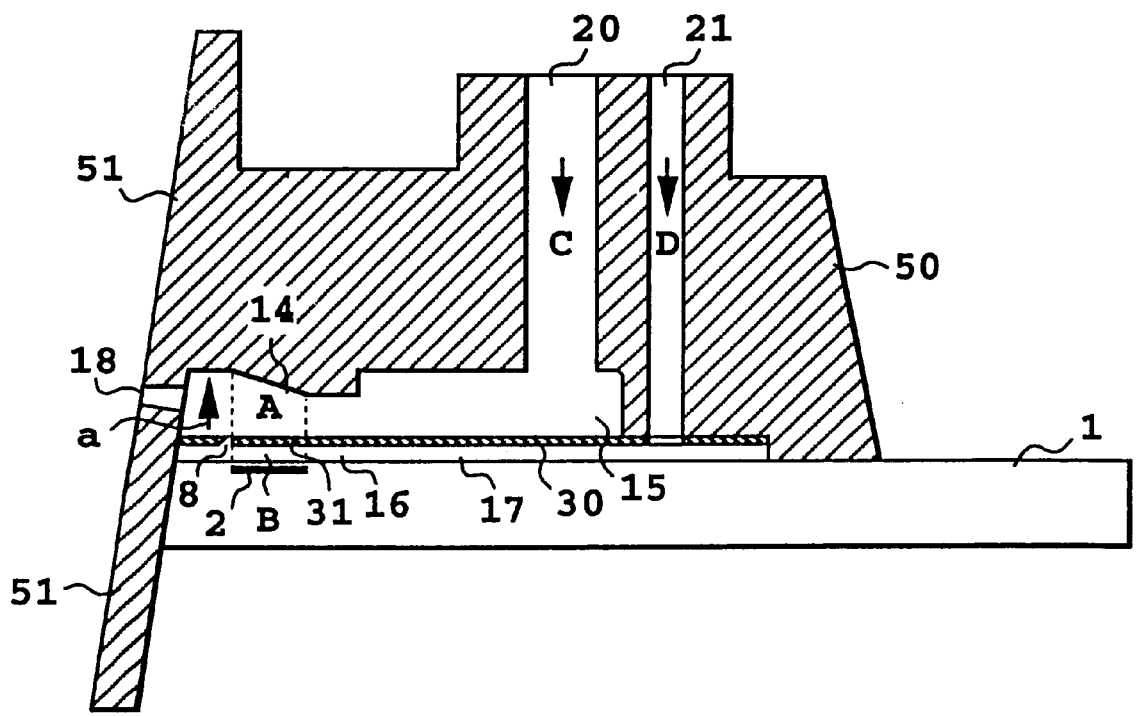
FIG. 30 is a section for explaining a supply passage of the liquid ejection head according to the third embodiment.

FIG. 30 is a diagrammatic illustration showing a structure of the liquid ejection head. It should be noted that like elements to the former embodiments will be identified by the same reference numeral and detailed description therefor keep the disclosure simple enough to facilitate clear understanding of the invention.

In the present embodiment, the grooved member 50 is generally comprises an orifice plate 51 having the ejection ports, a plurality of grooves forming a plurality of first liquid flow passages 14, and a cavity forming the first common liquid chamber 15 for supplying the liquid (ejection liquid) to each of the first liquid flow passage 14.

On the lower portion of the grooved member 50, the separation wall 30 is coupled to define a plurality of the first liquid flow passage 14 can be formed. Such grooved member 50 has a first liquid supply passage 20 reaching into the first common liquid chamber 15 from the above. Also, the grooved member 50 has the second liquid supply passage 21 extending through the separation wall 30 to reach the second common liquid chamber 17 from the above.

The first liquid (ejection liquid) is supplied to the first common liquid chamber 15 via the first liquid supply passage 20, and then supplied to the first liquid flow passage 14, as shown by arrow C in FIG. 30. On the other hand, the second liquid (bubbling liquid) is supplied to the second common liquid chamber 17 via the second liquid supply passage 21, and then supplied to the second liquid flow passage 16 as shown by arrow D in FIG. 30.

In the present embodiment, the second liquid supply passage 21 is arranged in parallel to the first liquid supply passage 20. However, the layout of the first and second liquid supply passages 20 and 21 is not specified to the shown arrangement, but any arrangement may be employed as long as communication with the second common liquid chamber 17 extends through the separation wall 30 arranged at the outer side of the first common liquid chamber 15.

On the other hand, the thickness (diameter) of the second liquid supply passage 21 is determined in view of the supply amount of the liquid therethrough. The cross section of the second liquid supply passage 21 is not necessarily circular but can be of any appropriate configuration, such as rectangular or the like.

On the other hand, the second common liquid chamber 17 may be defined by separating the grooved member 50 with the separation wall. As a method of forming, as shown by exploded perspective view shown in FIG. 31, it can be formed by forming the common liquid chamber frame and the second liquid flow passage wall by a dry film, on the element substrate, and an assembly of the grooved member 50 with the separation wall 30 coupled to the former are bonded to the element substrate 1 to form the second common liquid chamber 17 and the second liquid flow passage 16.

In the present embodiment, on the support body formed with a metal, such as aluminum or the like, the element substrate 1 which is provided with a plurality of electrothermal transducer element as the heater for generating heat for generating the bubble by film boiling in the bubbling liquid.

On the element substrate 1, a plurality of grooves forming the liquid flow passages 16 defined by the second liquid flow passage wall, a cavity forming the second common liquid chamber (common bubbling liquid chamber) for supplying bubbling liquid into each bubbling liquid passage, and the above mentioned separation wall provided with the movable member 31 are arranged.

The reference numeral 50 denoted the grooved member. The grooved member includes the groove forming the ejection liquid flow passage by coupling to separation wall 30, the cavity for forming the first common liquid chamber (common ejection liquid chamber) 15 for supplying the ejection liquid to the ejection liquid flow passage, the first supply passage (ejection liquid supply passage) 20 for supplying the liquid to the first common liquid chamber, and the second supply passage (bubbling liquid supply passage) for supplying the bubbling liquid to the second common liquid chamber 17. The second supply passage 21 is connected to a communication path which is, in turn, communicated with the second common liquid passage 17 through the separation wall 30 located outside of the first common liquid chamber 17. By this communication passage, the ejection liquid can be supplied to the second common liquid chamber 17 without causing admixing with the ejection liquid.

It should be noted that the movable member 31 positioned on separation wall 30 is arranged opposing to the to the heater of the element substrate 1. Corresponding to the movable member 31, the ejection liquid flow passage 14 is arranged. On the other hand, in the present embodiment, there is illustrated the embodiment, in which a second supply passage is arranged in one of the grooved member. However, it is possible to provide a plurality of the second liquid supply passage depending upon supply amount of the textile ink. Furthermore, the cross sectional areas of the ejection liquid supply passage 20 and the bubbling liquid supply passage 21 may be determined depending upon supply amount of the ejection liquid and the bubbling liquid.

Thus, by optimization of the cross section area, the parts forming the grooved member 50 and so on can be made more compact.

With the present embodiment set forth above, the second supply passage supplying the second liquid to the second liquid flow passage and the first supply passage supplying the first liquid to the first liquid flow passage are formed on the common grooved member serving as grooved upper plate. Thus, number of parts becomes smaller to permit shortening of the process to result is lowering of the cost.

On the other hand, the supply of the second liquid to the second common liquid chamber communicated with the second liquid flow passage is performed by the second liquid flow passage in a direction extending through the separation wall separating the first and second liquid. This requires bonding process of the separation wall, the grooved member and the substrate formed with the heaters can be done at one time to improve easiness of fabrication and improve bonding accuracy to results in good ejection.

On the other hand, since the second liquid is supplied to the second common liquid chamber through the separation wall, supply of the second liquid to the second liquid flow passage can be assured to certainly reserve sufficient amount to permit stable ejection.

<Ejecting Liquid and Bubbling Liquid>

As explained with respect to the former embodiment, the present invention is able to perform ejection with higher ejection pressure, higher ejection efficiency and higher speed than the conventional liquid ejection head, with the construction where the movable member is provided.

In the present embodiment, when the same liquid is used for the bubbling liquid and the ejecting liquid, various liquids may be employed as long as the following conditions are met: the liquid may not bed degraded by the heater; the liquid does not easily form deposits on the heater from heating; the liquid is capable of a reversible state variation between a vaporized state and a condensed state; and, the liquid may not easily wear out the liquid flow passage, the movable member, the separation wall, or the like.

Amongst such liquid, as the liquid for performing printing (printing liquid), an inks having composition used in the conventionally ink employed in the conventional bubble-jet apparatus.

On the other hand, when the dual flow passage is employed, and the ejection liquid and when the ejection liquid and the bubbling liquid are mutually distinct, any liquid which can satisfy the foregoing condition may be used. In practice, methanol, ethanol, n-propanol, isopropanol, n-hexane, n-heptan, n-octan, toluene, xylene, methylene dichloride, tricrene, freon TF, freon BF, ethyl ether, dioxane, cyclohexane, methyl acetate, ethyl acetate, acetone, methyl ethyl ketone, water and the like, and their mixture can be the material for the bubbling liquid.

As the ejection liquid, various liquid may be employed irrespective of bubbling ability and thermal property. Also, the liquid having low bubbling ability, the liquid which is easily cause alternation or degradation by heat, or high viscous liquid, which have been considered difficult to use, can be used.

However, it is desired that the liquid may not obstruct ejection, bubbling, operation of the movable member or provide any adverse effect for the heat operation, by in nature of the ejection liquid or by reaction with the bubbling liquid.

As the ejection liquid for printing, high viscous ink and the like can be used. As other ejection liquid, a liquid of pharmaceutical preparations, perfume and the like may also be used.

In the present invention, printing was performed employing the ink having the following composition as a printing liquid which can be used both for the ejection liquid and the bubbling liquid. As a result, it has been found that owing to improvement of ejection force, the ink ejection speed became higher to results in improvement of accuracy of hitting of the liquid droplet to quite good printing image could obtained.

| | |
|---|---|
| (C.I. food black 2) dye | 3 Wt % |
| diethylene glycol | 10 Wt % |
| thiodigylcol | 5 Wt % |
| ethanol | 3 Wt % |
| water | 77 Wt % |

Also, printing was performed by ejection with combining a liquid having the following composition with the bubbling liquid and the ejection liquid. As a result, ejection could be performed for the liquid having viscosity of several ten cp. which has been difficult to eject in the conventional head, and even for the liquid having quite high viscosity of 150 cp. to achieve high quality printing product.

| Bubbling liquid 1 | |
|---|---|
| ethanol | 40 Wt % |
| water | 60 Wt % |
| Bubbling liquid 2 | |
| water | 100 Wt % |

| Bubbling liquid 3 | |
|---|---|
| isopropanol alcohol | 10 Wt % |
| water | 90 Wt % |
| Ejection liquid 1: pigment ink (viscosity; 15 cP) | |
| carbon black 5 | 5 Wt % |
| Styrene-acrylic acid-acrylic acid ethyl copolymer (Acid value: 150, Weight-average molecular weight: 8000) | 1 Wt % |
| monoethanolamine | 0.25 Wt % |
| glycerin | 69 Wt % |
| thioglycol | 5 Wt % |
| ethanol | 3 Wt % |
| water | 16.75 Wt % |
| ejection liquid 2 (viscosity; 55 cP) | |
| polyethylene glycol 200 | 100 Wt % |
| ejection liquid 3 (viscosity; 150 cP) | |
| polyethylene glycol 600 | 100 Wt % |

In case of the liquid which has been considered difficult to eject in the prior art, difficulty in obtaining high quality image has been encountered for low ejection speed which promotes fluctuation of the ejecting direction to lower accuracy of the hitting position of the liquid droplet on the printing medium, or for fluctuation of ejection amount due to instability of ejection. However, in the foregoing embodiment, satisfactory bubbling can be obtained by using the bubbling liquid with high stability. This results in improvement of accuracy of the hitting position of the liquid drop and stabilization of ink ejection amount to enable significant improvement of the printing image quality.

<Fabrication of Liquid Ejection Head>

A fabrication process of the liquid ejection heads shown in the above stated embodiments will be explained.

In case of the liquid ejection head shown in FIG. 10, the head is formed by patterning the base 34 for providing the movable members 31 on the element substrate 1 with a dry film or the like, bonding or welding the movable members 31 on the base 34, and subsequently, fitting the grooved member having a plurality of grooves forming respective liquid flow passages 10, the ejecting ports 18, and cavities forming the ejection ports and common liquid chamber 15, on the element substrate with aligning respective grooves and movable members.

Figure 31:
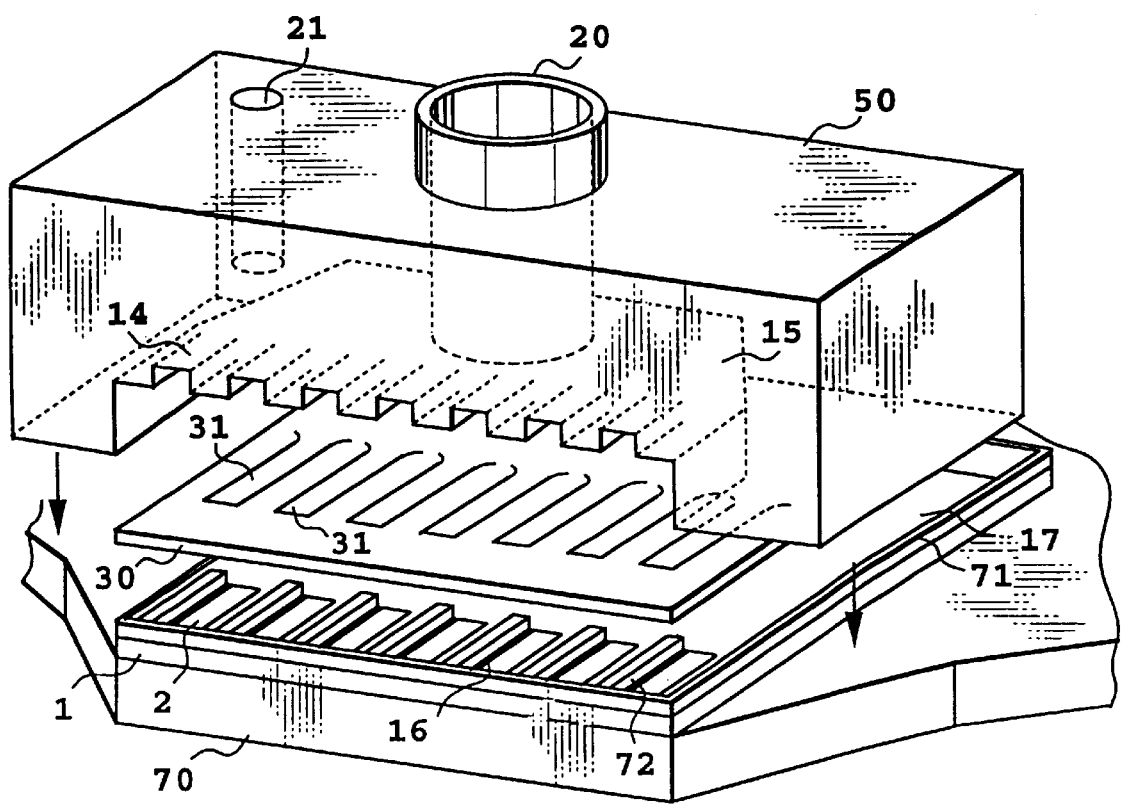
FIG. 31 is an exploded perspective view of the head according to the third embodiment.

Next, fabrication process of the liquid ejection head having dual liquid flow passage structure as shown in FIGS. 18 and 31 will be described.

In general, the wall for the second liquid flow passage 16 is formed on the element substrate 1. The separation wall 30 is mounted thereon. The grooved member 50 having the grooves for defining the first liquid flow passages 14 is mounted thereon. In the alternative, after forming the wall of the second liquid flow passage 16, the grooved member 50 mounted thereon the separation wall 30, is mated to fabricate the head.

The fabrication process of the second liquid flow passage will be explained in greater detail.

FIGS. 32A to 32E are general sectional views for explaining the first embodiment of the liquid ejection head fabrication process according to the present invention.

Figure 32A:
FIGS. 32A to 32E are sections of process steps for explaining a fabrication process of the liquid ejection head according to the third embodiment.

In the present embodiment, as shown in FIG. 32A, on the element substrate (silicon wafer), electrothermal transducer element having the heater 2 was formed with hafnium diboride or tantalum nitride and so on employing a fabrication apparatus similar to that employed in a semiconductor fabrication process. Thereafter, in the next step, for the purpose of improvement adhesion ability with a photosensitive resin, the surface of the element substrate 1 was washed. For further higher adhesion ability can be attained by performing property modification of the surface by ultraviolet-ozone treatment for the surface of the element substrate, and by spin coating a solution, in which a silane coupling agent (Nihon Unica K.K.: Al89), for example, is diluted by ethyl alcohol into 1 Wt %, on the surface of modified property.

Figure 32B:
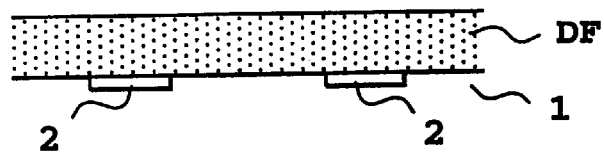

Next, on the surface of the substrate 1, which was washed for improving adhesion ability, an ultraviolet sensitive resin film (Tokyo Oka K.K.: dry film Ordyl SY-318) DF was laminated as shown in FIG. 32B.

Figure 32C:
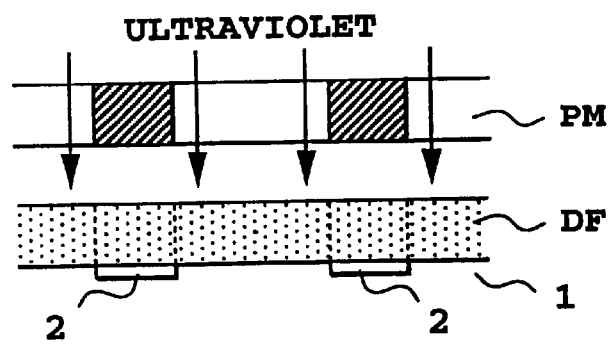

Next, as shown in FIG. 32C, arranging a photo-mask PM on the dry film DF, a ultraviolet ray was irradiated for the portion of the dry film DF to be maintained at the wall for the second liquid flow passage through the photo-mask PM. This exposure step was performed employing Canon K.K.: MPA-600 with an exposure amount about 600 mJ/cm$^2$.

Figure 32D:
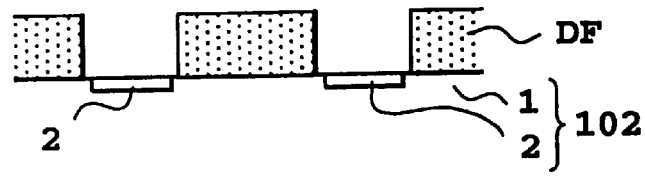
Figure 32E:
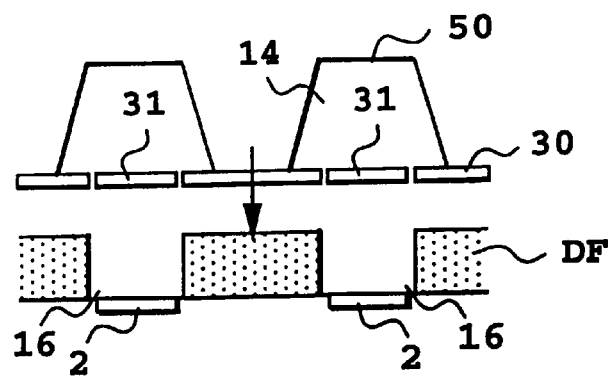

Next, as shown in FIG. 32D, the dry film DF was developed by a developing solution (Tokyo Oka K.K.: BMRC-3) consisted of a mixture of xylene, butyl cellosolve acetate for dissolving the non-exposed portion with leaving the portion hardened by exposure to form the wall portion of the second liquid flow passage. Also, a slag left on the surface of the element substrate was removed by treatment for about 90 seconds by a oxygen plasma ashing apparatus (Alkantec K.K.: MA-800). Subsequently, further irradiation of ultraviolet way at 100 mJ/cm$^2$ was performed under 150° C. for 2 hours to completely harden the exposed portion.

Through the foregoing process, for a plurality of heater board (element substrate) divided and fabrication from the silicon substrate, the second liquid flow passage can be formed uniformly with high precision. The silicon substrate is cut into each individual heater board 1 by means of a dicing machine (Tokyo Seimitsu K.K.: AWD-4000) mounted thereon a 0.05 mm thick diamond blade. The divided heater board 1 is fixed on an aluminum base plate 70 by a bond (Toray K.K.: SE4400) (see FIG. 35). Then, the heater board 1 is connected with a printed circuit board preliminarily fitted on the aluminum base plate 70, via a aluminum wire of 0.05 mm diameter.

On the heater board 1 thus obtained, as shown a sub-assembly of the grooved member 50 and the separation wall 30 is positioned and fixed in the manner set forth above. Namely, with positioning the grooved member 50 having the separation wall 30 and the heater board 1 relative to each other, the assembly is fixed by engagement of a set spring 78. Then, ink and bubbling liquid supply member 80 is mated and fixed on the aluminum base plate 70. Thereafter, gap defined between the aluminum wires, gaps defined between the grooved member 50, the heater board 1 and the ink/bubbling liquid supply member 80 were sealed by a silicon sealant (Toshiba Silicon K.K.: TSE399).

By forming the second liquid flow passage through the process set forth above, high precision liquid flow passage can be obtained without any position error relative to the heater of each heater board. Particularly, by preliminarily mating the grooved member 50 and the separated wall 30 in the preceding step, the high precision of position of the first liquid flow passages 14 and the movable member 31 can be achieved.

With these high precision fabrication technology, ejection can be stabilized to improve printing quality. Furthermore, since all elements can be formed on the wafer, the head can be mass-produced at low cost.

It should be noted that while the ultraviolet curing type dry film is employed for forming the second liquid flow passage in the present embodiment, it is also possible to employ a resin having an absorption band in an ultraviolet band, particularly in a range close to 248 nm, to cure the same after lamination and then to remove resin at the portion to be the second liquid flow passage by an excimer laser.

Figure 33A:
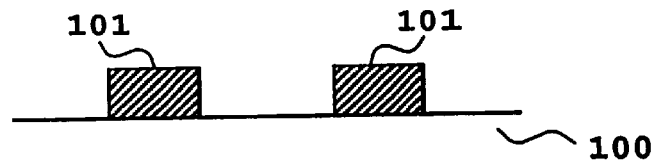
FIGS. 33A to 33D are sections of process steps for explaining a fabrication process of the liquid ejection head according to the third embodiment.

FIGS. 33A to 33D are general sections for explaining the second embodiment of the liquid ejection head according to the present invention, In the present embodiment, as shown in FIG. 33A, on a SUS substrate 100, a resist 101 of a thickness of 15 μm is patterned in the shape of the second liquid flow passage.

Figure 33B:
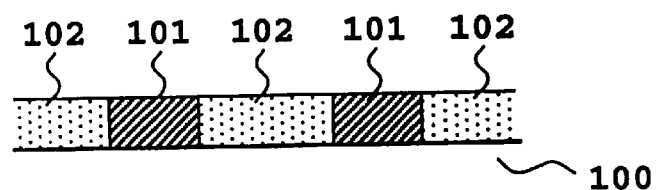

Next, as shown in FIG. 33B, electroplating is performed for the SUS substrate to form a nickel layer 102 of the thickness of 15 μm thereon. As a plating liquid, a liquid added a stress reduction agent (world metal K.K.: Zero All), boric acid, a pit preventing agent (World Metal K.K: NP-ASP) and nickel chloride to nickel sulfamate may be used. As a manner of application of electric field upon electrode position, an electrode is connected at an anode side and already patterned SUS substrate 100 is connected at cathode side, an electric current having current density of 5 A/cm$^2$ is applied at a temperature of plating liquid of 50° C.

Figure 33C:
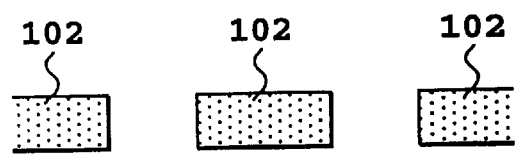

Next, as shown in FIG. 33C, ultrasonic vibration is applied to the SUS substrate 100 completed the plating process as set forth above to peel off a part of the nickel layer 102 from the SUS substrate 100 to obtain the designed configuration of second liquid flow passage.

Figure 33D:
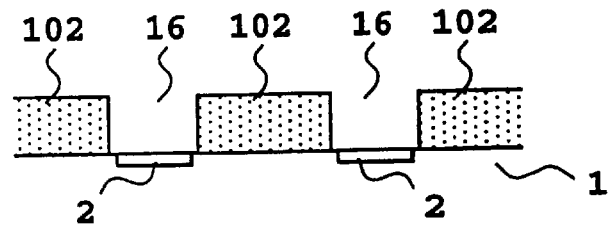

On the other hand, the heater board arranged the electro-thermal transducer is formed on the silicon wafer using the fabrication device similar to that for the semiconductor fabrication apparatus. This wafer is cut into each individual heater board by the dicing machine as mentioned embodiment. The heater board 1 is then fitted on the aluminum base plate 70, on which the printing circuit board 104 is preliminarily mounted. Then, electric wiring is formed by connecting the printed circuit board and the aluminum wire (not shown). On the heater board in this condition, as shown in FIG. 33(D), the second liquid flow passage obtained in the former process is positioned and fixed. At this time, "fixing" is merely required to prevent position error upon fitting of the upper plate for engaging and tightly fitting the upper plate fixed therewith the separation wall by the set spring similarly to the first embodiment.

In the present embodiment, for fixing, an ultraviolet curing type bond (Grace Japan K.K.: Amicon UV-300) is applied. Then, employing an ultraviolet ray irradiation device, ultraviolet ray is irradiated in exposure amount of 100 mJ/cm$^2$ for about 3 seconds for fixing.

With the present embodiment of the fabrication process set forth above, in addition to capability of obtaining high precision second liquid flow passage with no position error relative to the heater, since the liquid flow passage is formed by nickel, the liquid ejection head achieving high reliability with high resistance against alkaline can be provided.

FIGS. 34A to 34D are generation sections for explaining the third embodiment of the liquid ejection head fabrication process according to the present invention.

Figure 34A:
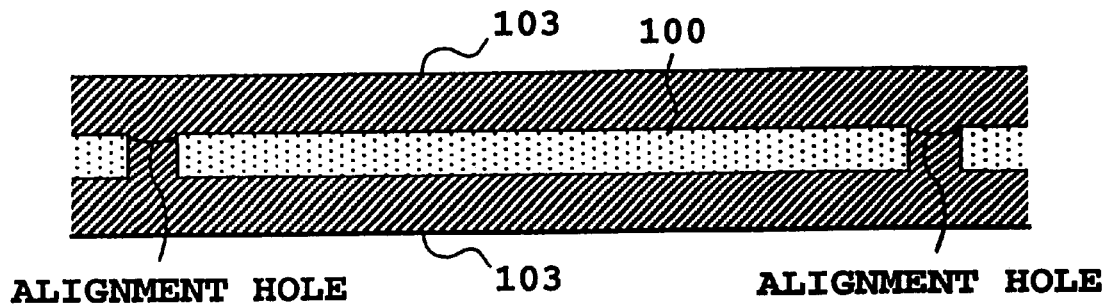
FIGS. 34A to 34D are sections of process steps for explaining a fabrication process of the liquid ejection head according to the third embodiment.

In the present embodiment, as shown in FIG. 34A, on both surface of the SUS substrate 100 of 15 μm thick having alignment holes or marking 100a, a resist 31 is applied. Here, as the resist, PWERR-AR900 available from Tokyo Oka K.K. is used.

Figure 34B:
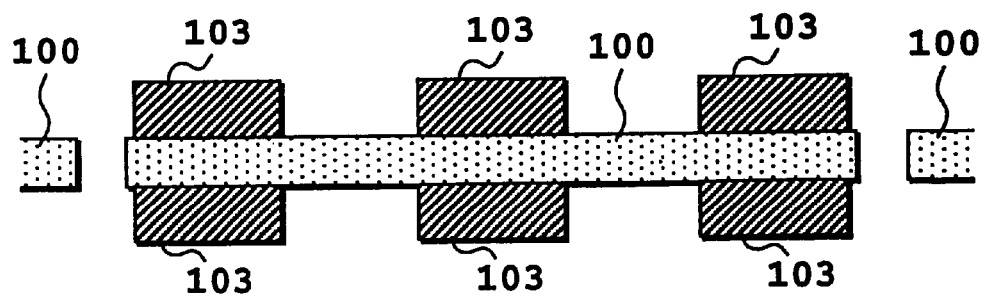

Thereafter, as shown in FIG. 34B, aligning with alignment hole 100a of the element substrate 100, exposure was effected by the exposure device (Canon K.K.: MPA-600), then, the resist 103 at the position to form the second liquid flow passage is removed. The exposure was performed at the exposure amount of 800 mJ/cm².

Figure 34C:
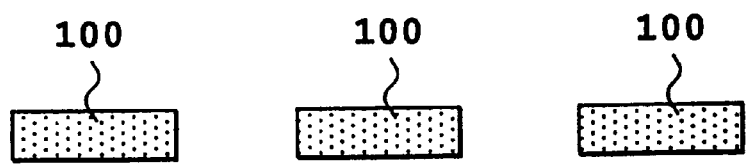

As shown in FIG. 34C, the SUS substrate patterned the resist 103 on both surface was dipped in an etching liquid (aqueous solution of ferric chloride or cupric chloride) to etch out the portion exposed through the resist 103. Then, the resist is removed.

Figure 34D:
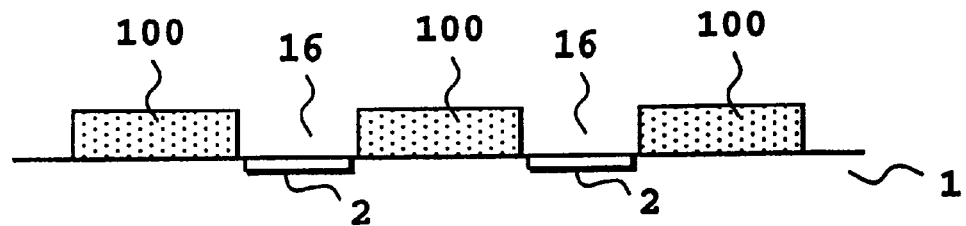

Next, as shown in FIG. 34D, similarly to the former embodiment of the fabrication process, etched SUS substrate was positioned and fixed on the heater board 1 to form the liquid ejection head having the second liquid flow passage can be assembled.

With the fabrication process of the present embodiment, in addition to the fact that the second liquid flow passage having high precision with no position error relative to the heater can be obtained, since the liquid flow passage is formed with SUS, the liquid ejection head holding high reliability with high resistance against alkali and acid.

As set forth above, with the present embodiment of the fabrication process, by preliminarily arranging the wall of the second liquid flow passage on the element substrate, it becomes possible to position the electrothermal transducer and the second liquid flow passage at high precision. Also, for a large number of element substrate before cutting and separating, the second liquid flow passages can be formed simultaneously large amount of the liquid ejection heads can be provided at low cost.

On the other hand, in the liquid ejection head obtained by implementation of the shown embodiment of the fabrication process of the liquid ejection head, since the heater and the second liquid passage are position at high precision, to efficiently receive the pressure of bubbling by heating of the electrothermal transducer to attain superior ejection efficiency.

A printing mode of the shown embodiment employing the novel head as set forth above will be described hereinafter.

<First Example>

Instead of the low resolution head 1001L as set forth above, the novel head using an ink having high coloring agent ratio as the ejection liquid may be employed for printing the field, the low spatial frequency region or the high density portion. The discrimination of the image region and the necessary image data processing based thereon is similar to that explained with reference to FIGS. 3 to 8.

The ink having high ratio of coloring agent, i.e. dye, pigment or the like, generally has high viscosity. Also in such case, according to the shown embodiment, good ejection operation can be performed by the head of the shown embodiment. As a result of this, high density can be realized satisfactory.

<Second Example>

The head of the novel system in the shown embodiment may be adapted to high resolution printing by making the area of the heater smaller to eject small droplet. Then, as explained with respect to the second embodiment, the region of the field or the like of the image is selectively printed overlappingly. In this case, it is not necessary to employ the ink having high coloring agent ratio as the ejection liquid, but can use the normal ink with high frequency driving.

<Third Example>

With respect to the head of the novel system employed in the shown embodiment, a construction to modulate the a size of the ejected liquid droplet into a plurality of steps may be employed for printing with large size droplet for the field or so forth as explained in the first embodiment to achieve the similar effect to the first embodiment.

Figure 35:
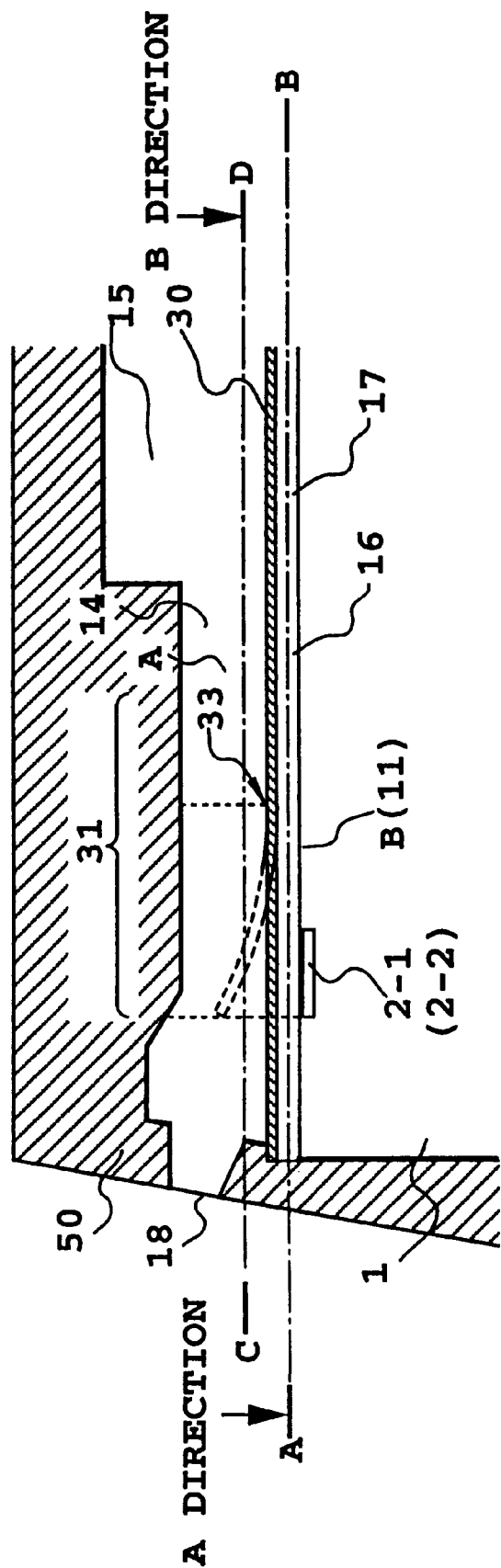
FIG. 35 is a longitudinal section showing a primary structure of a liquid ejection head of a modification of the third embodiment.
Figure 36A:
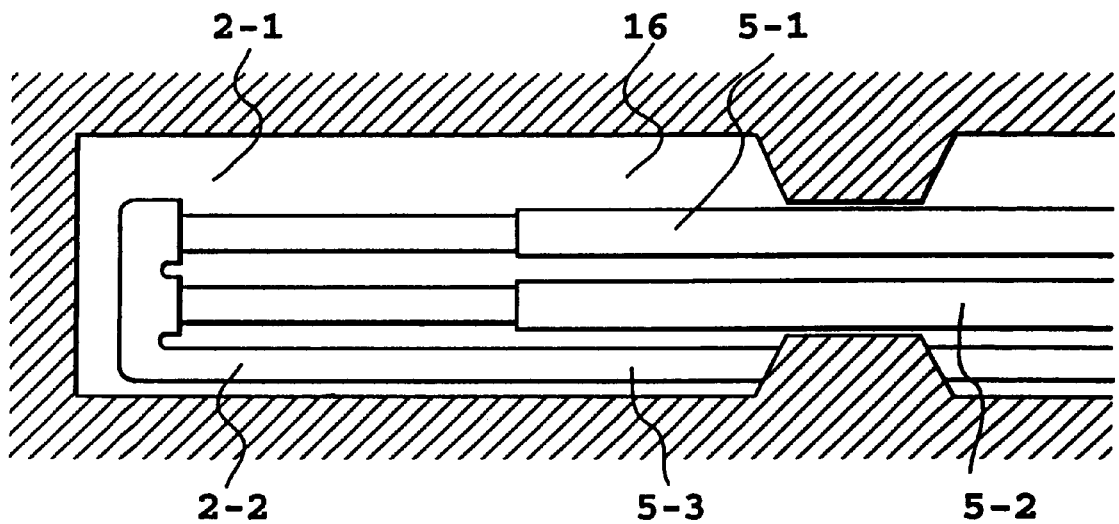
FIGS. 36A and 36B are a section and a top plan view of the head of FIG. 35 as viewed from the above, respectively.
Figure 36B:
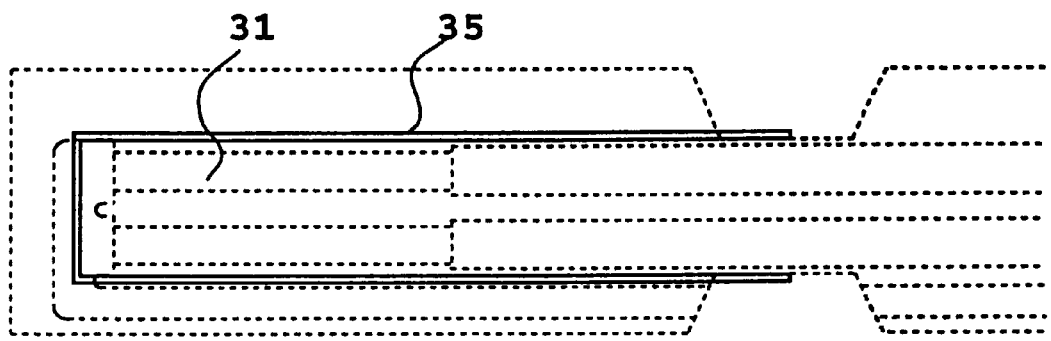

FIG. 35 is a section of a liquid passage of such liquid ejection head, FIG. 36A is a section along line A–B of FIG. 35 as viewed from the direction A, and FIG. 36B is a section along line C–D of FIG. 35 as viewed from the direction B.

As shown in FIGS. 35, 36A and 36B, the liquid ejection head of the present invention has a plurality of (two in the shown embodiment) electrothermal transducers (hereinafter referred to as heater) 2-1, 2-2 which can be driven independently to individually apply thermal energy for generating bubble in the liquid, and wiring electrodes 5-1, 5-2 and 5-3 for applying electric signal to the heater formed on an element substrate 1. Further, a second liquid passage (bubbling liquid passage) 16 is arranged on the element substrate 1, and the first liquid passage (ejecting liquid flow passage) 14 directly communicating with the ejection opening 18 is arranged above the second liquid passage 16. It should be noted that the plurality of heaters corresponding to one ejection opening form the heating portion. Upstream side of each of the first liquid passages is communicated with a first common liquid chamber 15 for supplying the ejection liquid to the first liquid passages, and the upstream side of each of the second liquid passage is communicated with a second common chamber 17 for supplying the bubbling liquid to the second liquid passages. Between the first and second liquid passages, the separation wall 30, in which the movable member 31 constructed with resilient material, such as metal or the like, are arranged to separate the ejection liquid in the first liquid passage 14 and the bubbling liquid in the second liquid passage 16. In the case that the bubbling liquid and the ejection liquid are the liquids preferred not to be admixed as least as possible, the liquids of the first liquid passage 14 and the second liquid passage 16 are preferably separated with each other by the separation wall. On the other hand, in the case that the bubbling liquid and the ejection liquid are the same liquid or the liquids which can be admixed in certain extent, complete separation function of the liquid by the separation wall becomes not necessary. In the drawing, a reference sign 50 denotes a grooved member, in which the wall defining the first liquid passage 14 and a member defining the ink ejection opening 18 are formed integrally. The grooved member 50, the element substrate 1 and the separation wall 30 construct the liquid ejection head.

The separation wall located at the portion which is defined the heaters 2-1 and 2-2 are projected in a perpendicular direction to planes of the heaters (hereinafter referred to as ejection pressure generating region; the region A and the bubble generating region 11(B) in FIG. 35) has a cantilever form movable member 31 which is defined the free end on the ejection opening side (downstream side of flow of the liquid directed to the ejection opening) and the fulcrum 33 on the side of the common liquid chambers (15, 17) (upstream side of flow of the liquid directed to the ejection opening) by the slit 35. The movable member 31 is arranged in opposition to the bubble generating region 11 (B), it operates to open toward the first liquid passage side by bubbling of the bubbling liquid.

Furthermore, by varying the driving condition of the heaters 2-1, 2-2, condition of the bubble to be generated and displacement amount of the movable member can be varied to vary the liquid ejection amount. A relationship of the construction between the liquid supply passage 12 and the heater 2 is explained with respect to the foregoing embodiment. The same relationship is employed between the second liquid passage 16 and the heater 2 in the shown embodiment. It should be noted that the second liquid passage is formed as a blind bore at downstream side of the heater in the shown embodiment.

As can be clear from the above, the head of the novel system as illustrated in FIGS. 35, 36A and 36B can vary the ejection amount in stepwise fashion depending upon combination of the heater to be driven among two heaters. In this case, the maximum ejection amount can be obtained by driving both heaters. As set forth above, the field or the like in the image can be printed with a mode of the maximum ejection amount.

In the embodiment set forth above, the construction is explained in which by employing the high resolution head 1001H and the low resolution head 1001L, the respective images are printed by respective adapted heads. However, the present invention is not limited to the shown construction. For example, the present invention is applicable for the construction, in which a head having an ejection characteristics adapted for printing the field color is provided separately from the normal head. For example, the present invention is applicable for the construction, in which the head having the ejection characteristics adapted to the ink prepared for hardly causing non-uniformity of density for printing the field color or the head differentiated the ejection characteristics and the like, such as ejection force, ejection amount and so on for adapting to the special field color.

In the present invention, a field portion and a portion other than the field portion in an image to be printed are separated. Then, the field portion is printed with the low resolution head ejecting a large amount of ink and the portion other than the field portion is printed with the high resolution head ejecting a small amount of ink, so that a high quality image can be printed. In particular, the ink-jet head of a novel ejection system described above can eject smaller amount of ink than that ejected with a head of conventional system. Therefore, the head of the novel can be employed as the high resolution head and the conventional head can be employed as the low resolution head. As a result of this, superior printing of an image including the field color can be realized at uniformity of color and density. In addition, application of the present invention is not limited to the case that ink-jet heads of different system are employed as described above. Also in the case where only the heads of the novel system are employed, the field color and the portion other than the field color can be adequately printed by varying a driving condition of the heads and using a multi ejection system.

As can be clear from the above, according to the shown embodiments of the present invention, when there exists a region to be printed in uniform color or density such as a background in the image to be printed, such region is printed by employing the ink-jet head having the large ejection amount. As a result of this, the ink dot formed on the printing medium becomes naturally large. Furthermore, by bleeding of the ink, the dots becomes further large to eliminate the gap between the dots as much as possible. By this, the background color becomes uniform or the density can be increased. Particularly, when the printing medium to be printed on the fabric, such as cloth, uniformity of the color can be realized, equally. As a result, even upon printing the background on the cloth or the like, uniformity of color and density equivalent to the screen system can be achieved.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink-jet printing apparatus for performing printing on a printing medium by employing an ink-jet head ejecting an ink, comprising:

image separating means for discriminating between a predetermined region and a region other than the predetermined region in an image to be printed, and for separating image data corresponding to the predetermined region from image data corresponding to the region other than the predetermined region, the predetermined region and the region other than the predetermined region being different in uniformity of the image; and control means for driving the ink-jet head on a basis of image data corresponding to respective said regions separated by said image separating means to perform printing, said control means making an ink ejection amount per pixel in said predetermined region greater than that in said region other than said predetermined region.

2. An ink-jet printing apparatus as claimed in claim 1, wherein said image separating means makes discrimination by comparing a data of a predetermined color with the image data of the image to be printed.

3. An ink-jet printing apparatus as claimed in claim 1, wherein said image separating means makes discrimination on a basis of a spatial frequency of a density in the image to be printed.

4. An ink-jet printing apparatus as claimed in claim 1, wherein said image separating means makes discrimination on a basis of a frequency of a density in the image to he printed.

5. An ink-jet printing apparatus as claimed in claim 1, wherein said predetermined region is a background region or a region of a uniform density in the image to be printed.

6. An ink-jet printing apparatus as claimed in claim 1, wherein first and second ink-jet heads having different ink ejection amounts are employed as the ink-jet head, and said control means performs printing for said predetermined region using said first ink-jet head having greater ink ejection amount.

7. An ink-jet printing apparatus as claimed in claim 6, wherein said first and second ink-jet heads are provided with a plurality of ejection openings respectively, density of arrangement of the plurality of ink ejection openings in said first ink-jet head is lower than density of arrangement of the plurality of ink ejection openings in said second ink-jet head.

8. An ink-jet printing apparatus as claimed in claim 1, wherein said control means increases ink ejection amount per a pixel by performing ink ejection for a plurality of times for the pixel within said predetermined region.

9. An ink-jet printing apparatus as claimed in claim 1, wherein said control means increases ink ejection amount per a pixel by increasing ejection frequency of said ink-jet head in said predetermined region.

10. An ink-jet printing apparatus as claimed in claim 1, wherein first and second ink-jet heads ejecting inks having different contents of coloring agent, respectively, are employed as the ink-jet head, and said control means performs printing for said predetermined region using said first ink-jet head having ink containing greater content of coloring agent.

11. An ink-jet printing apparatus as claimed in claim 1, wherein said printing medium is a medium consisted of a fibers.

12. An ink-jet printing apparatus as claimed in claim 1, further comprising boundary detecting means for detecting a boundary region in the predetermined region between said predetermined region and the region other than said predetermined region, wherein said control means performs printing for said boundary region with a smaller ink ejection amount than that in said predetermined region.

13. An ink-jet printing apparatus for performing printing on a printing medium by employing an ink-jet head ejecting an ink, a first ink-jet head and a second ink-jet head having different ink ejection characteristics being employed as the ink-jet head, said apparatus comprising:

image separating means for discriminating between a region to be printed by using said first ink-jet head and a region to be printed by using said second ink-jet head in an image to be printed, and separating the image data respectively corresponding to respective regions from each other on a basis of a result of discrimination, the separated regions being different in uniformity of the image; and control means for performing printing using respective said first and said second ink-jet heads on a basis of the image data corresponding to respective regions.

14. An ink-jet printing apparatus as claimed in claim 13, wherein said first ink-jet head and said second ink-jet head eject the ink at different ink ejection amounts from each other.

15. An ink-jet printing apparatus as claimed in claim 13, wherein said first ink-jet head and said second ink-jet head have a plurality of ejection openings at different densities from each other.

16. An ink-jet printing apparatus as claimed in claim 13, wherein said first ink-jet head and said second ink-jet head eject the ink at different frequencies from each other.

17. An ink-jet printing apparatus as claimed in claim 13, wherein said ink-jet head and said second ink-jet head eject the ink of different contents of coloring agent from each other.

18. An ink-jet printing apparatus as claimed in claim 13, wherein at least one of said first and second ejection heads includes ejection opening for ejecting the ink, a bubble generating region for generating bubble in the ink, and a movable member provided in opposition to said bubble generating region and displaceable between a first position and a second position away from said bubbling region in greater magnitude than that in said first position, and said movable member is displaced from said first position to said second position by a pressure developed by generation of bubble in said bubble generating region, so that bubble grows greater in a downstream side than an upper stream side in the direction toward the ejection opening so as to eject the ink.

19. An ink-jet printing apparatus as claimed in claim 18, wherein a downstream portion of the bubble grows toward the downstream side of said movable member in response to displacement of said movable member.

20. An ink-jet printing apparatus as claimed in claim 18, wherein said movable member has a fulcrum, and a free end located at a position of downstream side of said fulcrum.

21. An ink-jet printing apparatus as claimed in claim 13, wherein at least one of said first and second ejection heads includes ejection opening for ejecting the ink, a liquid passage having a heater for generating bubble by heating the ink and a supply passage for supplying an ink to said heater from the upstream side of said heater along said heater, and a movable member provided in opposition to said heater and having a free end on an ejection opening side to displace said free end in response to a pressure generated by said bubble so as to guide said pressure toward said ejection opening.

22. An ink-jet printing apparatus as claimed in claim 13, wherein at least one of said first and second ejection heads includes ejection opening for ejecting the ink, a heater for generating bubble by heating the ink, a movable member provided in opposition to said heater and having a free end on an ejection opening side to displace said free end in response to a pressure generated by generation of bubble so as to guide said pressure toward said ejection opening, and a supply passage for supply the ink to said heater from an upstream side along the surface of said movable member close to said heater.

23. An ink-jet printing apparatus as claimed in claim 13, wherein at least one of said first and second ink-jet heads including:

a first liquid passage communicated with an ejection opening;

a second liquid passage having a bubble generating region in which a bubble is generated in the ink by applying heat to the ink; and a movable member provided between said first liquid passage and said bubble generating region, and having a free end on an ejection opening side, said free end being displaced toward said first liquid passage in response to a pressure developed by generation of a bubble within said bubble generating region to guide said pressure to the ejection opening side of said first liquid passage.

24. An ink-jet printing apparatus as claimed in claim 22, wherein the heater is provided in a position opposing to said movable member, and said bubble generating region is defined between said movable member and said heater.

25. An ink-jet printing apparatus as claimed in claim 24, wherein the free end of said movable member is located a downstream side of an area center of said heater.

26. An ink-jet printing apparatus as claimed in claim 24, wherein said supply passage supplies the ink to said heater from the upstream side of said heater, along said heater.

27. An ink-jet printing apparatus as claimed in claim 26, wherein said supply passage has substantially flat or smooth inner wall at upstream side of said heater, and supplies the ink to the heater along said inner wall.

28. An ink-jet printing apparatus as claimed in claim 24, wherein said bubble is a bubble generated by causing film boiling in the ink by heat generated by said heater.

29. An ink-jet printing apparatus as claimed in claim 24, wherein said movable member has a plate shape.

30. An ink-jet printing apparatus as claimed in claim 29, wherein all of effective bubbling region of said heater opposes said movable member.

31. An ink-jet printing apparatus as claimed in claim 29, wherein an overall surface of said heater opposes said movable member.

32. An ink-jet printing apparatus as claimed in claim 29, wherein a total area of said movable member is greater than a total area of said heater.

33. An ink-jet printing apparatus as claimed in claim 29, wherein the fulcrum of said movable member is arranged at a position out of right above said heater.

34. An ink-jet printing apparatus as claimed in claim 29, wherein said free end of said movable member has a shape substantially perpendicular to the liquid passage in which said heater is provided.

35. An ink-jet printing apparatus as claimed in claim 29, wherein said free end of said movable member is arranged on the ejection opening side of said heater.

36. An ink-jet printing apparatus as claimed in claim 23, wherein said movable member defines a part of a separation wall provided between said first liquid passage and said second liquid passage.

37. An ink-jet printing apparatus as claimed in claim 36, wherein said separation wall is made of a metal material.

38. An ink-jet printing apparatus as claimed in claim 37, wherein said metal material is a nickel or a gold.

39. An ink-jet printing apparatus as claimed in claim 36, wherein said separation wall is made of a resin.

40. An ink-jet printing apparatus as claimed in claim 36, wherein said separation wall is made of a ceramic.

41. An ink-jet printing apparatus as claimed in claim 23, which further comprises a first common liquid chamber for supplying a first ink to a plurality of said first liquid passages, and a second common liquid chamber for supplying a second ink to a plurality of said second liquid passages.

42. An ink-jet printing apparatus as claimed in claim 13, wherein at least one of said first and said second ink-jet heads includes:
- a grooved member integrally having a plurality of ejection opening for ejecting the ink, a plurality of grooves forming a plurality of said first liquid passage corresponding to and directly communicated with respective ejection openings, and recessed portion forming a first common liquid chamber supplying ink to a plurality of said first liquid passage;
- an element substrate provided with a plurality of heaters for applying heat to the ink to generate a bubble in the ink; and
- a separation wall which is arranged between said grooved member and said element substrate, defines a part of a wall of said second liquid passage corresponding to said heater, and at a position opposing to said heater, is displaced toward said first liquid passage side by a pressure developed by generation of the bubble.

43. An ink-jet printing apparatus as claimed in claim 42, wherein said free end of said movable member is positioned downstream side of an area center of said heater.

44. An ink-jet printing apparatus as claimed in claim 42, wherein said grooved member has a first induction passage for introducing the ink to said first common liquid chamber and a second induction passage for introducing the ink to said second liquid passage.

45. An ink-jet printing apparatus as claimed in claim 44, wherein said grooved member is provided with a plurality of said second induction passages.

46. An ink-jet printing apparatus as claimed in claim 44, wherein a ratio of a sectional area of said first induction passage to a sectional area of said second induction passage is proportional to the supply amount of respective inks.

47. An ink-jet printing apparatus as claimed in claim 44, wherein said second induction passage is an induction passage for supplying ink to said second liquid passage through said separation wall.

48. An ink-jet printing apparatus as claimed in claim 42, wherein the ink supplied to said first liquid passage and the ink supplied to said second liquid passage are the same ink.

49. An ink-jet printing apparatus as claimed in claim 42, wherein the ink supplied to said first liquid passage and the ink supplied to said second liquid passage are different inks.

50. An ink-jet printing apparatus as claimed in claim 49, wherein the ink supplied to said second liquid passage has superior property at least one of low viscosity, bubbling ability and thermal stability in comparison with the ink supplied to said first liquid passage.

51. An ink-jet printing apparatus as claimed in claim 42, wherein said heater is an electrothermal transducer having a heating resistor generating the heat as applied an electric signal.

52. An ink-jet printing apparatus as claimed in claim 51, wherein said electrothermal transducer has a protection layer arranged over said heating resistor.

53. An ink-jet printing apparatus as claimed in claim 51, which further comprises a wiring for feeding said electric signal to said electrothermal transducer and a functioning element for selectively applying the electric signal to said electrothermal transducer which are arranged on said element substrate.

54. An ink-jet printing apparatus as claimed in claim 42, wherein a portion of said second liquid passage where said bubble generating region or the heater is arranged, is in a form of chamber.

55. An ink-jet printing apparatus as claimed in claim 42, the shape of said second liquid passage is the shape having a narrowed portion at an upstream side of said bubble generating region or of said heater.

56. An ink-jet printing apparatus as claimed in claim 42, wherein a distance between a surface of said heater and said movable member is less than or equal to 30 $\mu$m.

57. An ink-jet printing apparatus as claimed in claim 42, wherein at least one of said ink-jet heads includes a plurality of said heaters, and said control means selectively drives said plurality of heaters to eject the ink at the ejection amount depending upon said selection of driving.

* * * * *

UNITED STATES PATENT AND TRADEMARK OFFICE
CERTIFICATE OF CORRECTION

PATENT NO. : 6,149,257
DATED : November 21, 2000
INVENTOR(S) : Toshiyuki Yanaka et al.

Page 1 of 4

It is certified that error appears in the above-identified patent and that said Letters Patent is hereby corrected as shown below:

Title page,
Item [56], FOREIGN PATENT DOCUMENTS, "3-218848 9/1993 Japan" should read -- 3-218848 9/1991 Japan --.

Column 1,
Line 22, "output devices" should read -- an output device --; and
Line 32, "does" should read -- do --.

Column 2,
Line 66, "be" should read -- the --.

Column 3,
Line 61, "another" should read -- other--.

Column 4,
Line 48, "essary" should read -- essarily --.

Column 7,
Line 17, "sequence" should read -- sequences --.

Column 10,
Line 36, "back ground" should read -- background --; and
Line 51, "is" should read -- are --.

Column 11,
Line 52, "fall" should read -- falling --.

Column 12,
Line 36, "able to large" should read -- able to eject --.

Column 13,
Line 65, "are" should be deleted; and
Line 67, "displaced to toward" should read -- displaced toward --.

UNITED STATES PATENT AND TRADEMARK OFFICE
CERTIFICATE OF CORRECTION

PATENT NO. : 6,149,257
DATED : November 21, 2000
INVENTOR(S) : Toshiyuki Yanaka et al.

It is certified that error appears in the above-identified patent and that said Letters Patent is hereby corrected as shown below:

Column 14,
Line 31, "Amongst," should read -- Amongst --.

Column 15,
Line 21, "opposite" should read -- be opposite --; and
Line 50, "extinct," should read -- extinction --.

Column 17,
Line 10, "remained" should read -- remaining --.

Column 18,
Line 7, "effect is" should read -- effects are --; and
Line 12, "for" should read -- to --.

Column 19,
Line 13, "on" should be deleted; and
Line 19, "does" should read -- do --.

Column 20,
Line 24, "communication" should read -- communicate --; and
Line 48, "the" (first occurrence) should be deleted.

Column 21,
Line 19, "be arisen" should read -- arise --.

Column 27,
Line 3, "were" should read -- was --.

Column 28,
Line 29, "it" should read -- there --;
Line 30, "lish" should read -- lished --;
Line 43, "bubble" should read -- bubbles --; "generated" should read -- generated. --; and "in the so as to eject." should be deleted; and
Line 64, "ejection" should read -- ejected --.

UNITED STATES PATENT AND TRADEMARK OFFICE
CERTIFICATE OF CORRECTION

PATENT NO. : 6,149,257
DATED : November 21, 2000
INVENTOR(S) : Toshiyuki Yanaka et al.

It is certified that error appears in the above-identified patent and that said Letters Patent is hereby corrected as shown below:

Column 29,
Line 14, "is" should be deleted.

Column 30,
Line 29, "member." should read -- members. --;
Line 51, "wall," should read -- wall; --; and
Line 54, "results" should read -- result --.

Column 31,
Line 2, "bed" should read -- be --;
Line 8, "liquid," should read -- liquids, --;
Line 9, "inks" should read -- ink --;
Line 10, "conventionally" should read -- conventional --;
Line 11, "apparatus." should read -- apparatus can be used. --;
Line 21, "various liquid" should read -- various liquids --;
Line 24, "cause alternation or degradation" should read -- altered or degraded --; and
Line 42, "could" should read -- could be --.

Column 33,
Line 2, "improvement" should read -- improving --;
Line 4, "For further" should read -- Further --;
Line 24, "with" should read -- while --;
Line 30, "way" should read -- ray --; and
Line 33, "board" should read -- boards --.

Column 37,
Line 33, "novel" should read -- novel system --.

Column 38,
Line 31, "he" should read -- be --; and
Line 64, "consisted of a" should read -- consisting of --.

Column 40,
Line 14, "including" should read -- includes --.

UNITED STATES PATENT AND TRADEMARK OFFICE
CERTIFICATE OF CORRECTION

PATENT NO.    : 6,149,257
DATED         : November 21, 2000
INVENTOR(S)   : Toshiyuki Yanaka et al.

It is certified that error appears in the above-identified patent and that said Letters Patent is hereby corrected as shown below:

<u>Column 41,</u>
Line 6, "a" (both occurrences) should be deleted;
Line 20, "opening" should read -- openings --;
Line 21, "passage" should read -- passages --; and
Line 25, "passage" should read -- passages --.

<u>Column 42,</u>
Line 14, "property" should read -- property of --.

Signed and Sealed this

Nineteenth Day of August, 2003

JAMES E. ROGAN
*Director of the United States Patent and Trademark Office*